(12) United States Patent
Sainato et al.

(10) Patent No.: US 9,963,161 B2
(45) Date of Patent: May 8, 2018

(54) CART WITH TILTING SUPPORTS

(71) Applicant: Phoenix Intangibles Holding Company, Greenville, DE (US)

(72) Inventors: Anthony V. Sainato, Westlake, OH (US); Lee A. Wintermantel, Moon Township, PA (US); Paul R. Metcalfe, Solon, OH (US); James W. Bates, Cambridge, OH (US); Weston T. Skye, University Heights, OH (US); Scott E. Urban, University Heights, OH (US)

(73) Assignee: PHOENIX INTANGIBLES HOLDING COMPANY, Greenville, DE (US)

(*) Notice: Subject to any disclaimer, the term of this patent is extended or adjusted under 35 U.S.C. 154(b) by 0 days. days.

(21) Appl. No.: 15/378,093

(22) Filed: Dec. 14, 2016

(65) Prior Publication Data

US 2017/0190346 A1    Jul. 6, 2017

Related U.S. Application Data

(60) Provisional application No. 62/273,766, filed on Dec. 31, 2015.

(51) Int. Cl.
| | |
|---|---|
| *B62B 3/10* | (2006.01) |
| *B62B 3/02* | (2006.01) |
| *B62B 3/08* | (2006.01) |
| *B62B 5/06* | (2006.01) |
| *B62B 5/04* | (2006.01) |

(52) U.S. Cl.
CPC ................. *B62B 3/10* (2013.01); *B62B 3/02* (2013.01); *B62B 3/08* (2013.01); *B62B 5/04* (2013.01); *B62B 5/06* (2013.01); *B62B 2202/12* (2013.01); *B62B 2203/07* (2013.01); *B62B 2301/04* (2013.01)

(58) Field of Classification Search
CPC .... B62B 3/10; B62B 3/02; B62B 3/08; B62B 5/04; B62B 5/06; B62B 2202/12; B62B 2203/07; B62B 2301/04
USPC .............. 280/47.35, 79.3; 211/71.01, 78, 81, 211/85.17, 133.1, 168, 171, 194
See application file for complete search history.

(56) References Cited

U.S. PATENT DOCUMENTS

| | | | | |
|---|---|---|---|---|
| 1,628,846 | A * | 5/1927 | Karst .................... | A47F 5/0025 211/126.1 |
| 3,908,831 | A * | 9/1975 | Brendgord ............ | A47F 5/0025 211/126.2 |
| 4,744,474 | A * | 5/1988 | Tallving ............. | A47B 87/0207 211/133.1 |

(Continued)

*Primary Examiner* — John D Walters
(74) *Attorney, Agent, or Firm* — Eckert Seamans Cherin & Mellott, LLC; David C. Jenkins

(57) ABSTRACT

A cart including a frame assembly and a number of tote support assemblies is provided. The frame assembly includes a longitudinal axis, a first lateral side and a second lateral side. Each tote support assembly includes a tote support member defining a plane. Each tote support member is movably coupled to the frame assembly wherein each tote support member moves between a number of positions including a level, first position, wherein the plane of the support member is generally horizontal, and a tilted, second position, wherein the plane of the support member is tilted toward one of the frame assembly first lateral side or the frame assembly second lateral side.

17 Claims, 59 Drawing Sheets

(56) References Cited

U.S. PATENT DOCUMENTS

| | | | | |
|---|---|---|---|---|
| 5,647,600 | A | * | 7/1997 | Booras .................... B62B 3/006 |
| | | | | 211/42 |
| 5,881,892 | A | * | 3/1999 | Loo ....................... A47F 5/0025 |
| | | | | 211/126.13 |
| 8,191,910 | B2 | * | 6/2012 | Landau .................. B25H 3/028 |
| | | | | 211/85.17 |
| 2012/0048818 | A1 | * | 3/2012 | Fiscus .................. A47B 96/067 |
| | | | | 211/71.01 |

* cited by examiner

CART WITH TILTING SUPPORTS

CROSS REFERENCE TO RELATED APPLICATION

This application is a continuation-in-part application of and claims priority to U.S. Provisional Patent Application Ser. No. 62/273,766, filed Dec. 31, 2015.

BACKGROUND OF THE INVENTION

Field of the Invention

The disclosed and claimed invention relates to carts and, more specifically, to a tote cart including tilting tote support assemblies.

Background Information

Restocking shelves at a retail outlet requires transporting the items to be restocked to the shelves. When the items to be restocked are restocked in bulk, a number of the items are placed on a cart and moved to a location near the shelves. For example, milk and bread are items that tend to sell quickly and are restocked in bulk. Other items, however, may not sell as often and/or quickly. For example, a given type of cosmetic may sell only a few units per month. Such items are not restocked in bulk. That is, it is inefficient to load a cart full of a given type of cosmetic if only a few units are needed to restock the shelves. Further, it is inefficient for a worker to carry a few units of a given type of cosmetic from a storage area to the shelf.

To overcome these inefficiencies, retailers use totes. A tote is a reusable, portable enclosure into which a variety of items may be placed for temporary storage and transport. In use, a tote is filled with a number of disparate items at a warehouse and sent to a retail location that requested those items. That is, for example, a first retail location requests five units of Cosmetic A and three units of Cosmetic B, while a second retail location requests four units of Cosmetic A and six units of Cosmetic B. Cosmetics A and B are stored in bulk at a warehouse. When the requests are received at the warehouse, a tote for the first retail location is prepared which includes five units of Cosmetic A and three units of Cosmetic B. Similarly, a tote for the second retail location is prepared which includes four units of Cosmetic A and six units of Cosmetic B. In this manner, each retail location is not required to have bulk storage of all items being sold. Moreover, by using totes, each retail location receives a limited number of selected items that are needed at a specific time.

A tote may, however, be heavy. Further, a retail location, may require more than one tote to restock all the items that are needed at a given time. Thus, a number of totes, each containing a mix of items, may be delivered to a specific retail location. The totes are then placed on a cart and moved to a location near the shelves. This system also has disadvantages.

One disadvantage is that the carts typically have planar and level shelves. In this configuration the worker must engage in a motion of reaching downwardly into the tote, lifting the item and placing the items on the shelf. One instance of this motion does not take an excessive amount of time or cause undue stress. This motion, however, is likely to be repeated many, many times by many different workers at many different locations. Thus, given a large number of repetitions, time is wasted. Moreover, the worker is also subjected to repetitive stresses. Further, such carts are not aesthetically appealing and may block narrow aisles.

One solution to some of these disadvantages was to provide a cart with tilted shelves upon which a tote may be disposed. The tilted shelves angle the tote to one side thereby reducing the distance a worker must move an item as well as allowing the worker easier access to the interior of the tote. Such a cart, however, also has disadvantages. For example, totes tend to slide off tilted shelves when the cart is in motion. This is a problem. Further, the tilted shelves of such a cart must accommodate totes with different centers of gravity. That is, depending upon the number, type, and configuration of items in a tote, the center of gravity of the tote changes. The tilted shelves of such a cart cannot have shelves at too steep of an angle because totes with a high and/or offset center of gravity could lift and fall off the shelf. Thus, such carts tend to have shelves with a minor tilt, e.g., less than 30 degrees. Further, such carts have the shelves tilted the same direction. In this configuration, the totes are only tilted toward a single side of an aisle. Thus, if two workers were unloading the cart from different lateral sides of the cart, one worker would be on the side opposite the tilt of the shelves. Further, if a single worker had to stock items on shelves on both sides of an aisle, the worker would have to rotate the cart in the aisle so as to face each side of the aisle. During such an operation, the cart would block the aisle and be inconvenient to customers.

There is, therefore, a need for a cart structured to reduce the time and range of motion associated with restocking shelves from a tote disposed on a cart. There is a further need for such a cart to be less inconvenient to customers who are shopping during restocking operations.

SUMMARY OF THE INVENTION

These needs, and others, are met by at least one disclosed and claimed embodiment of a cart including a frame assembly and a number of tote support assemblies. The frame assembly includes a longitudinal axis, a first lateral side and a second lateral side. Each tote support assembly includes a tote support member defining a plane. Each tote support member is movably coupled to the frame assembly wherein each tote support member moves between a number of positions including a level, first position, wherein the plane of the support member is generally horizontal, and a tilted, second position, wherein the plane of the support member is tilted toward one of the frame assembly first lateral side or the frame assembly second lateral side.

It is noted that a tote may be top heavy or unbalanced due to loads disposed therein and may be prone to slide or flip off the tote support member. This would be a problem. Ideally, the angle to the tote support member is not angled to a degree that a tote will slide or tip off the tote support member. In one exemplary embodiment, the tote support member is structured to, and does, have a maximum tilt of between about 20°-150°, or about 10°-75° to either side, or have a maximum tilt of about 15° to either side.

Further, in an exemplary embodiment, the cart has a base with a narrow profile. That is, unlike known "U-boat" carts, the cart has a base with a narrow profile. The wider frame of a "U-boat" cart inherently included handles, i.e., the inverted U-shaped members of the frame assembly. A cart with a narrow profile does not include such handles (which may create a "pinch point" between the handles and the tilting tote support assemblies, which is a problem). As such, the disclosed and claimed concept includes a pull handle on the cart.

The configuration of the cart, as described below, solves the problems stated above.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
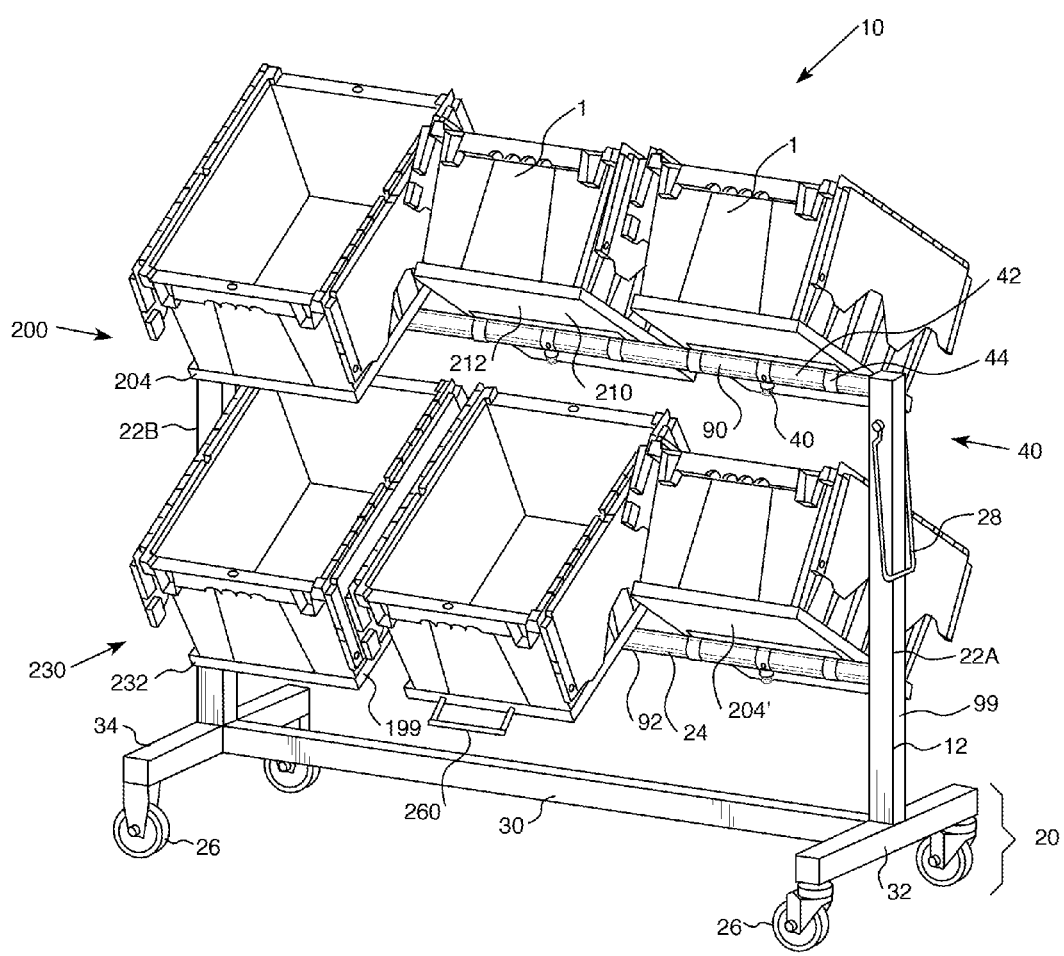
FIG. 1 is a first isometric view of a cart.
Figure 2:
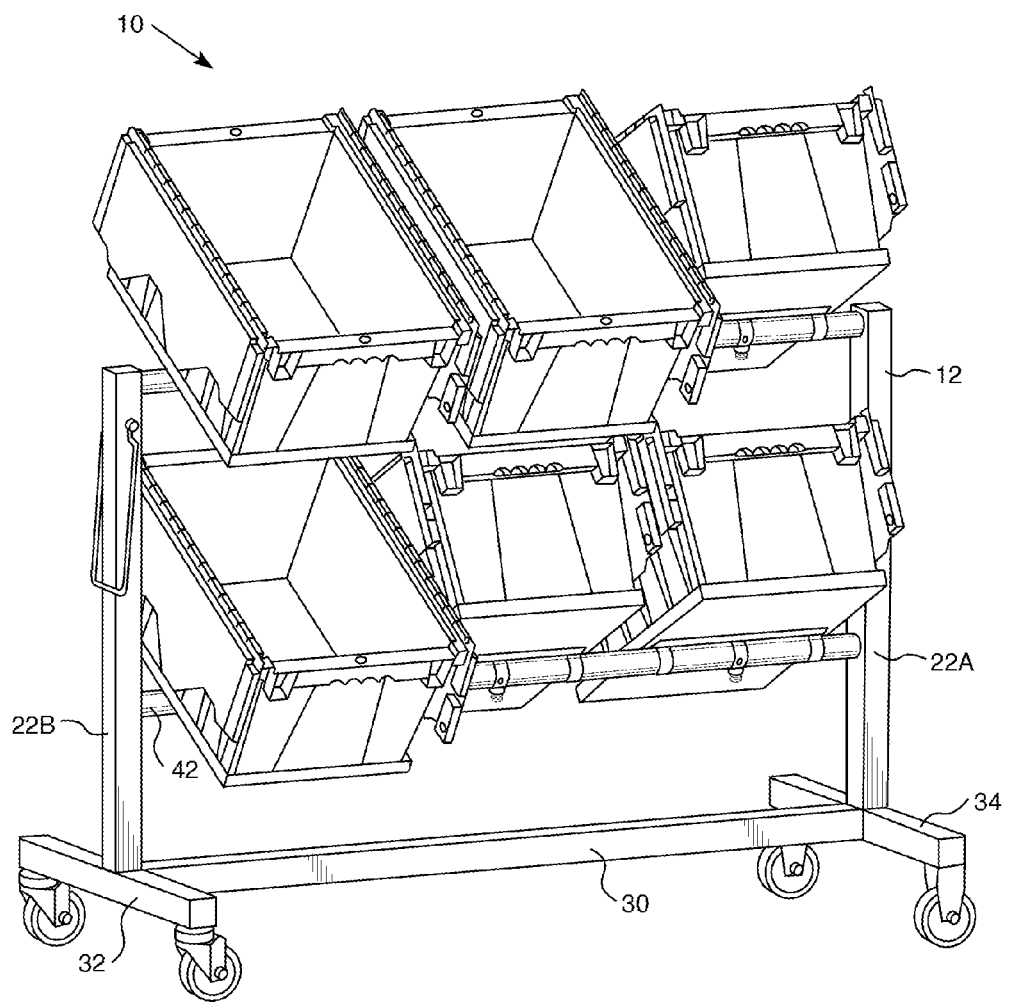
FIG. 2 is a second isometric view of a cart.
Figure 3:
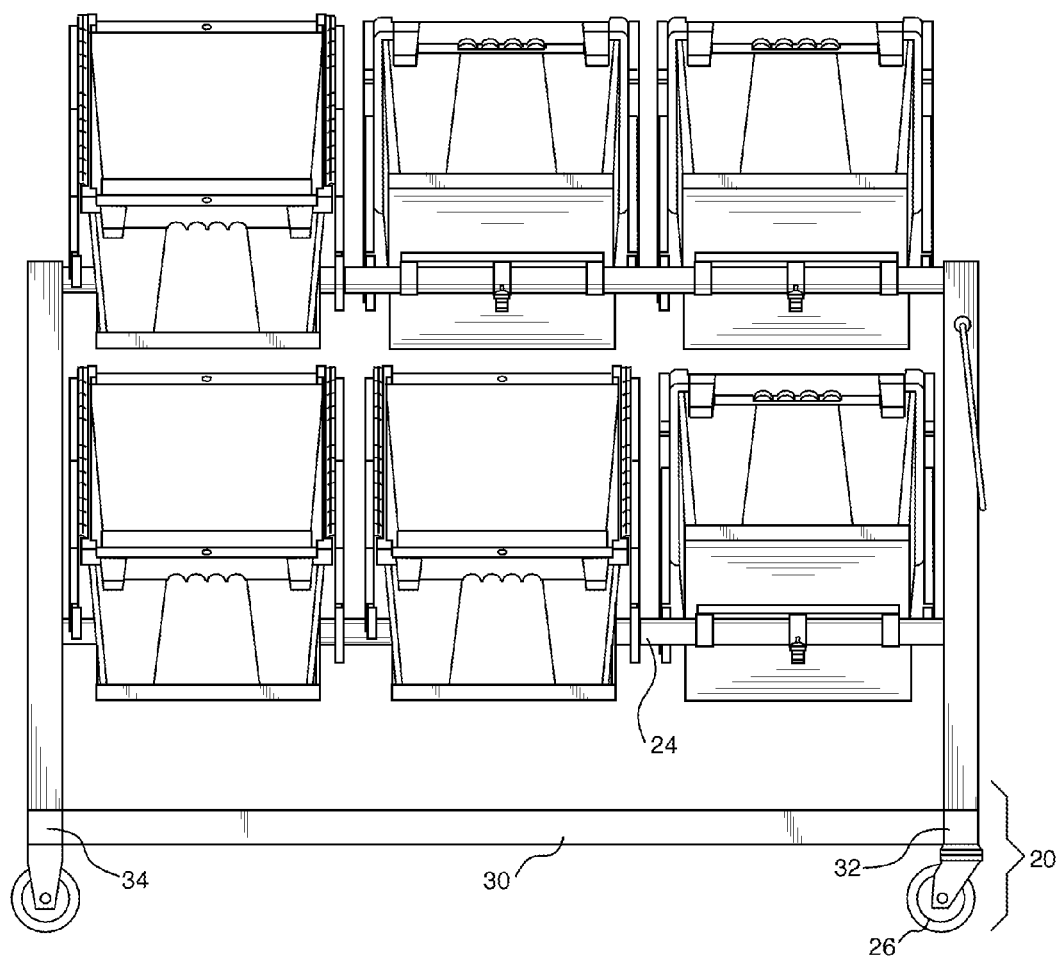
FIG. 3 is a side view of a cart.
Figure 4:
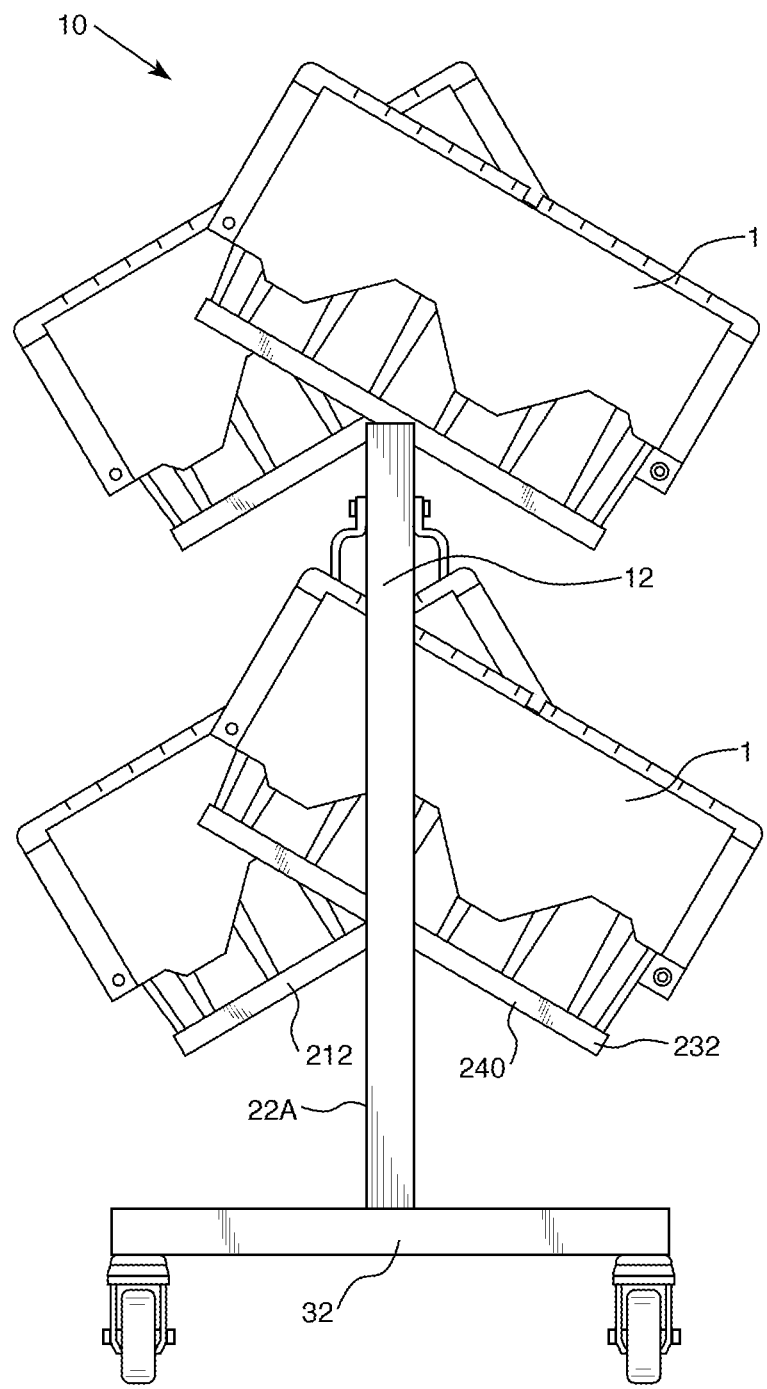
FIG. 4 is an end view of a cart.
Figure 5:
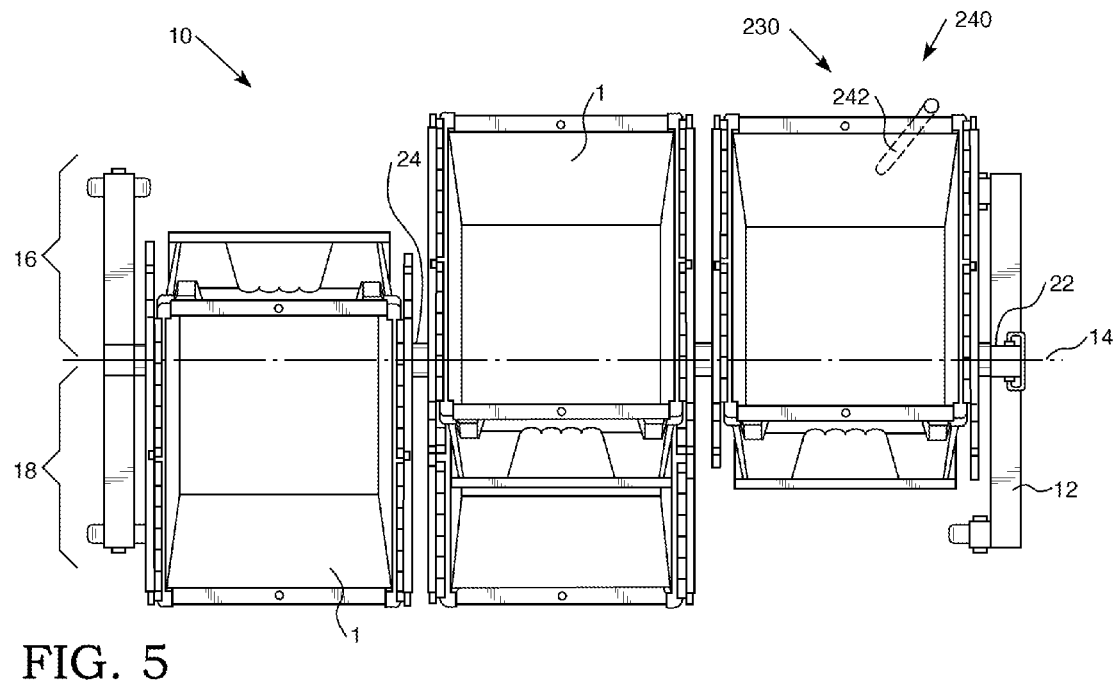
FIG. 5 is a top view of a cart.
Figure 6:
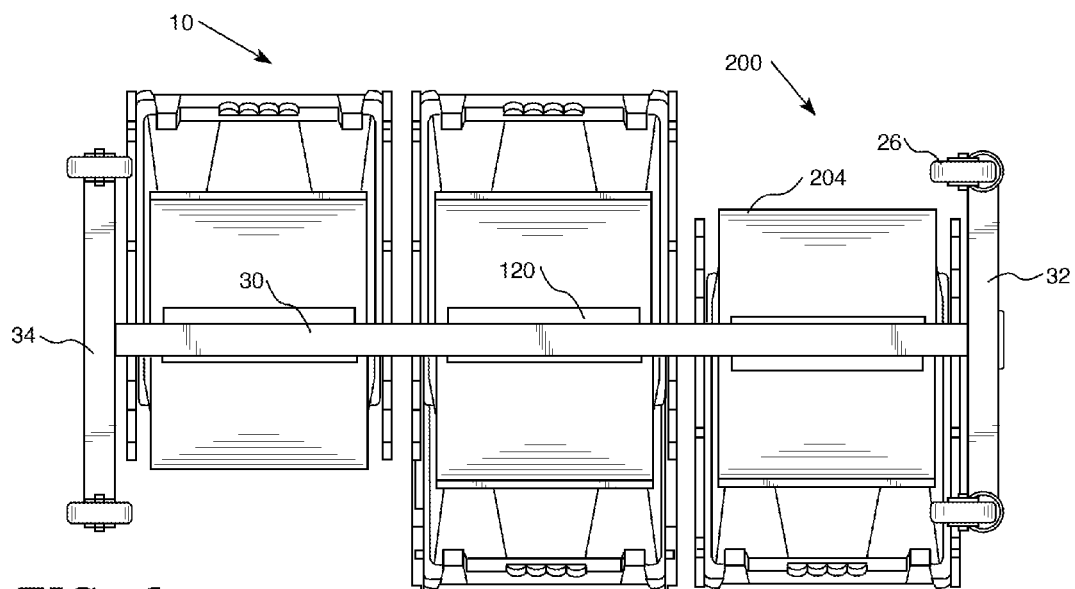
FIG. 6 is a bottom view of a cart.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" means that one component is coupled with another component in an essentially temporary manner. That is, the two components are coupled in such a way that the joining or separation of the components is easy and would not damage the components. For example, two components secured to each other with a limited number of readily accessible fasteners, fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately" relevant to the term being modified as would be understood by one of ordinary skill in the art.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

A cart 10 is shown in FIG. 1. The cart 10 includes a frame assembly 12 and a number of support assemblies 199 which, in an exemplary embodiment, are tote support assemblies 200. A tote support assembly 200 is structured to support a tote 1. As used herein, a "tote" is a reusable, portable enclosure into which a variety of items may be placed for temporary storage and transport. It is understood that "totes" are mass produced. This means that totes of a similar make/model have substantially similar characteristics, i.e., similar dimensions and weight. As is known, a "tote" includes a removable top and/or top flaps that, in an exemplary embodiment, are used to access the interior space of the tote 1. The tote 1 also includes a number of sidewalls and a bottom. The tote 1 sidewalls, in an exemplary embodiment, are tapered wherein the tote has a larger cross-sectional area near the top, or lid, of the tote 1. Further, as is known, totes 1, in an exemplary embodiment, are made from formed plastic, or a poly material, and include features disposed on the surfaces such as, but not limited to, mounting features and/or pockets disposed on the lower surface of the bottom. Further, as used herein, a "standard tote" is a tote 1 with a bottom having a length of about 18⅝ inches and a width of between about 12⅝ to 12⅞ inches.

As used herein, "tote support assembly" 200 is a construct that is structured to support a number of totes 1 in both a level and tilted position or configuration. As totes are used for temporary storage and transport, a tote is not used for display. Accordingly, as used herein, a "tote support assembly" 200 excludes supports, shelves, and similar constructs used for display. That is, a support/shelf structured to display a number of items is not a "tote support assembly" 200. Further, as used herein, a "tote shelf" (not shown) is an elongated, generally planar member that is structured to support multiple totes 1 positioned laterally adjacent each other, i.e., not stacked. A "tote shelf" is a type of tote support assembly 200. A tote shelf moves as, and in an exemplary embodiment is, a unitary body. That is, if a tote shelf tilts or rotates, all totes 1 disposed thereon are tilted in the same direction. A "tote platform" 204 (discussed below), as used herein, is another type of tote support assembly 200 and is structured to support a single tote 1. That is, a tote platform 204 has a size, cross-sectional area, and/or a squared-out cross-sectional area (i.e., maximum length along a first axis*maximum width along a perpendicular second axis) that generally corresponds to a single tote 1. Further, a "standard tote platform" 204' has a size, cross-sectional area, and/or a squared-out cross-sectional area that generally corresponds to a standard tote 1.

The frame assembly 12 includes a longitudinal axis 14, a first lateral side 16 and a second lateral side 18. The frame assembly first lateral side 16 is disposed to one side of a generally vertical plane that encompasses the frame assembly longitudinal axis 14. The frame assembly second lateral side 18 is disposed on the side of the frame assembly longitudinal axis 14 opposite the frame assembly first lateral side 16. The frame assembly 12 further includes a base 20, a number of generally vertical frame members 22 a number of generally horizontal frame members 24, and a number of wheels 26, and in an exemplary embodiment, swivel wheels 26. As used herein, the "base" 20 of a frame assembly is limited to those frame assembly elements disposed at generally the same elevation adjacent the floor below the cart. In an exemplary embodiment, the frame assembly base 20 has a "narrow profile." As used herein, a frame assembly base 20 with a "narrow profile" does not include a planar member having a width approximately the same as the maximum width of the cart 10, or, an elongated, longitudinal frame member that extends from the periphery of one frame assembly lateral side 16 to the other frame assembly lateral side 18, i.e., an angled, elongated member. As is known, the wheels 26 are coupled to the frame assembly 12 at the base 20.

Thus, in an exemplary embodiment, the frame assembly base 20 includes an elongated, longitudinal frame member 30 and two lateral frame members 32, 34. The longitudinal frame member 30 extends generally parallel to the frame assembly longitudinal axis 14. One lateral frame member 32, 34 is disposed at each end of the longitudinal frame member 30. The lateral frame members 32, 34 extend generally horizontally and generally perpendicular to the frame assembly longitudinal axis 14. In an exemplary embodiment, the longitudinal frame member 30 and the lateral frame members 32, 34 are each made from a hollow, generally square tube. It is noted that, by having a narrow profile, the frame assembly base 20 does not occupy an area of the floor as large as the largest cross-sectional area of the cart 10 and is, therefore, less likely to block an aisle. That is, a frame assembly base 20 having a narrow profile solves the problems stated above.

In an exemplary embodiment, the number of generally vertical frame members 22 includes two generally vertical frame members 22A, 22B. One vertical frame member 22A, 22B is disposed at each end of the longitudinal frame member 30. Further, the vertical frame members 22A, 22B are also made from a hollow, generally square tube. It is understood that a frame assembly 12, in an exemplary embodiment, includes additional vertical frame members 22. Further, the description below will discuss a single horizontal frame member 24. It is understood, and as shown, that the frame assembly 12, in an exemplary embodiment, includes additional horizontal frame members 24. Thus, there, in an exemplary embodiment, there are a number of horizontal frame members 24.

The frame assembly 12 further includes a pull handle 28. In an exemplary embodiment, the pull handle 28 moves between a retracted, first position and an extended, second position. The pull handle solves the problem of a cart with elongated vertical frame members 22A, 22B not defining a convenient handle. That is, the prior art inverted U-shaped members of a cart frame assembly inherently created a handle for the cart. As used herein, elongated vertical frame members 22A, 22B do not act as a "handle." As used herein, a "handle" is an element that is structured to be grasped by a human hand and/or finger(s). Thus, a "handle" is sized, shaped, and positioned, to be grasped by a human hand and/or finger(s). An element that is merely capable of being grasped by a human hand but which is not sized, shaped, and positioned, to be grasped by a human hand is not a "handle." Stated alternately, as used herein, elongated vertical frame members 22A, 22B are not capable of being a handle or are not capable of being used as a handle.

The support assemblies 199, and in an exemplary embodiment, the tote support assemblies 200 include a number of movable couplings 40. The movable couplings 40 are structured to, and do, movably couple the other elements (such as, but not limited to the tote support member 210, described below) of the support assemblies 199, and in an exemplary embodiment, the tote support assemblies 200, to the frame assembly 12. Each movable coupling 40 includes a fixed element 42 and a movable element 44. Each movable coupling fixed element 42 is fixed to a horizontal frame member 22, 24. Each movable coupling movable element 44 is coupled to a tote support assemblies 200. In this configuration, each movable coupling 40 is structured to, and does, movably couple each tote support assembly 200 to the frame assembly 12 wherein each tote support member 210 (described below) moves between a number of positions including a level, first position, wherein the plane of the support member 210 is generally horizontal, and a tilted, second position, wherein the plane of the support member 210 is tilted toward one of the frame assembly first lateral side 16 or the frame assembly second lateral side 18. In an exemplary embodiment, each tote support member 210 is movably coupled to the frame assembly 12 wherein each tote support member 210 moves between a number of positions including a level, first position, wherein the plane of the support member 210 is generally horizontal, a tilted, first lateral position, wherein the plane of the support member 210 is tilted toward the frame assembly first lateral side 16, and a tilted second lateral position, wherein the plane of the support member 210 is tilted toward the frame assembly second lateral side 18.

In one exemplary embodiment, the movable couplings 40 include an axle 50 (which is a fixed element 42) and a shell 52 (which is a movable element 44) disposed about the associated axle 50. In this embodiment, the axle 50 has a generally circular cross-section. Further, the axle 50 is a generally horizontal frame member 24 which is coupled, directly coupled, or fixed to a number of the vertical frame members 22. That is, in an exemplary embodiment, the axle 50 extends generally horizontally between vertical frame members 22A, 22B. Alternatively, in an embodiment not shown, the axle 50 includes two axle segments, each of which are generally circular rods, each extending from one vertical frame member 22A, 22B.

The shell 52 is also a generally horizontal frame member 24. The shell 52, i.e., a horizontal frame member 24, is rotatably disposed about the axle 50. The tote support assemblies 200 are coupled, directly coupled, or fixed to the shell 52 by a bracket 53 that does not have a slot 126, discussed below. Thus, the tote support assemblies 200 are movable relative to the axle 50 and vertical frame members 22A, 22B. Thus, each shell 52, i.e., each rotatable horizontal frame member 24, moves between a number of orientations including a first orientation, wherein the plane of a tote support member 210 (discussed below) is generally horizontal, and a second orientation, wherein the plane of a tote support member 210 is tilted toward one of the frame assembly first lateral side 16 or the frame assembly second lateral side 18. As used herein, a tote support member 210 is "tilted toward" an identified side when a line normal to, and extending from, the upper surface of the tote support member 210, or a plane generally defined by the tote support member 210, extends toward the identified side. It is noted that, depending upon where such a line is drawn, portions of the line may exist on both sides 16, 18 of the cart 10, but the line only extends "toward," i.e., in the direction of, a single side. Stated alternately, a tote support member 210 is "tilted toward" an identified side 16, 18 of the cart 10 if the distal tip of a nearly infinite line extending from, and normal to, the upper surface of the tote support member 210, or a plane generally defined by the tote support member 210, is on that side 16, 18, of the cart 10.

In this embodiment, the frame assembly 12 further includes a locking assembly 60. The locking assembly 60 is structured to temporarily fix the tote support member 210 in a selected position. In an exemplary embodiment, each shell 52, i.e., each rotating horizontal frame member 24, includes a locking assembly 60. The locking assemblies 60 are substantially similar and only one will be described. In an exemplary embodiment, a locking assembly 60 includes a first component 62 and a second component 64. The locking assembly first component 62 is fixed relative to a vertical frame member 22. In an exemplary embodiment, the locking assembly first component 62 is fixed and directly coupled to axle 50. The locking assembly second component 64 is fixed to one of the rotatable horizontal frame member 24, i.e., shell 52. The locking assembly second component 64 is selectively configurable relative to the locking assembly first component 62 wherein, in a first configuration, the locking assembly second component 64 is fixed to the locking assembly first component 62, and, in a second configuration, the locking assembly second component 64 is movable relative to the locking assembly first component 62.

In an exemplary embodiment, the locking assembly first component 62 is a plate 70 including a number of openings 72 disposed over an arc. The locking assembly second component 64 includes a movable protrusion 74. As shown, the movable protrusion 74 is an assembly including a pin 76, a mounting 78, and a spring 80. The pin 76 is movably coupled to the mounting 78. The pin 76 moves between an extended first position, and a withdrawn second position. The spring 80 is coupled to both the pin 76 and the mounting 78. The spring 80 biases the pin 76 to the first position. The mounting 78 is fixed to a shell 52 at a location adjacent the plate 70. In this configuration, when the pin 76 is in the first position, the pin 76 extends through one of the plate openings 72. The locking assembly second component movable protrusion 74 is structured to be selectively coupled to one of the locking assembly first component openings 72. Further, in an exemplary embodiment, the plate includes two stops 89, which are shown as lugs 91, disposed on either side of the plate openings 72. In this configuration, the mounting 78 will contact the stops 89, 91 when the locking assembly second component 64, or tote support assembly 200, is rotated to a maximum tilt position, as discussed below.

In another embodiment, not shown, the locking assembly 60 includes two plates with one plate including a number of openings or detents disposed over an arc and another plate including a number of protrusions, alternatively identified as "balls" (as in a "ball-and-detent" locking assembly). The balls are structured to align with the number of openings or detents. The two plates are mounted immediately adjacent to each other so that the balls are disposed in the detents. The balls are biased toward the detents, but the bias force is structured to be overcome so that the plates rotate relative to each other. For example, each ball, in an exemplary embodiment, is mounted on a spring assembly and is movable between an extended position and withdrawn position. Alternatively, the plates are be biased against each other. When this bias is overcome, the plates separate and are rotated relative to each other.

It is understood that, in an embodiment that is not shown, there is a shell 52 associated with each tote platform 204 and there are multiple shells 52 disposed on a single axle 50. In this embodiment, there is a locking assembly 60 for each tote platform 204. Alternatively, multiple platforms may be fixed to a single shell 52. In this embodiment, there is a single locking assembly 60 for each shell 52.

In another alternate embodiment, not shown, the locking assembly 60 includes a rack having a plurality of teeth and a pawl. As is known, and in a manner similar to a socket wrench, the pawl is structured to lock when moved in one direction relative to the teeth, and, to move over the teeth when moved in the opposite direction relative to the teeth. Again, as in a socket wrench, the locking/passing over direction of the pawl may be reversed.

In another embodiment, the movable couplings 40 include a number of fixed horizontal frame members 24 that extend between vertical frame members 22A, 22B. That is, the fixed horizontal frame members 24 are, as used herein, part of the frame assembly 12 as well as the movable couplings 40. That is, the fixed horizontal frame member 24 is the movable coupling fixed element 42. In an exemplary embodiment, the number of fixed horizontal frame members 24 include a fixed, generally circular, first horizontal frame member 90 and a fixed, generally circular, second horizontal frame member 92. Each fixed horizontal frame member 90, 92 includes a number of extensions 99. The extensions 100 extend generally radially from each fixed horizontal frame member 90, 92. In an exemplary embodiment, not shown, the extensions extend generally vertically and downwardly from each fixed horizontal frame member 90, 92. That is, the extensions are the vertical frame members 22 to which the horizontal frame member 24, i.e., fixed horizontal frame members 90, 92, are coupled, directly coupled, or fixed. It is noted that the fixed horizontal frame members 90, 92 have a sufficient spacing so as to allow a tote 1 to be placed on a tote platform 204, described below, on the lower fixed horizontal frame member 92 without interference from the upper fixed horizontal frame member 90.

In an exemplary embodiment, each horizontal frame member 24 is coupled, directly coupled, or fixed to the vertical frame members 22 by an "orienting coupling" 400. As used herein, an "orienting coupling" 400 is a coupling that orients the horizontal frame members 24 in the desired orientation. While only one orienting coupling 400 is shown, it is understood that an orienting coupling 400 is disposed at each end of a horizontal frame member 24. As discussed below, the movable couplings 40 includes an extension 100, such as a bolt 101, extending through arcuate slot 126. When a tote support assembly 200 (discussed below) is structured to tilt to either lateral side of the cart 10, and when the tote support assembly 200 is generally horizontal, the bolt 101 is disposed generally in the middle of the arcuate slot 126 and extends generally vertically. The orienting coupling 400 is structured so that when the horizontal frame members 24 are coupled to the vertical frame members 22 the bolt 101 (or other coupling for the tote support assemblies 200) is in the proper orientation.

Figure 29:
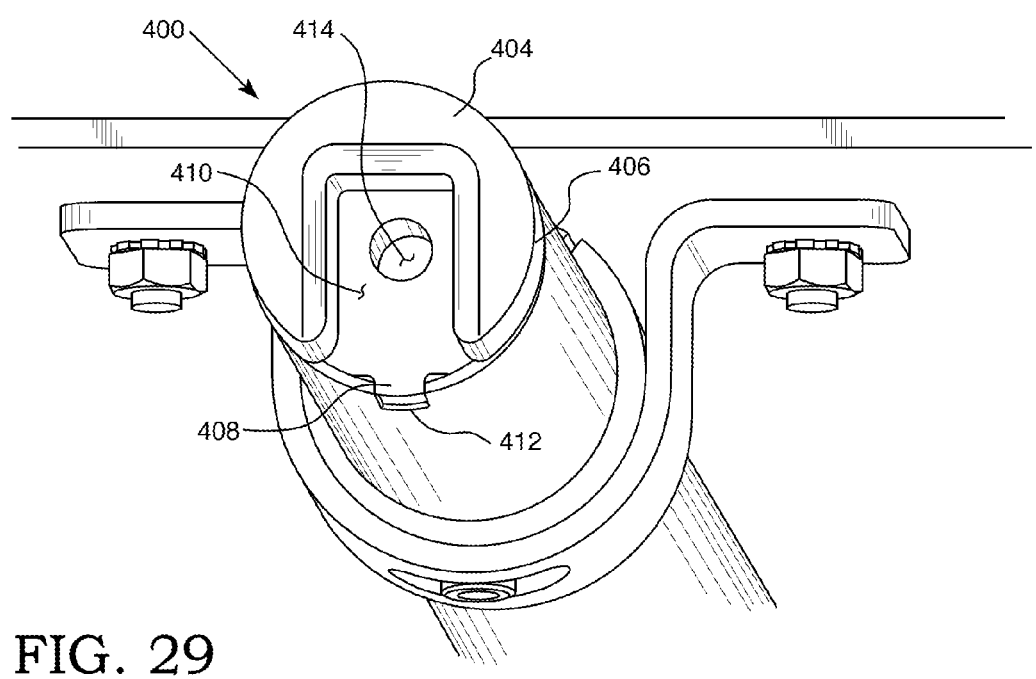
FIG. 29 is an isometric view of an orienting coupling.
Figure 30:
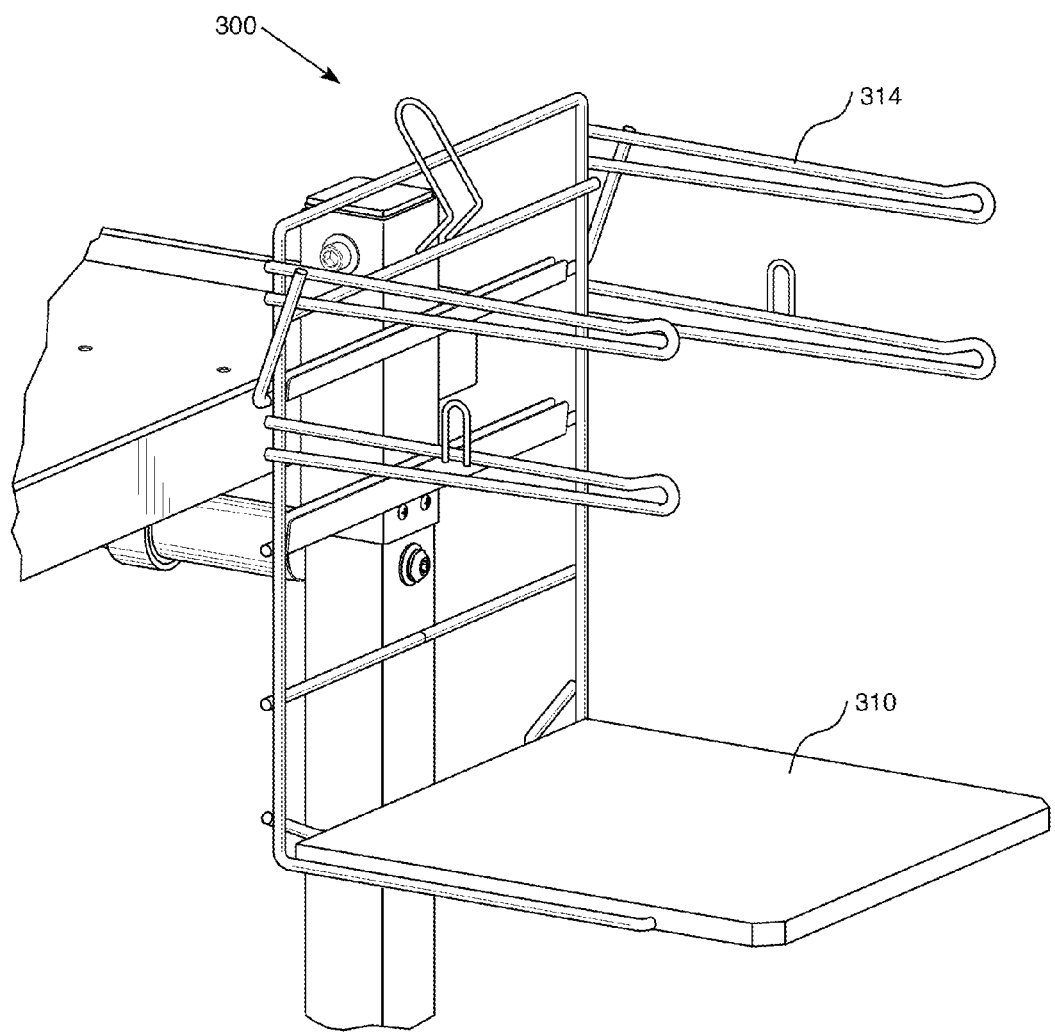
FIG. 30 is an isometric view of use features.
Figure 31:
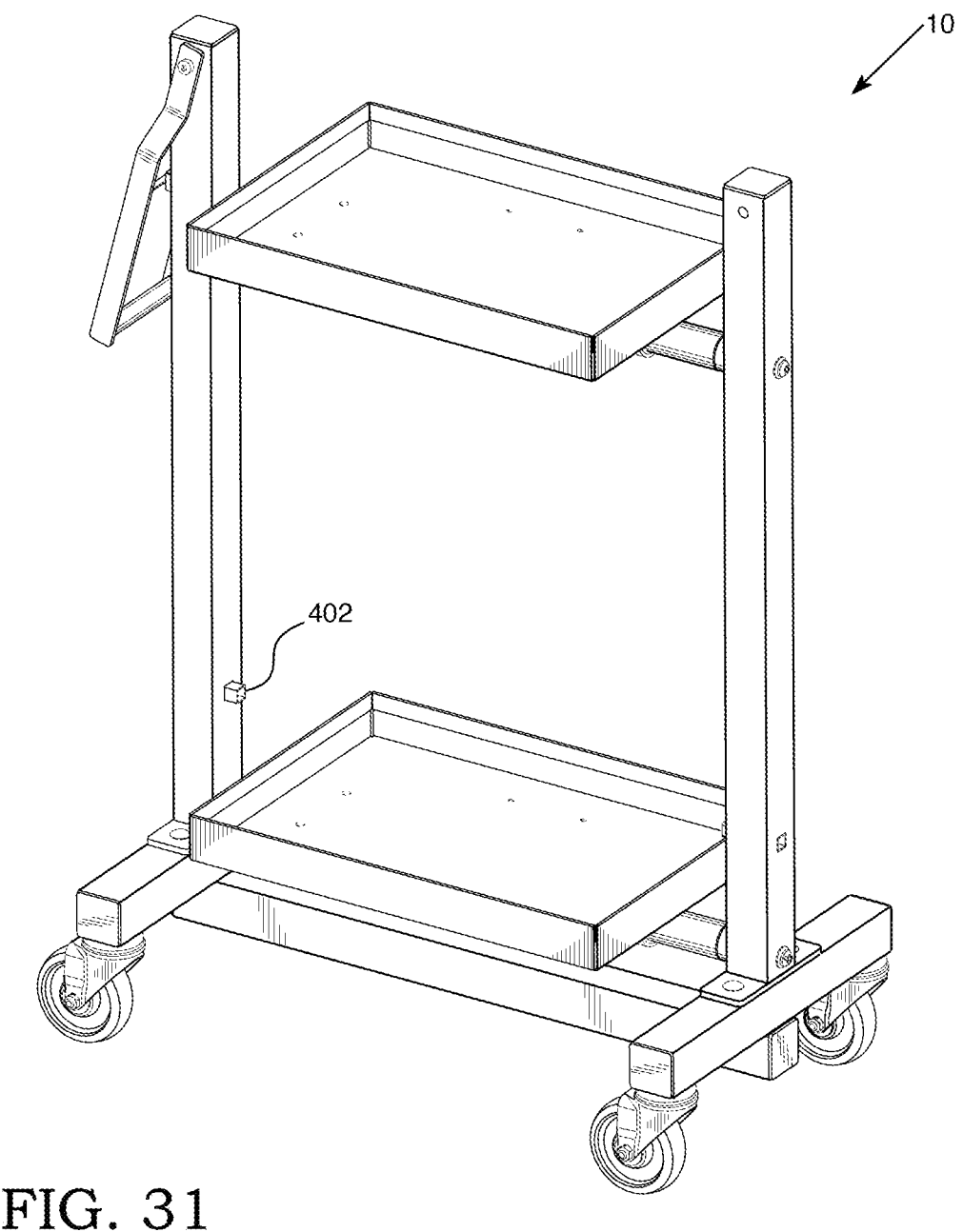
FIG. 31 is an isometric view of another embodiment.
Figure 32:
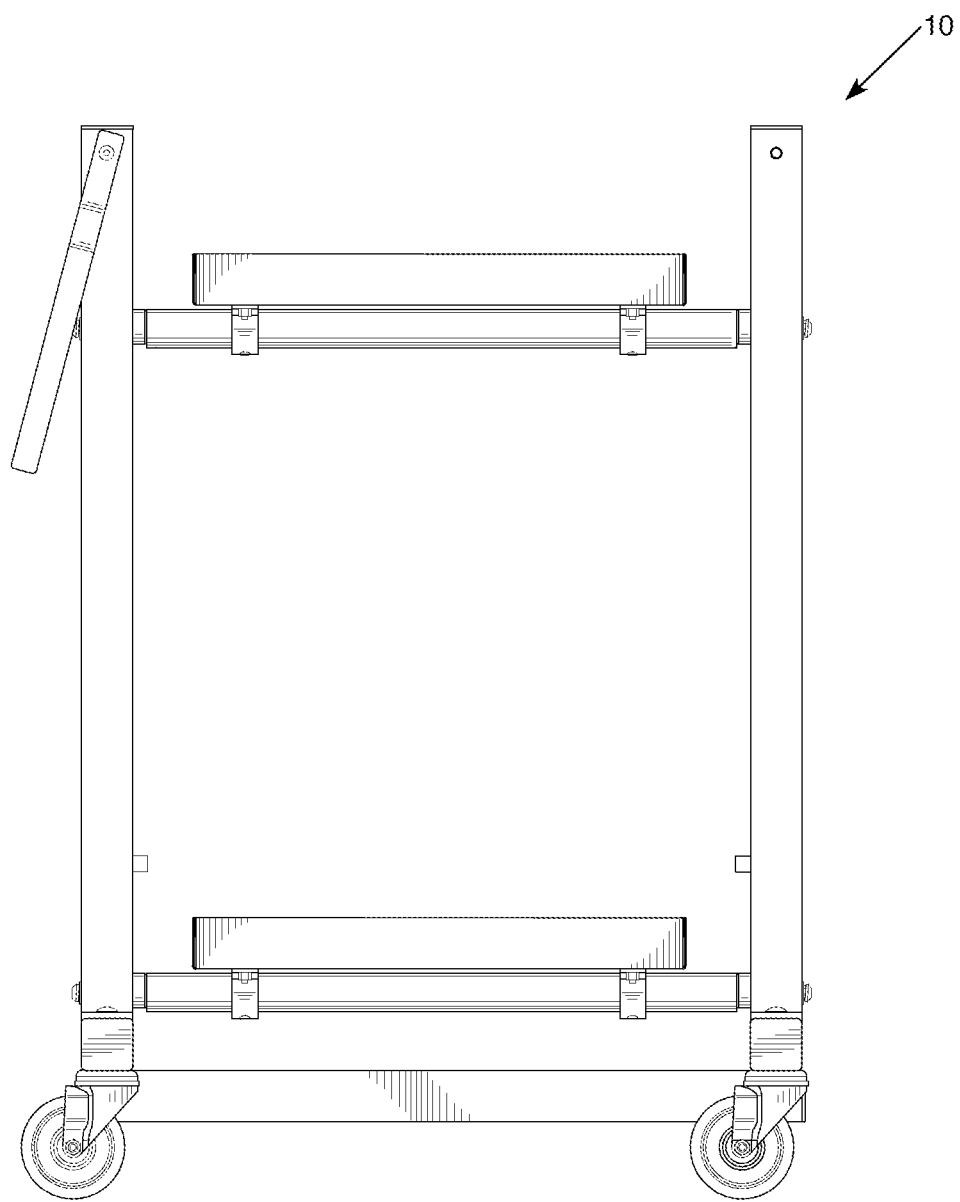
FIG. 32 is a right side view of another embodiment.
Figure 33:
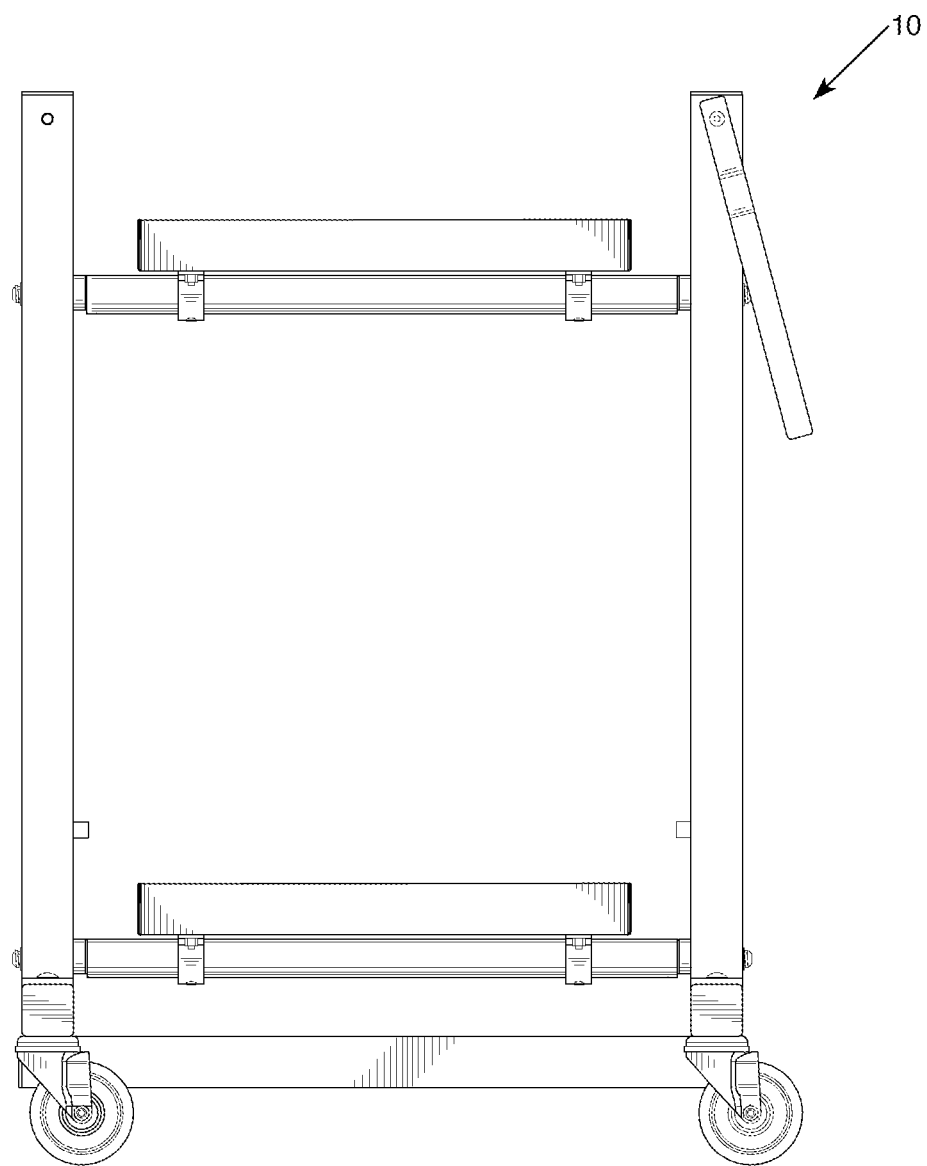
FIG. 33 is a left side view of another embodiment.
Figure 34:
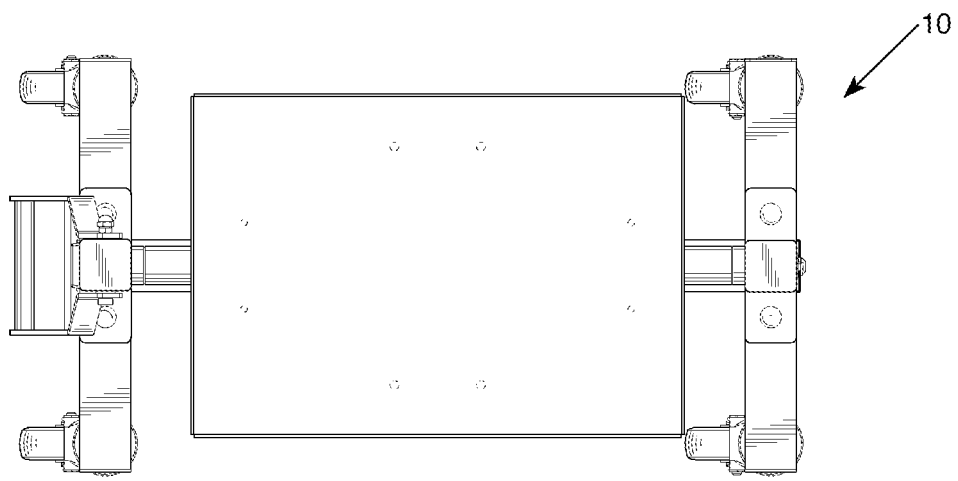
FIG. 34 is a top view of another embodiment.
Figure 35:
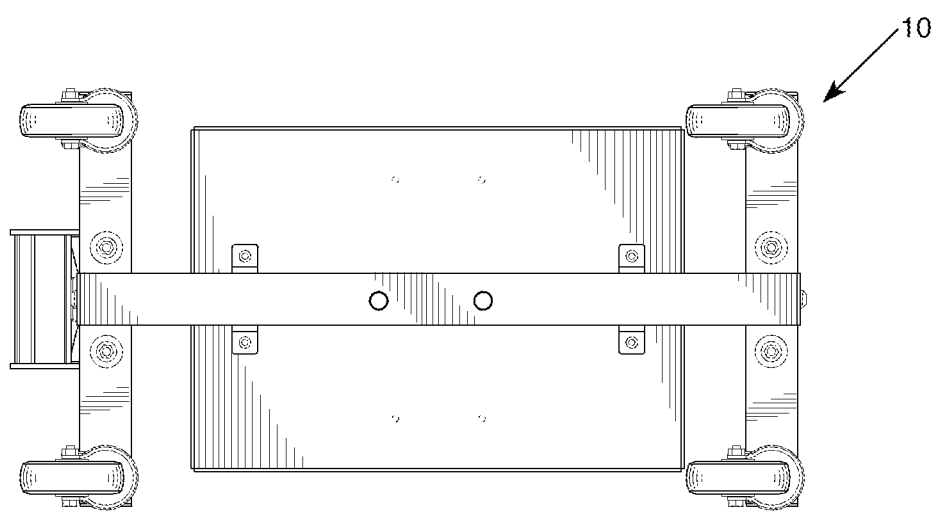
FIG. 35 is a bottom view of another embodiment.
Figure 36:
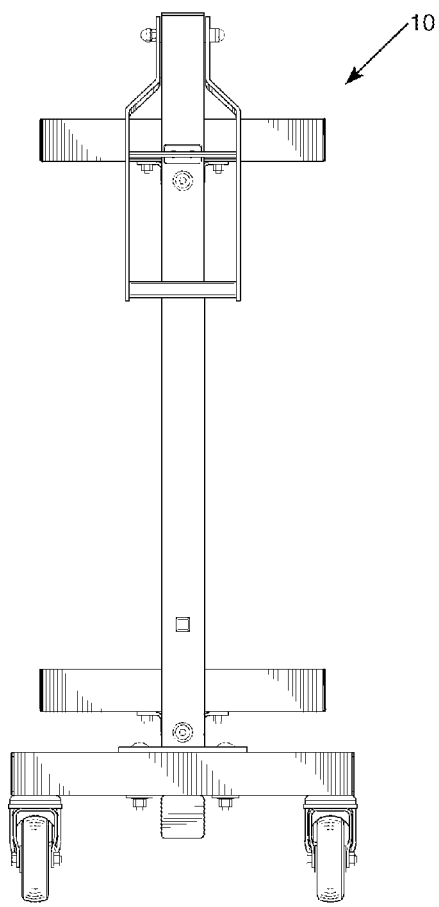
FIG. 36 is a front view of another embodiment.
Figure 37:
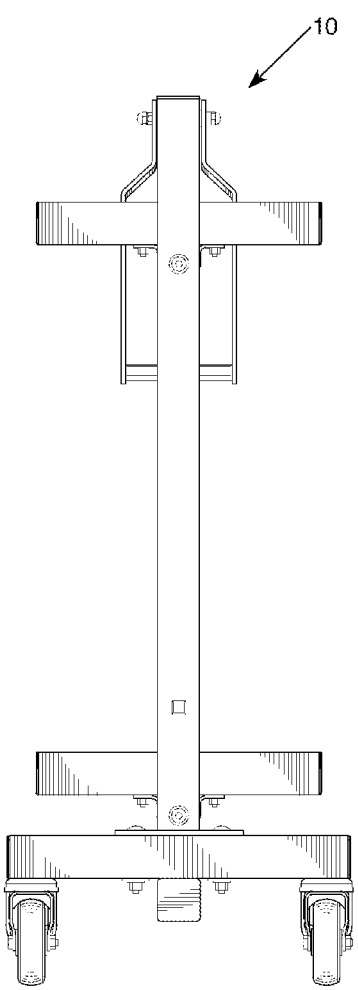
FIG. 37 is a rear view of another embodiment.
Figure 38:
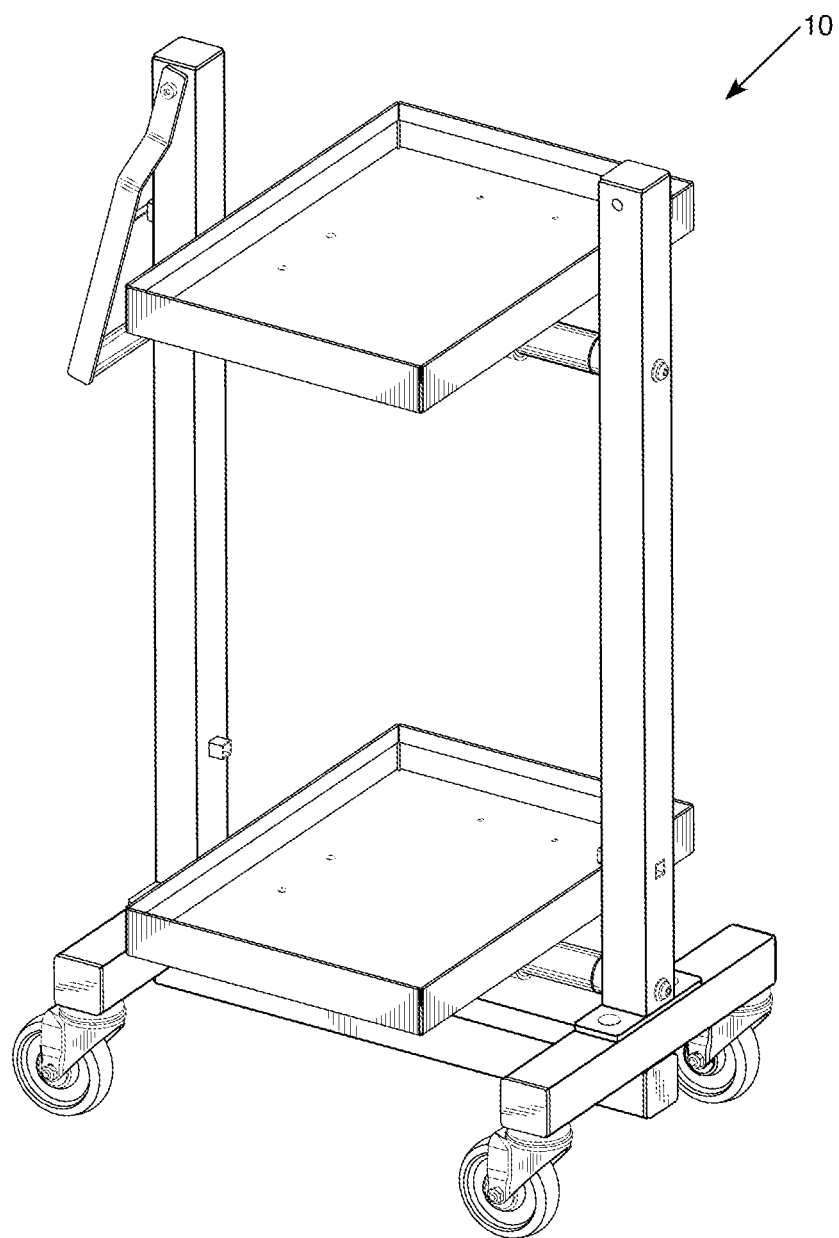
FIG. 38 is an isometric view of another embodiment.
Figure 39:
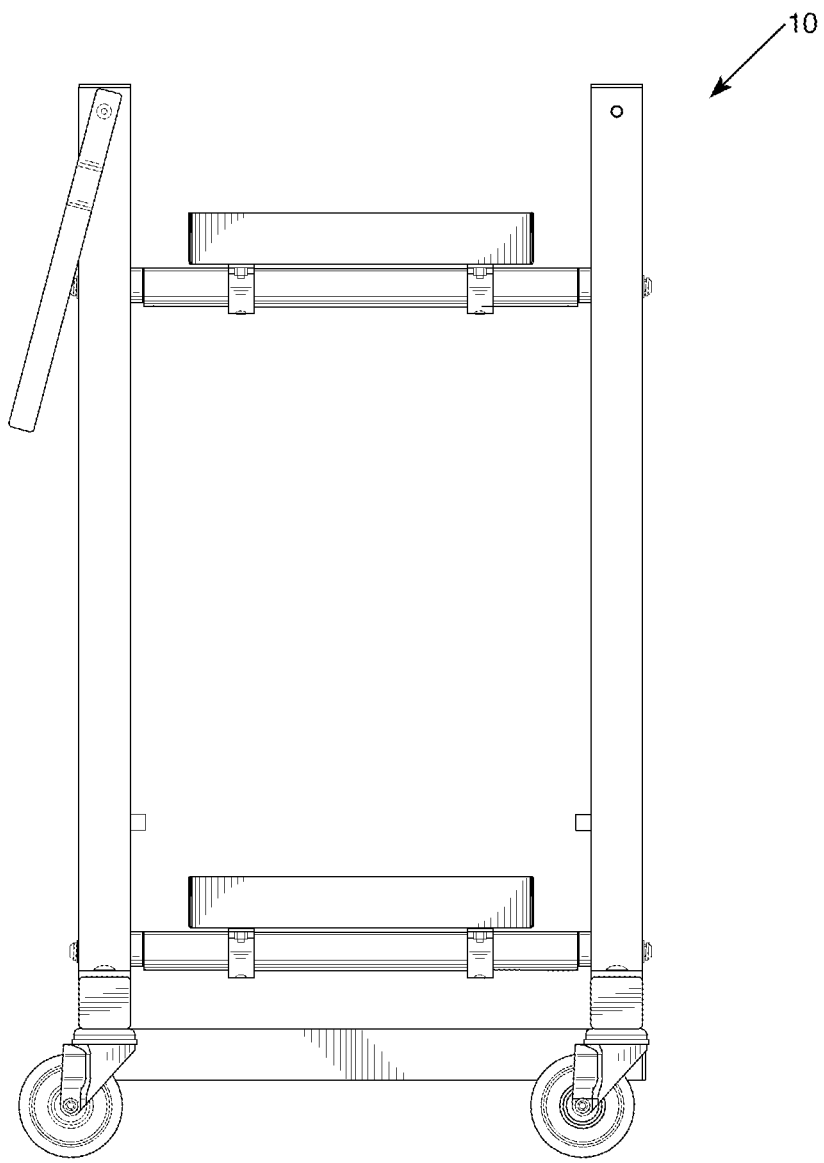
FIG. 39 is a right side view of another embodiment.
Figure 40:
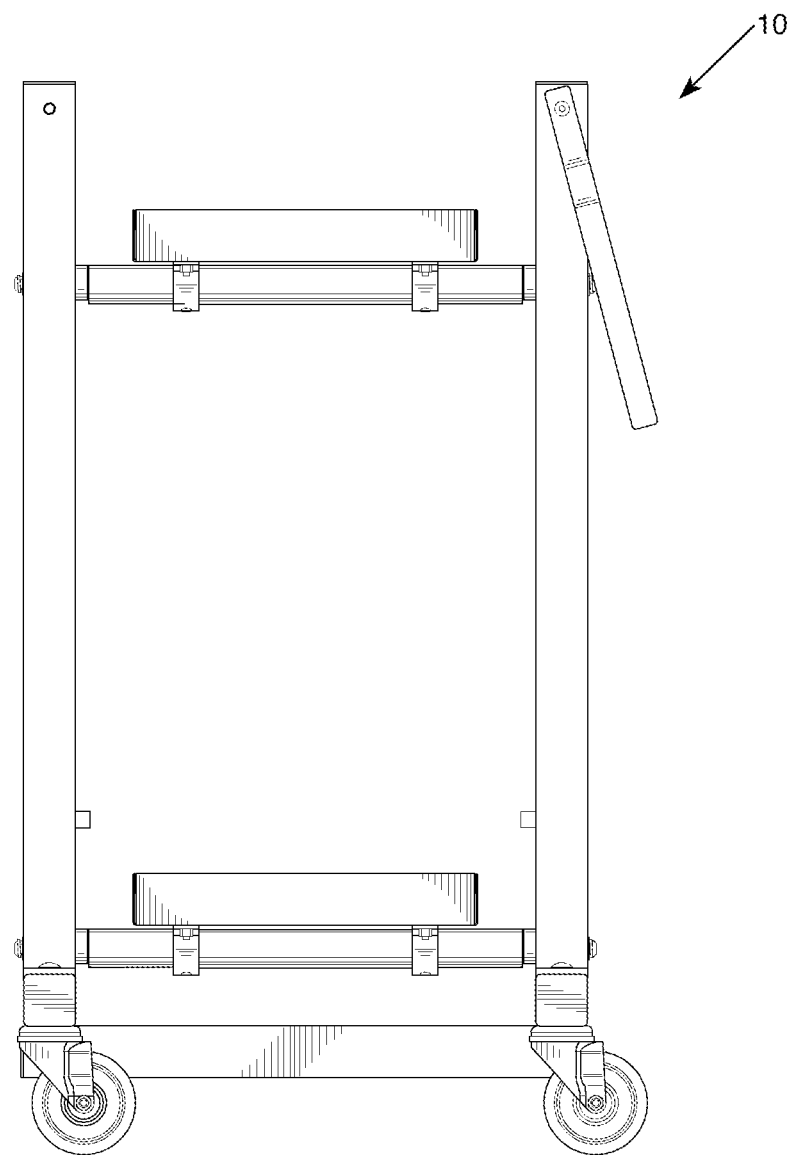
FIG. 40 is a left side view of another embodiment.
Figure 41:
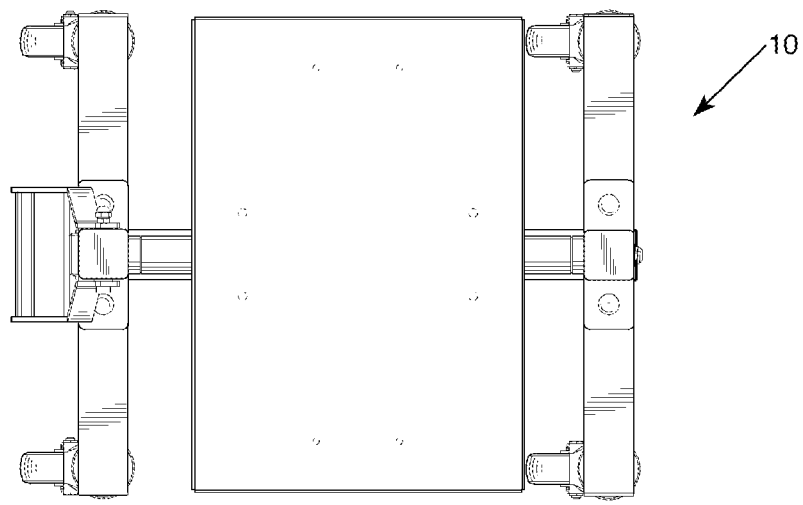
FIG. 41 is a top view of another embodiment.
Figure 42:
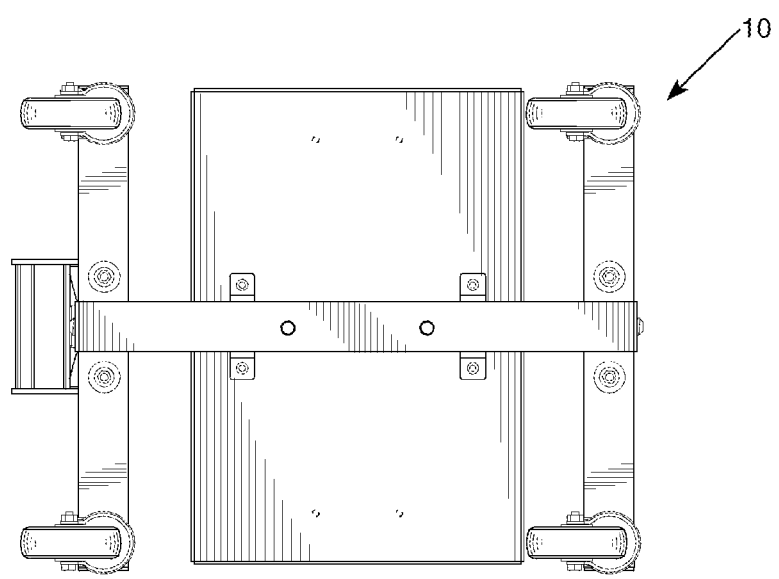
FIG. 42 is a bottom view of another embodiment.
Figure 43:
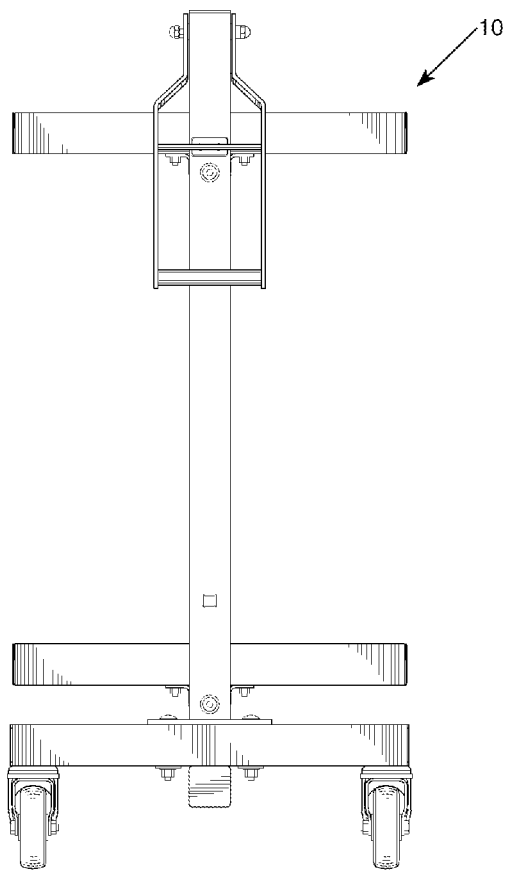
FIG. 43 is a front view of another embodiment.
Figure 44:
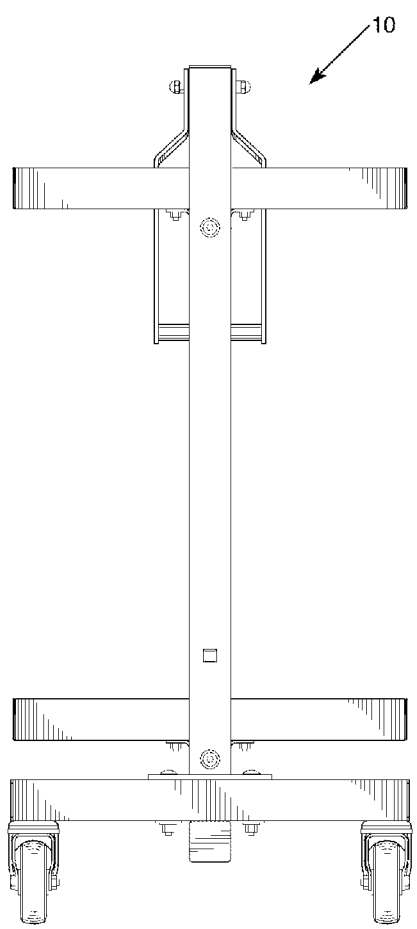
FIG. 44 is a rear view of another embodiment.
Figure 45:
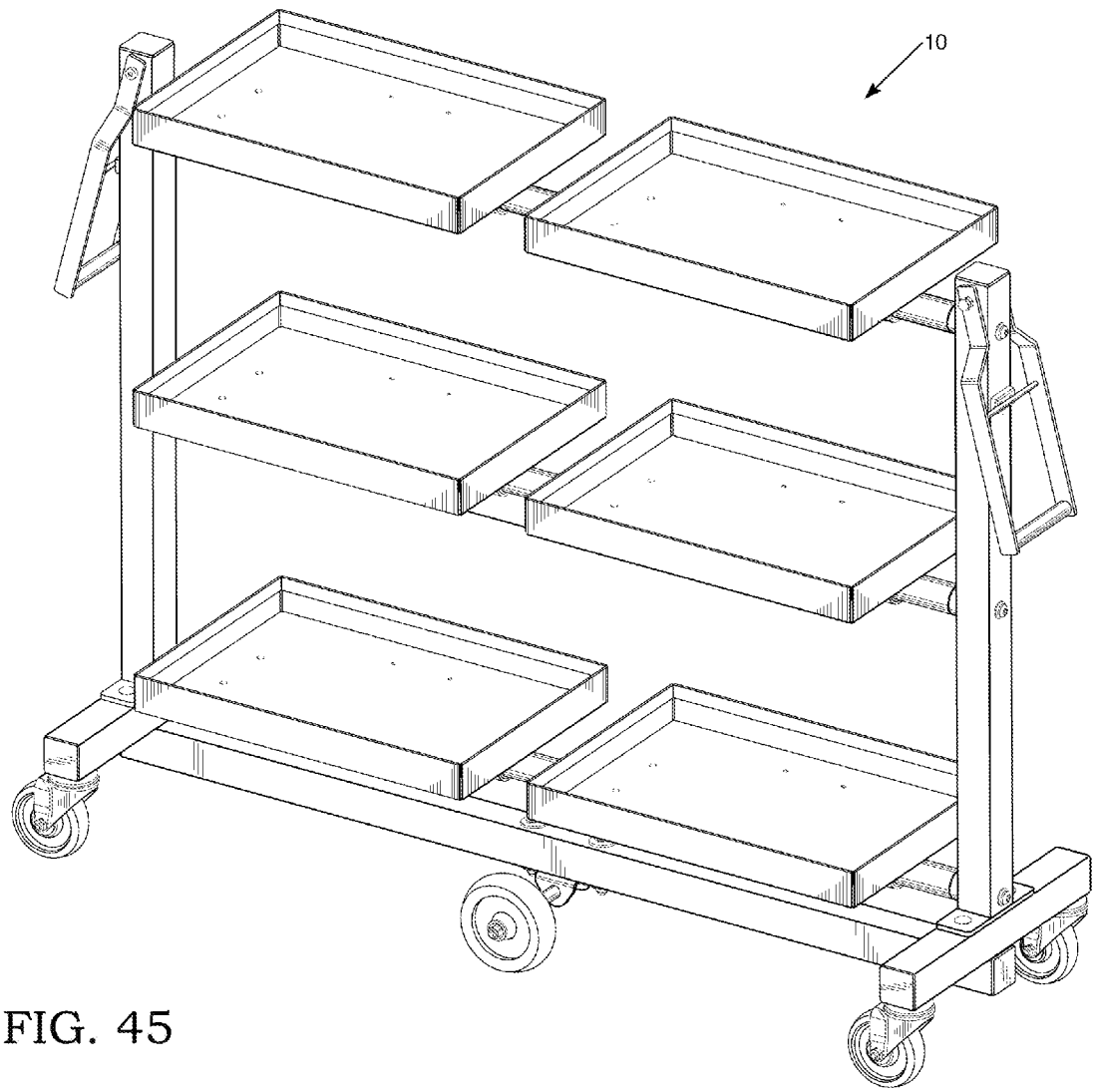
FIG. 45 is an isometric view of another embodiment.
Figure 46:
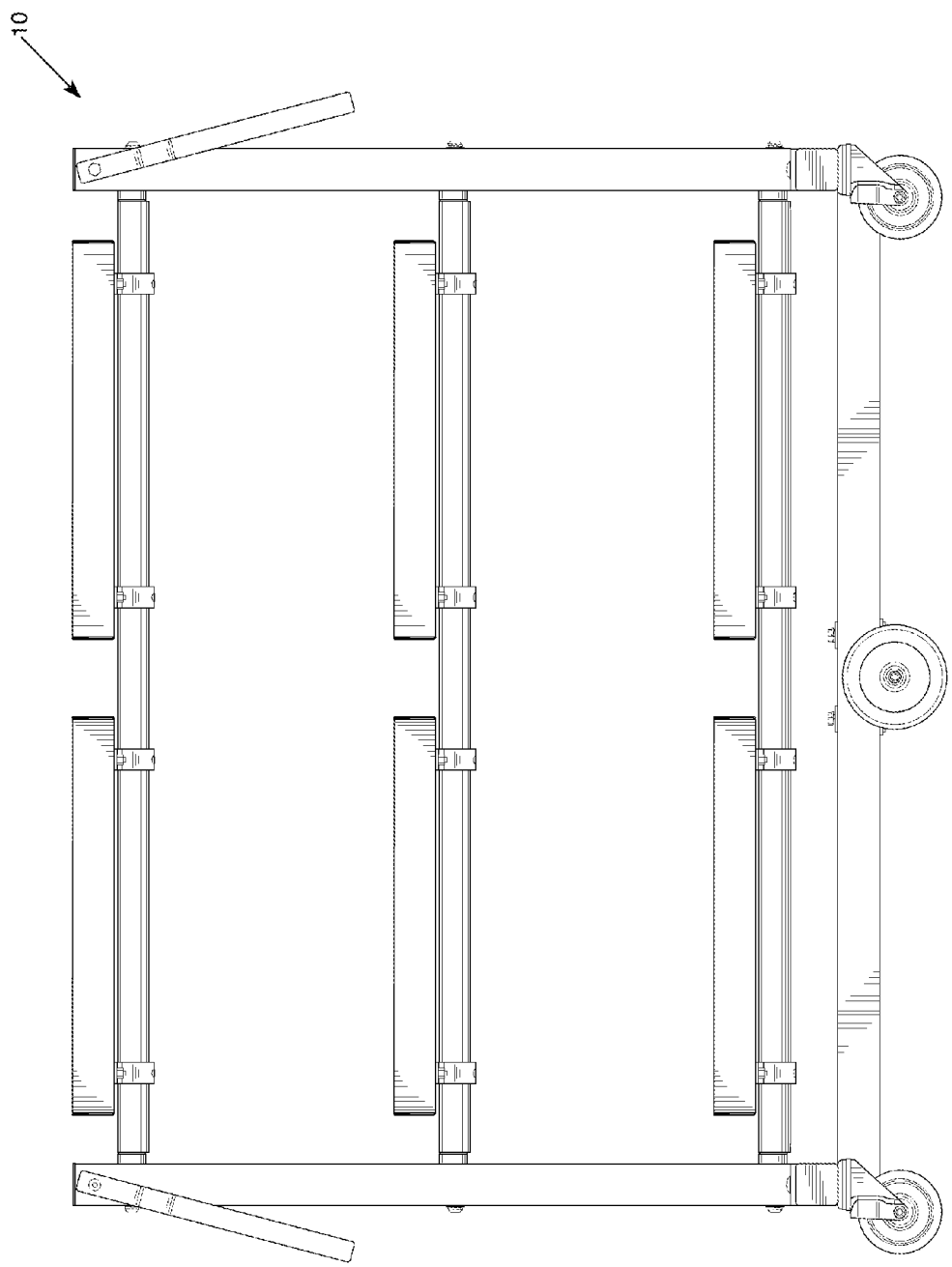
FIG. 46 is a right side view of another embodiment.
Figure 47:
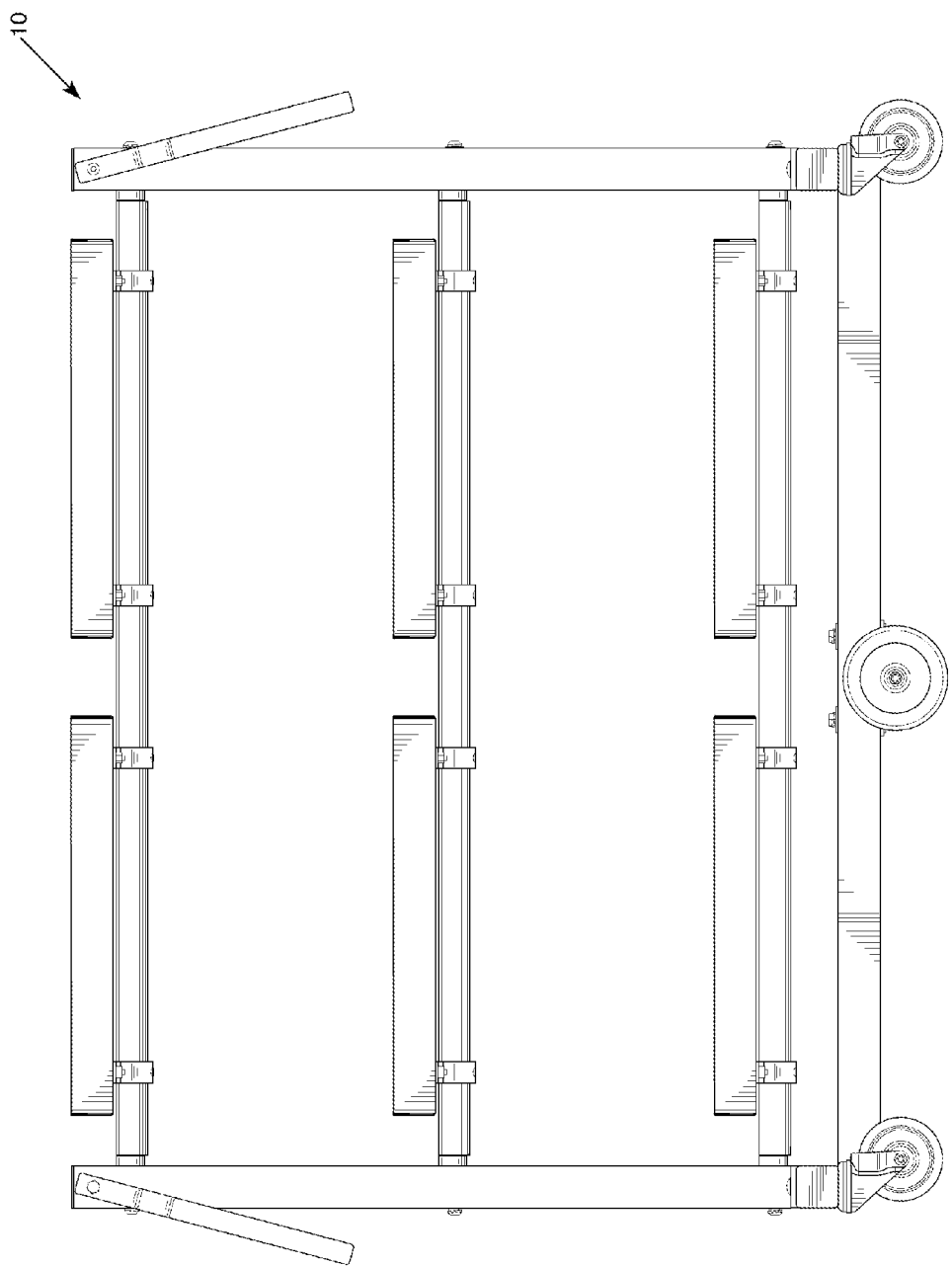
FIG. 47 is a left side view of another embodiment.
Figure 48:
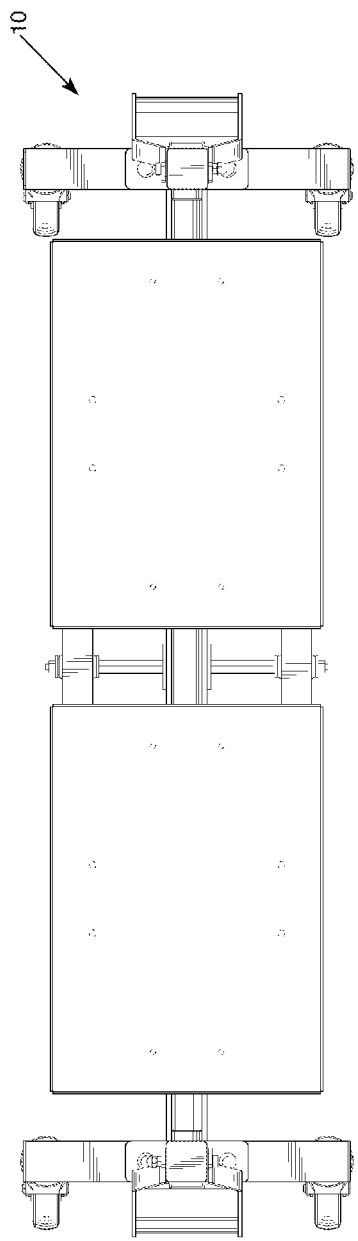
FIG. 48 is a top view of another embodiment.
Figure 49:
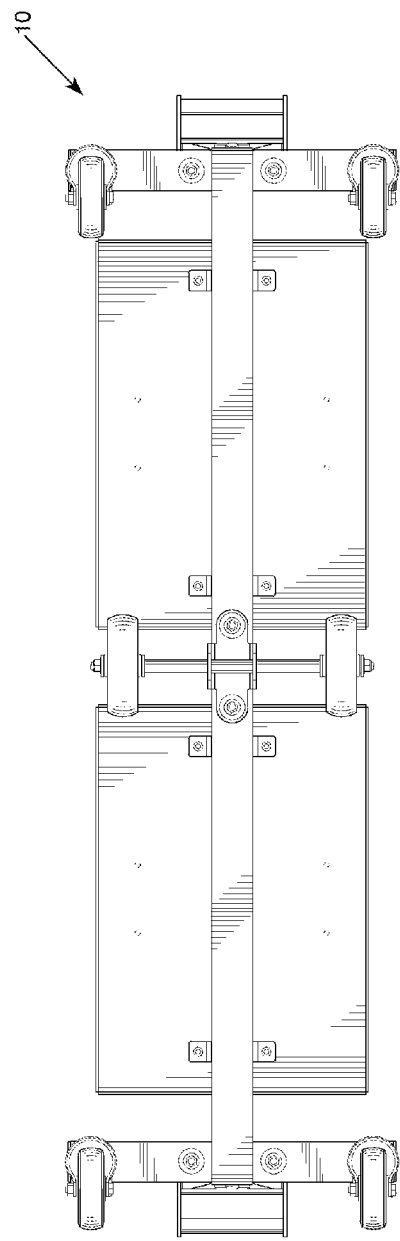
FIG. 49 is a bottom view of another embodiment.
Figures 50, 51:
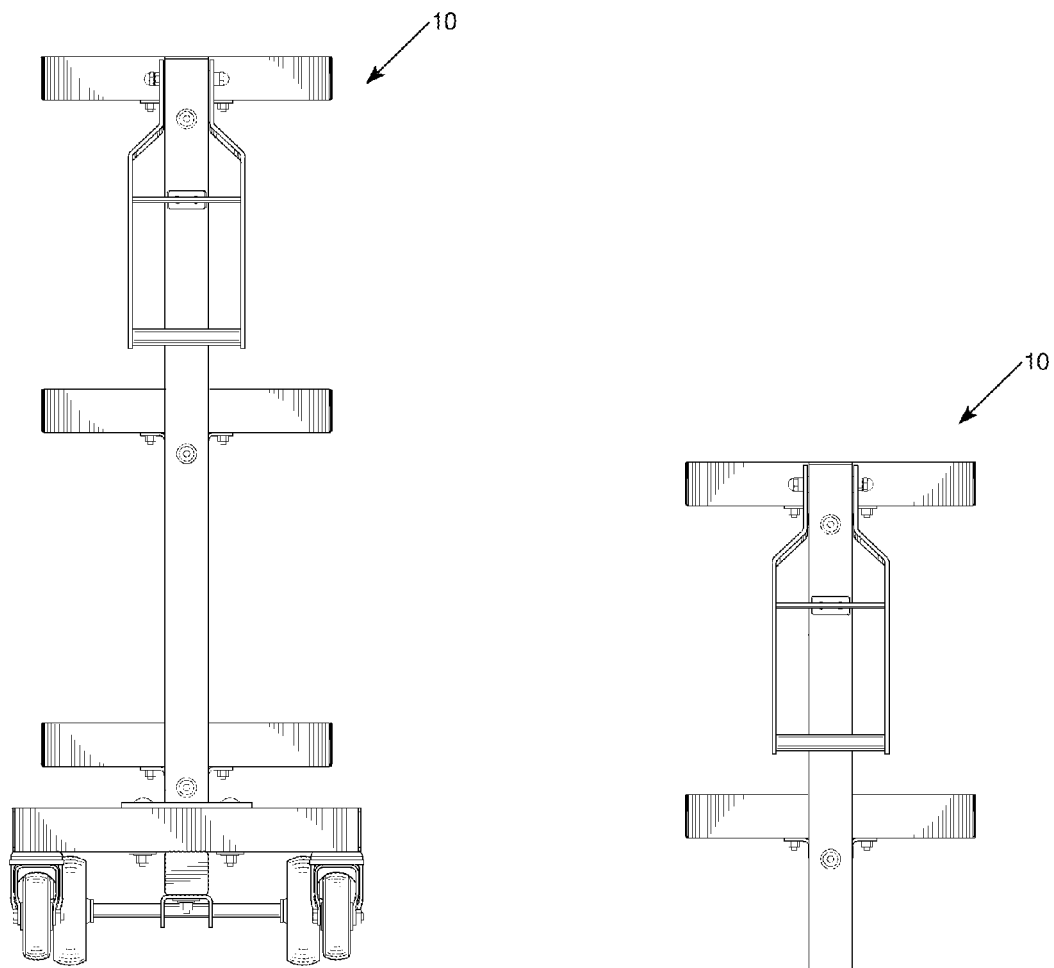
FIG. 50 is a front view of another embodiment.
FIG. 51 is a rear view of another embodiment.
Figure 52:
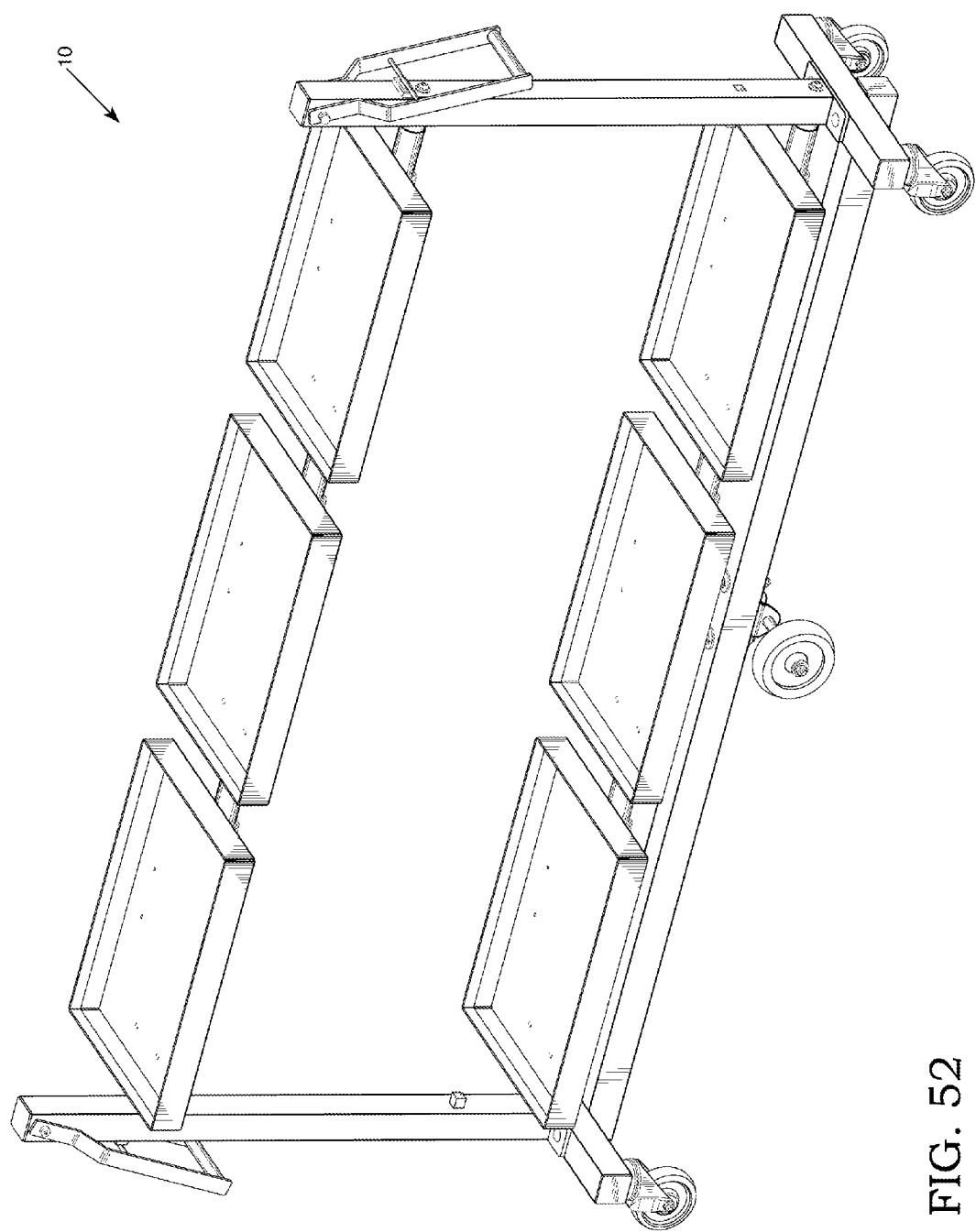
FIG. 52 is an isometric view of another embodiment.
Figure 53:
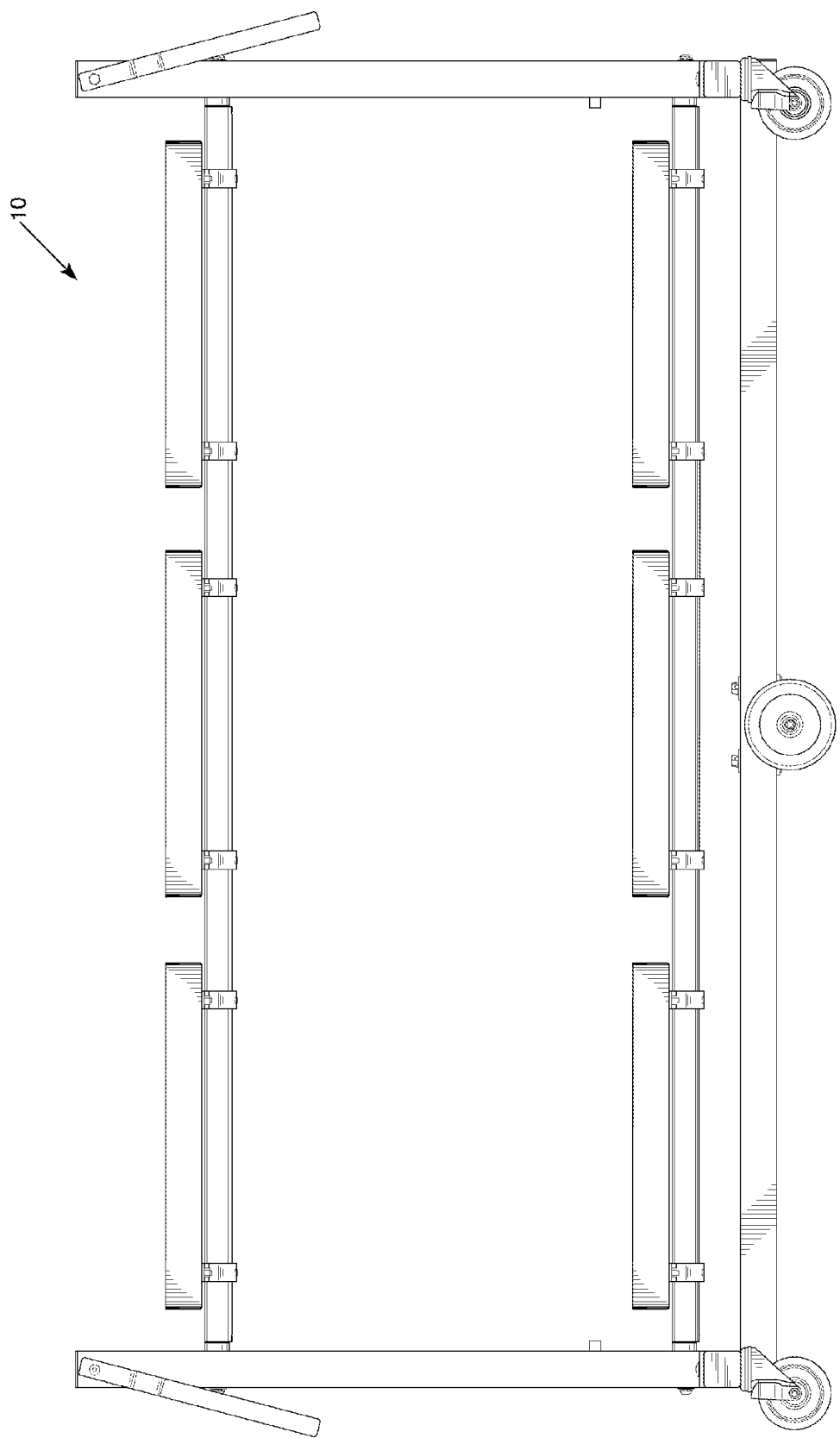
FIG. 53 is a right side view of another embodiment.
Figure 54:
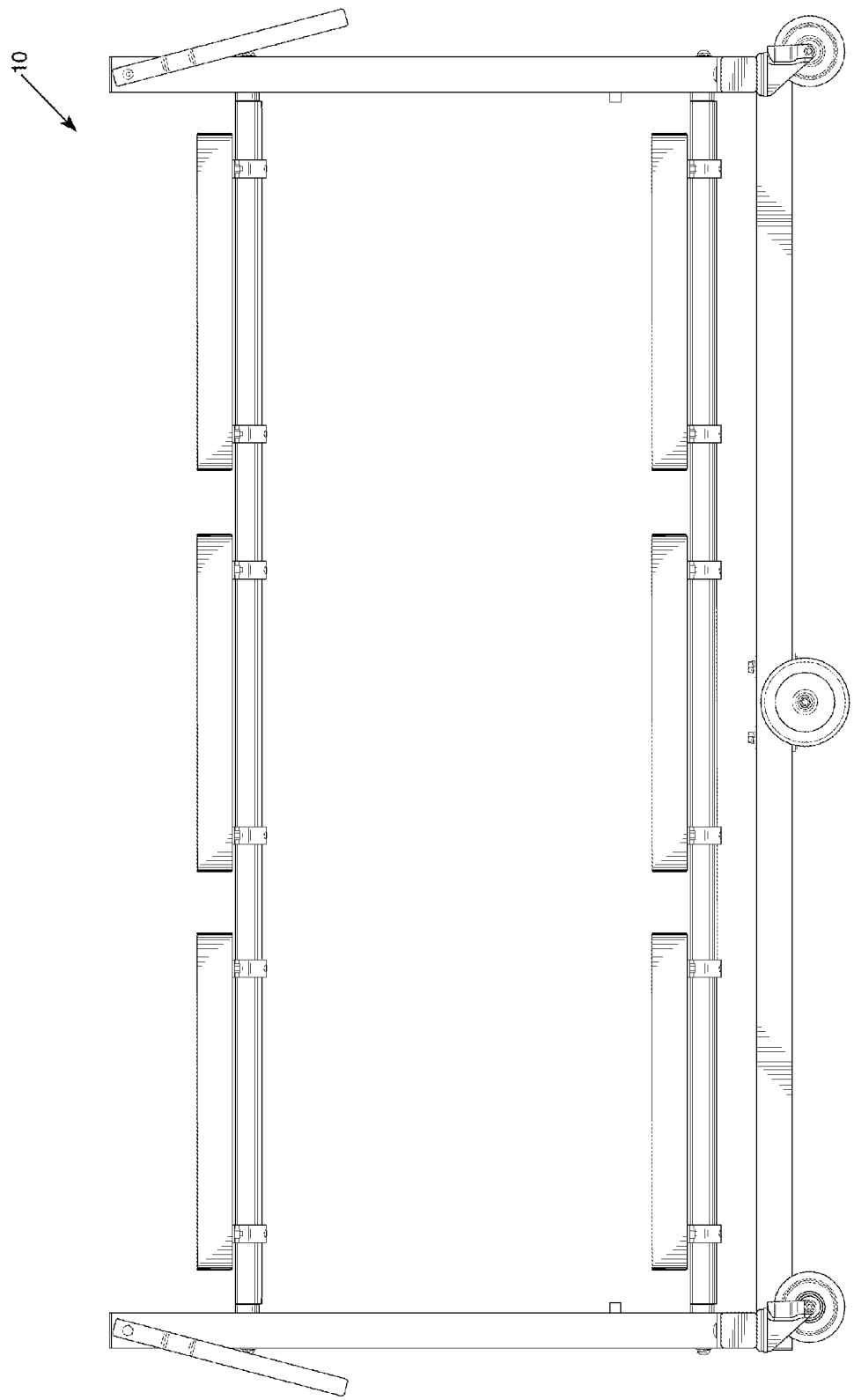
FIG. 54 is a left side view of another embodiment.
Figure 55:
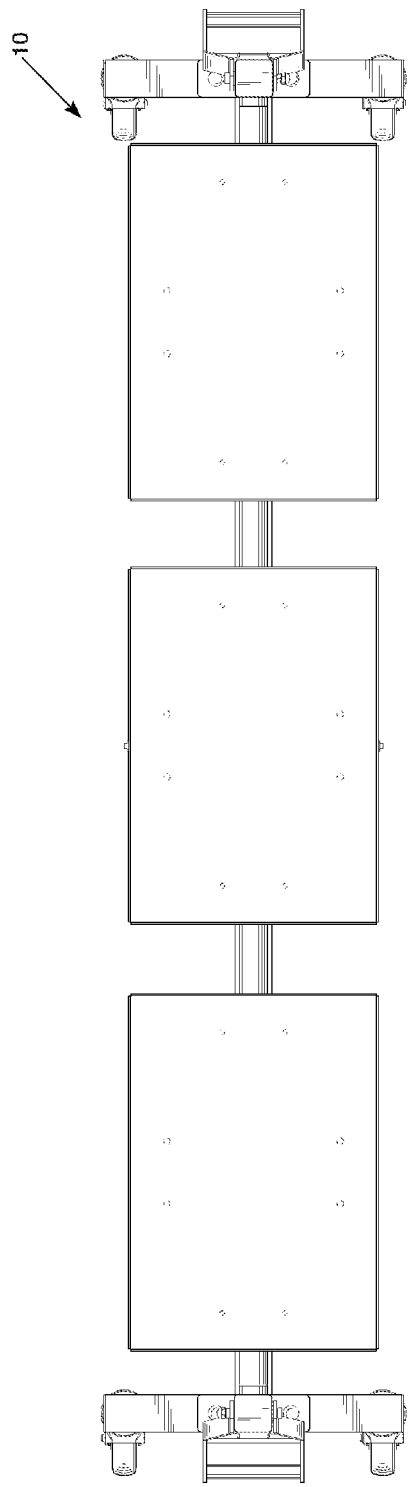
FIG. 55 is a top view of another embodiment.
Figure 56:
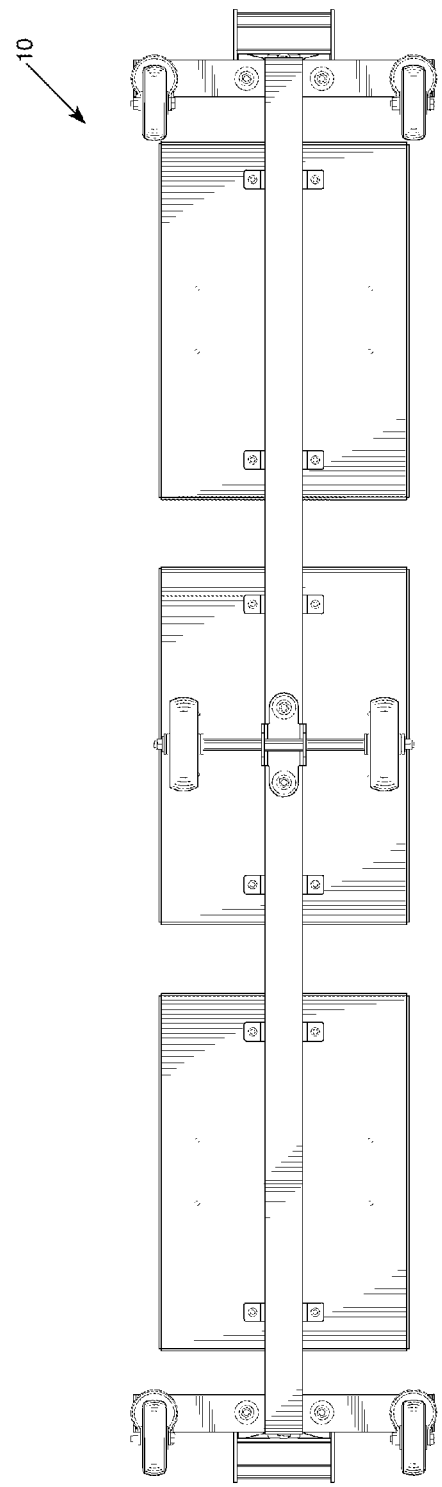
FIG. 56 is a bottom view of another embodiment.
Figure 57:
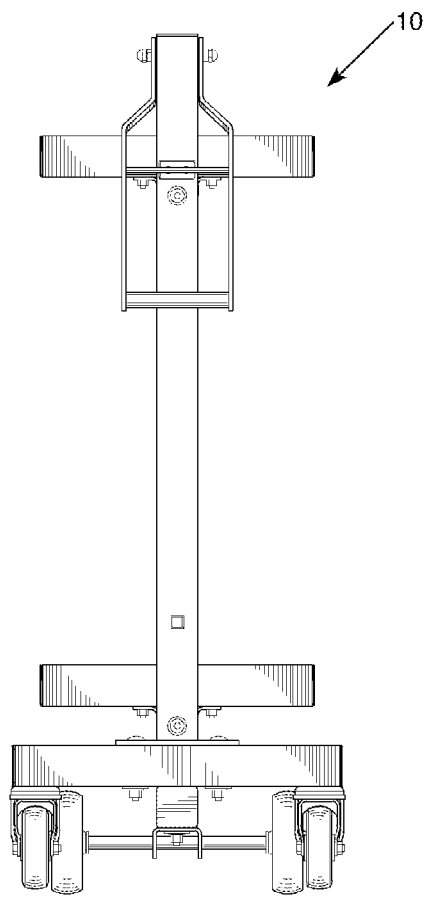
FIG. 57 is a front view of another embodiment.
Figure 58:
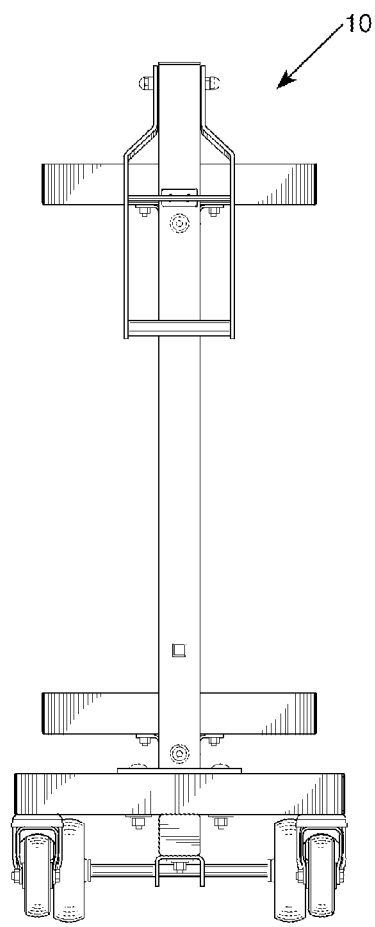
FIG. 58 is a rear view of another embodiment.
Figure 59:
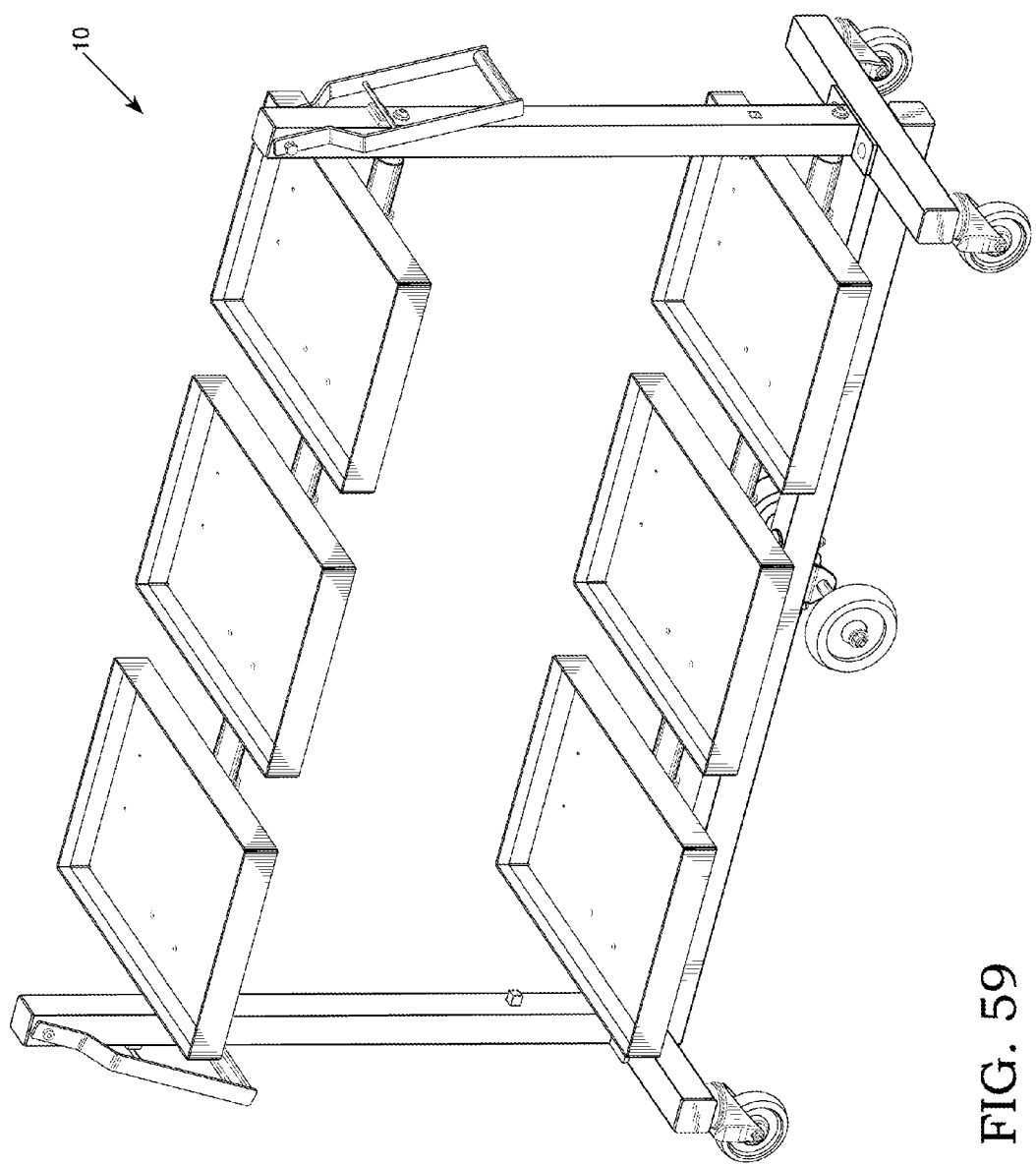
FIG. 59 is an isometric view of another embodiment.
Figure 60:
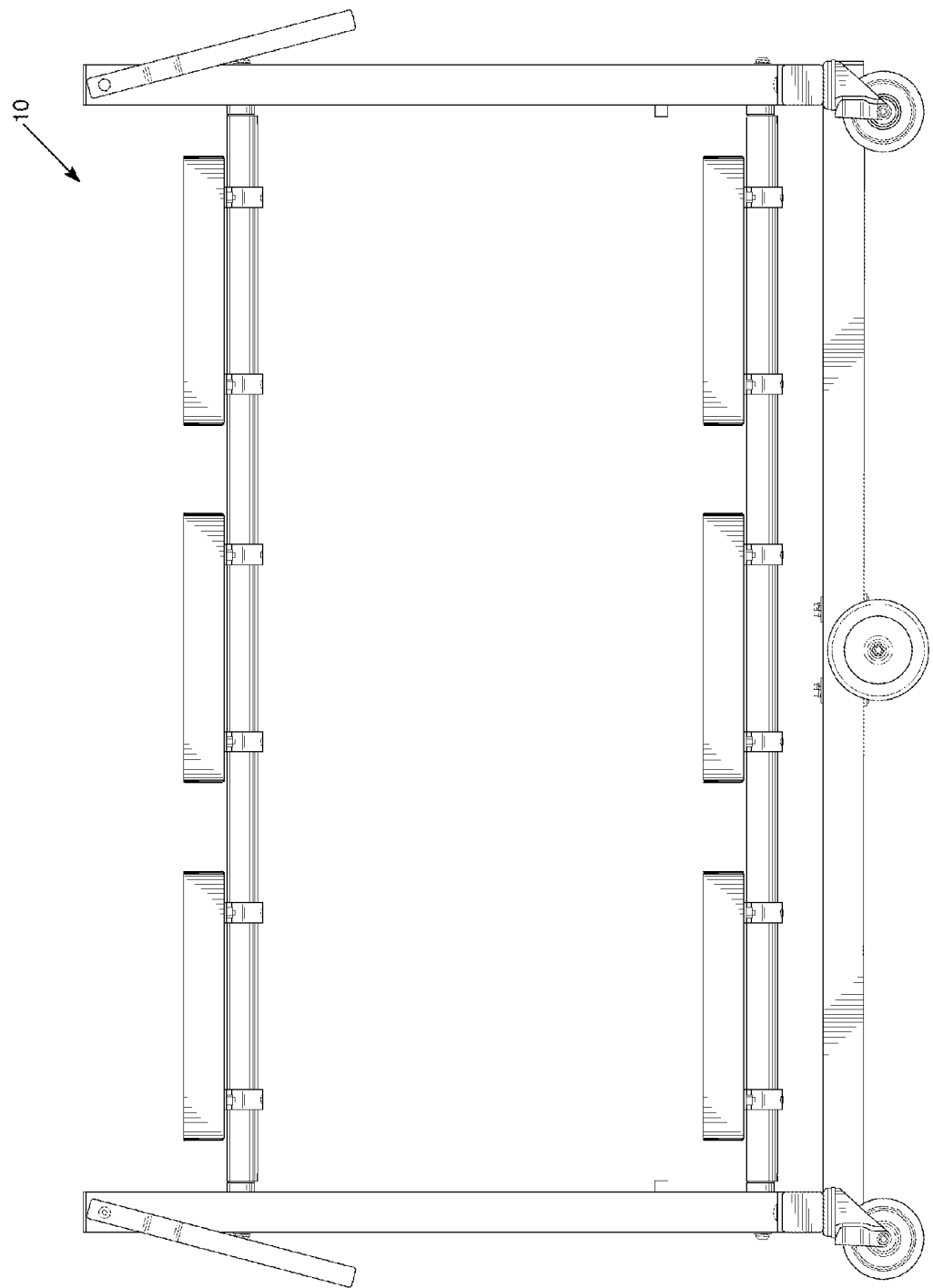
FIG. 60 is a right side view of another embodiment.
Figure 61:
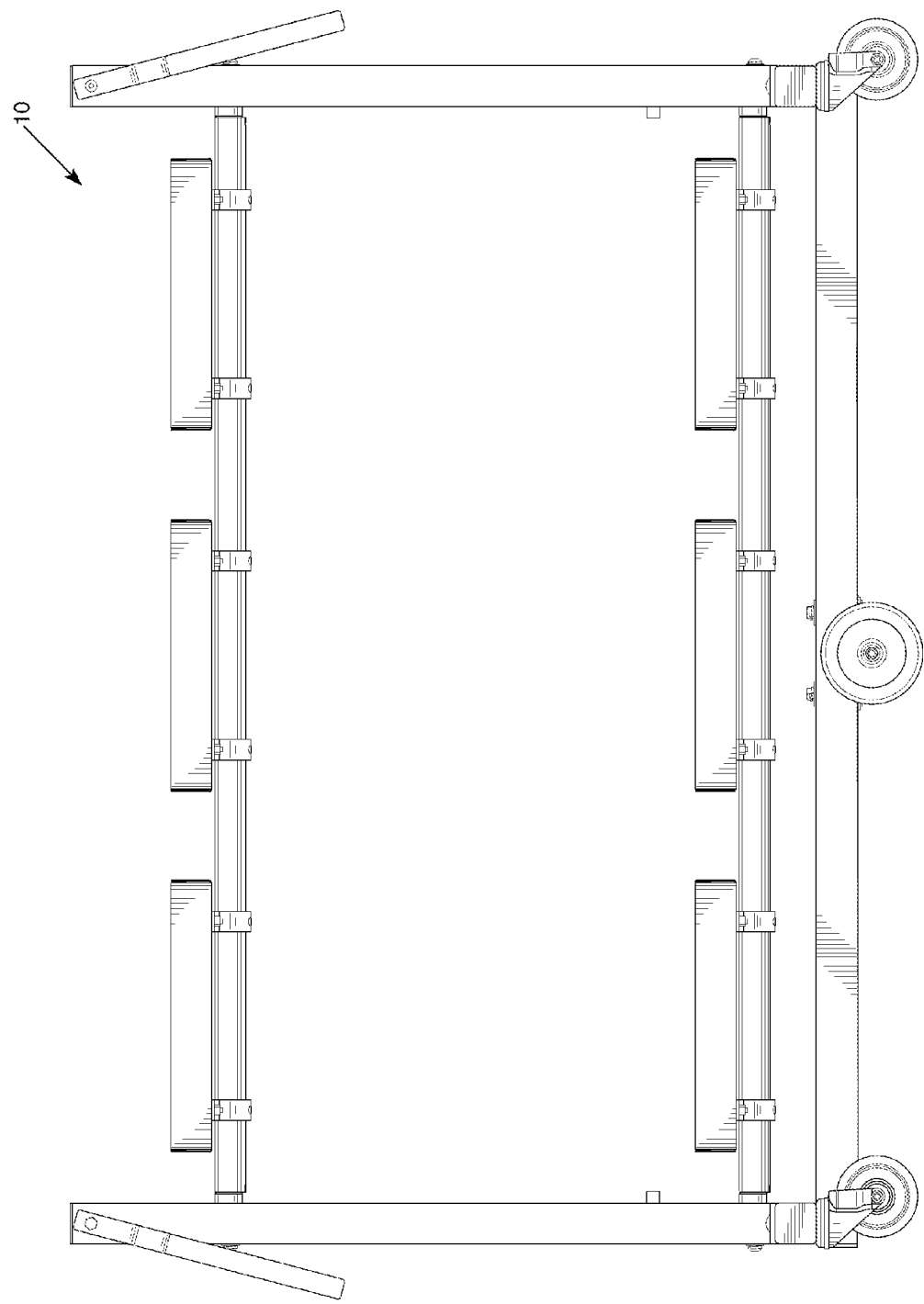
FIG. 61 is a left side view of another embodiment.
Figure 62:
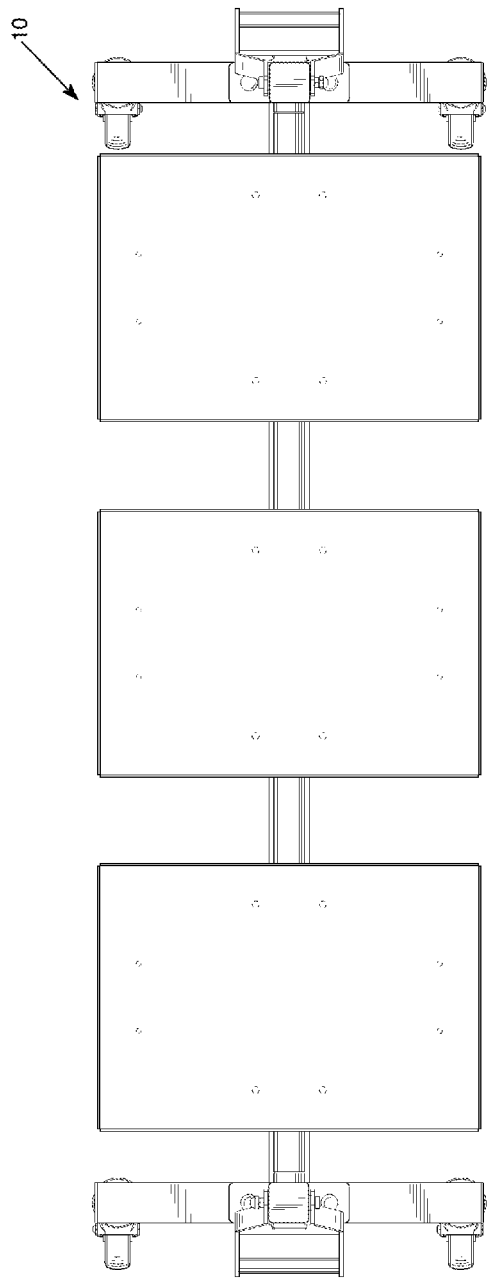
FIG. 62 is a top view of another embodiment.
Figure 63:
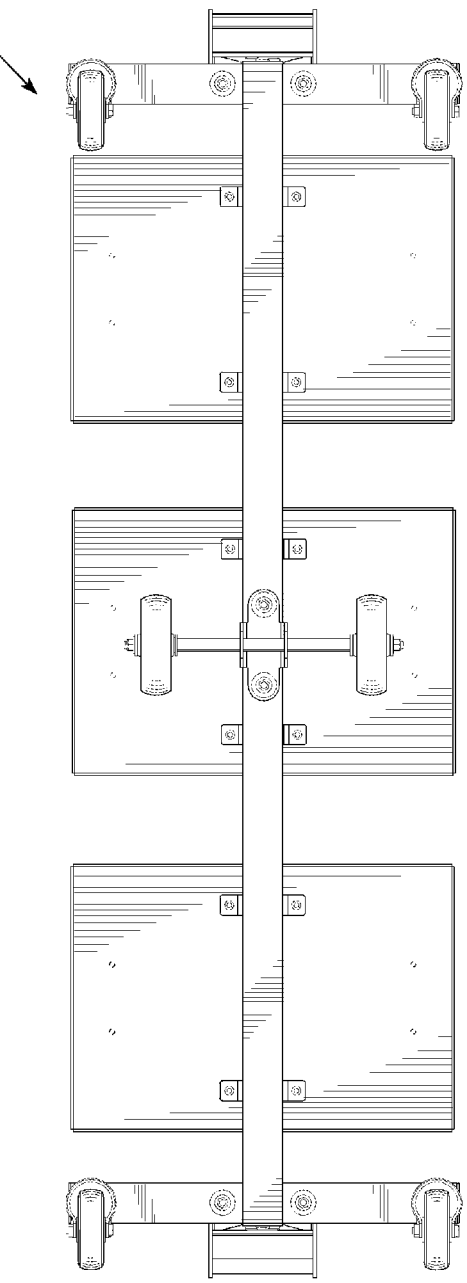
FIG. 63 is a bottom view of another embodiment.
Figure 64:
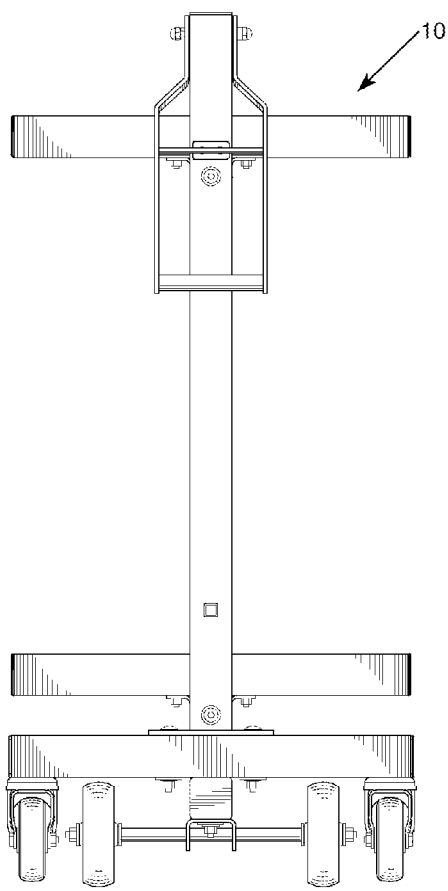
FIG. 64 is a front view of another embodiment.
Figure 65:
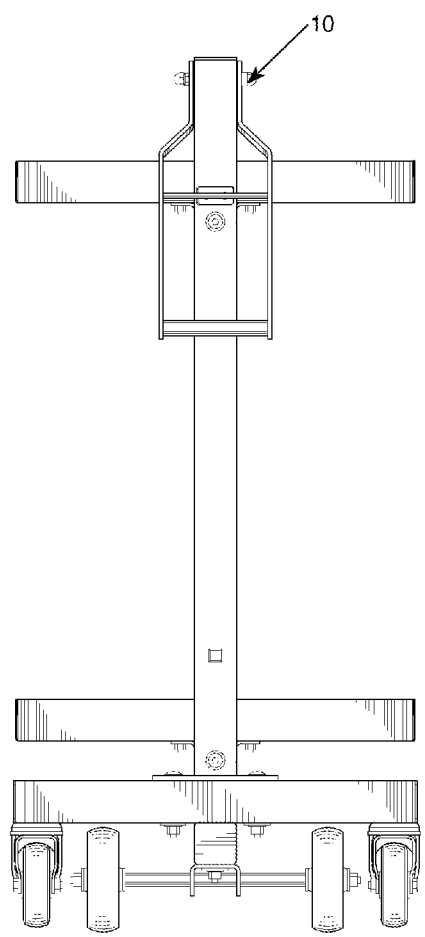
FIG. 65 is a rear view of another embodiment.
Figure 66:
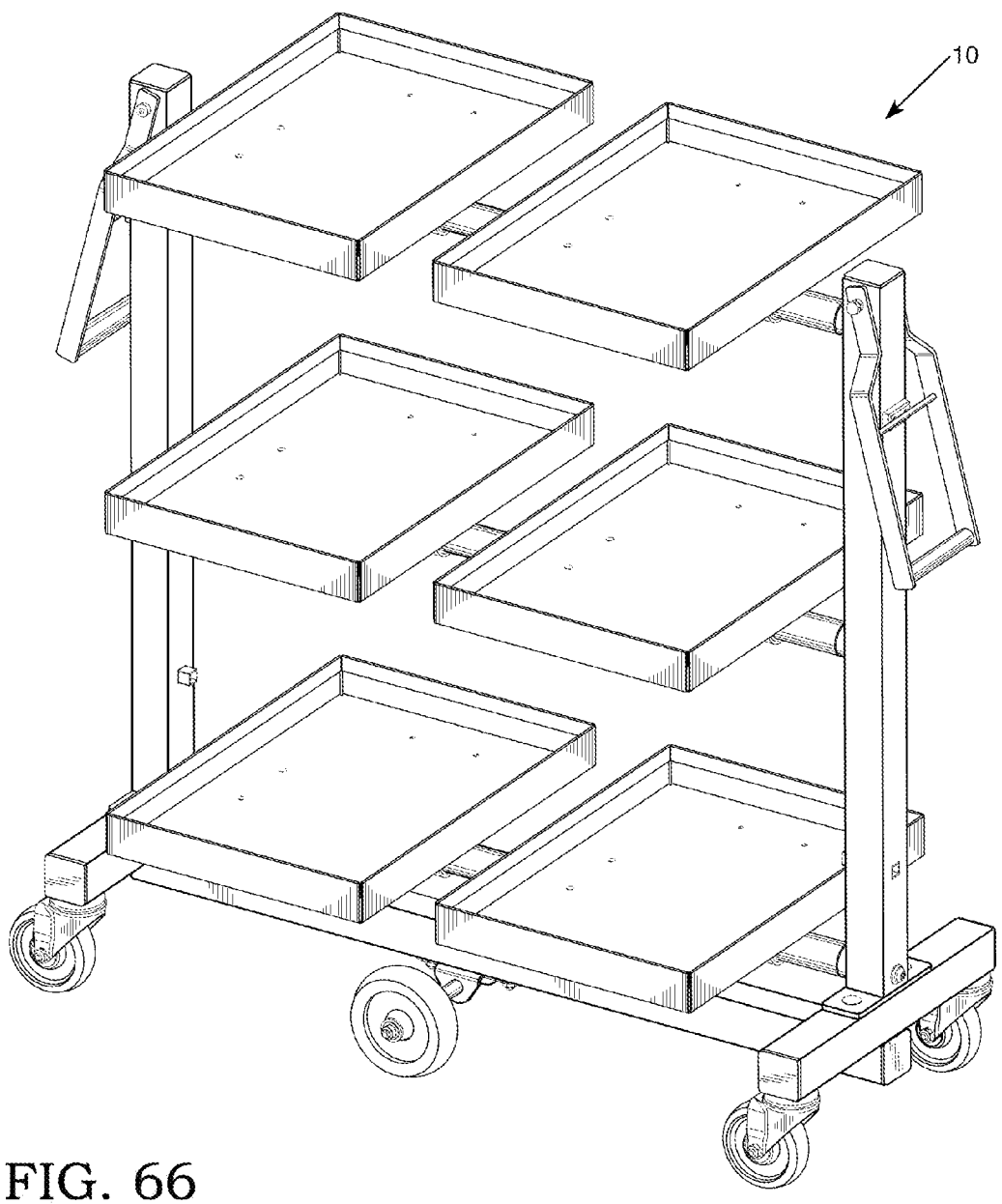
FIG. 66 is an isometric view of another embodiment.
Figure 67:
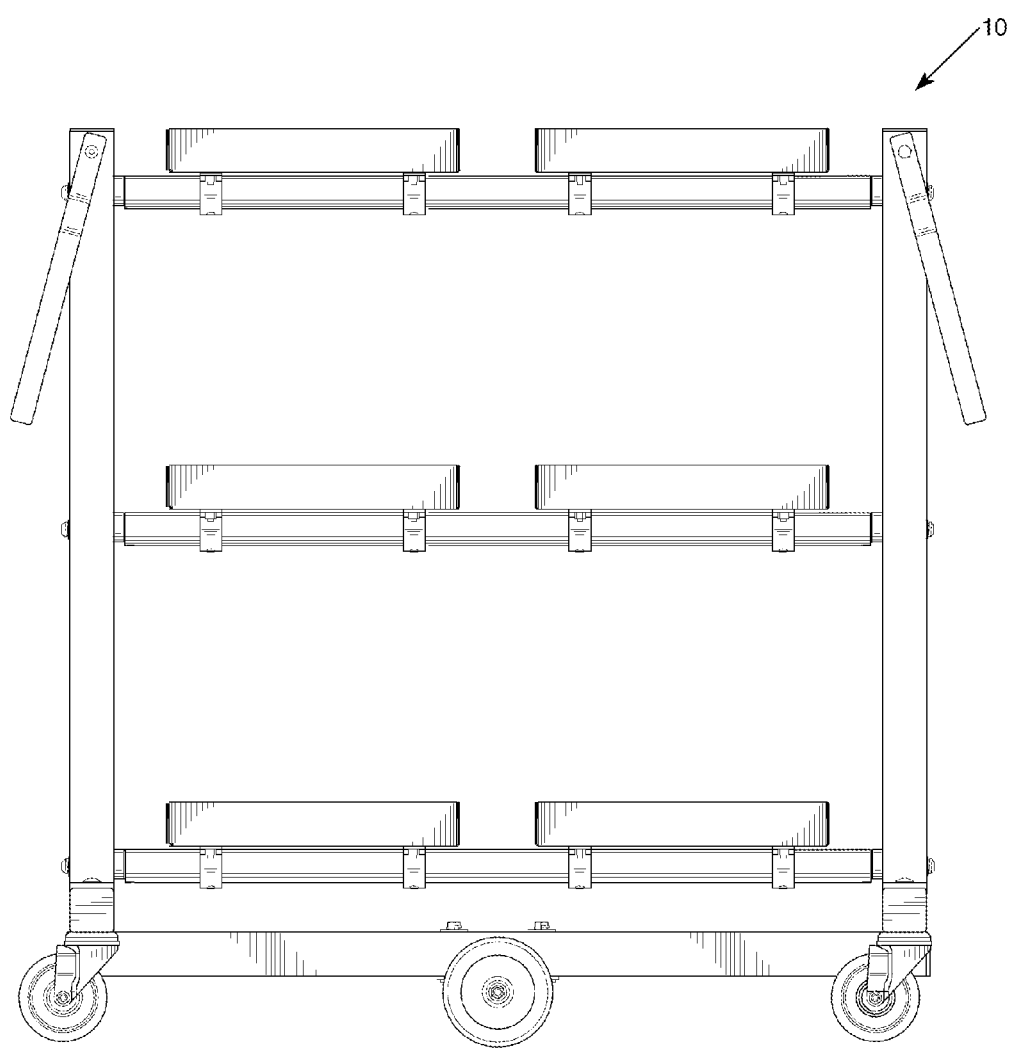
FIG. 67 is a right side view of another embodiment.
Figure 68:
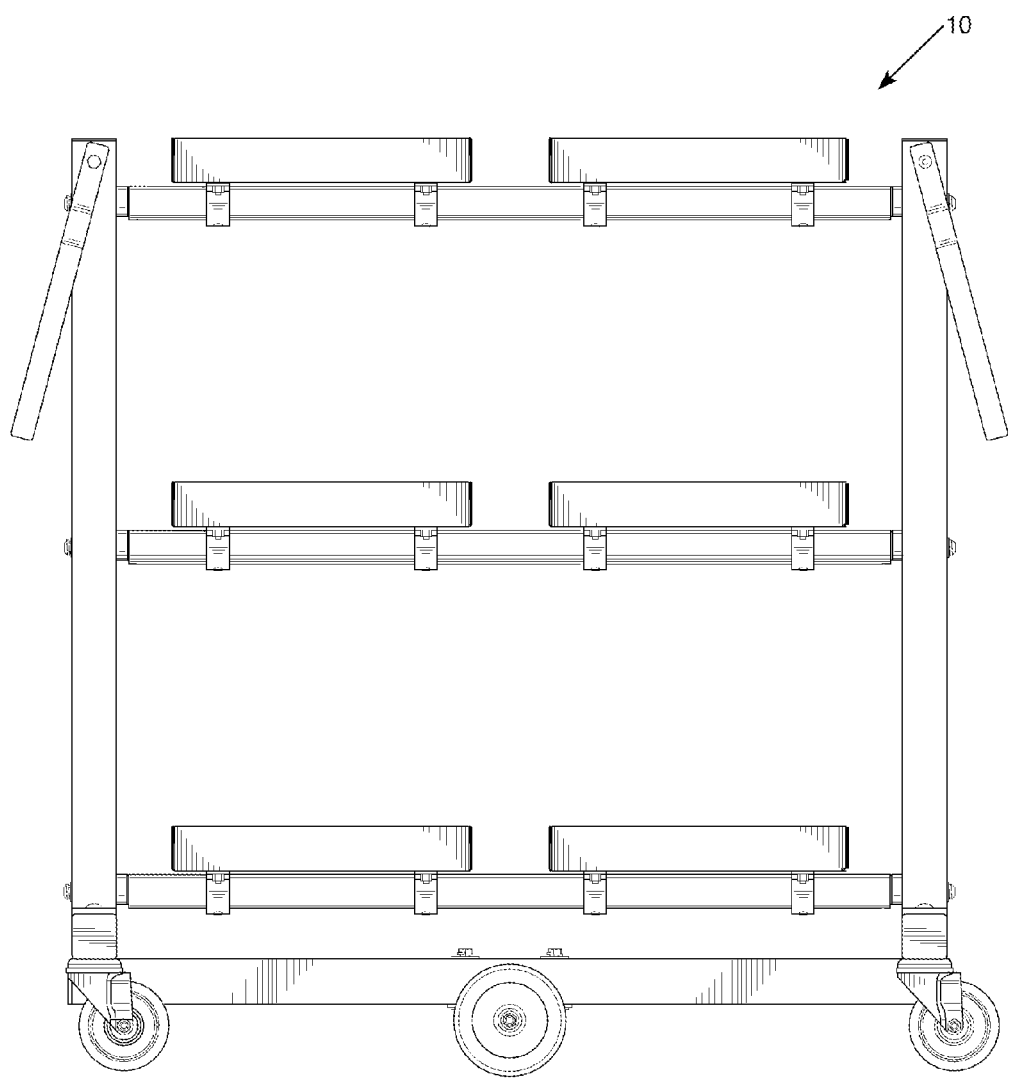
FIG. 68 is a left side view of another embodiment.
Figure 69:
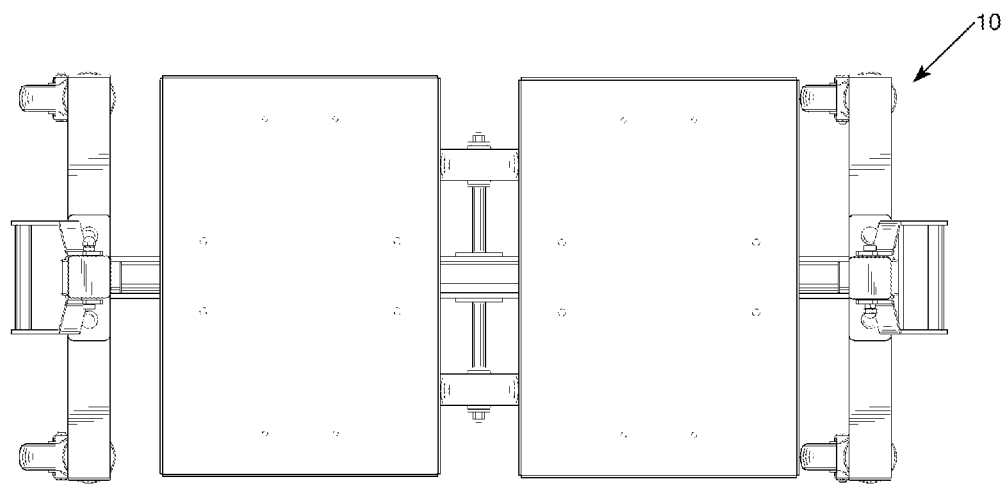
FIG. 69 is a top view of another embodiment.
Figure 70:
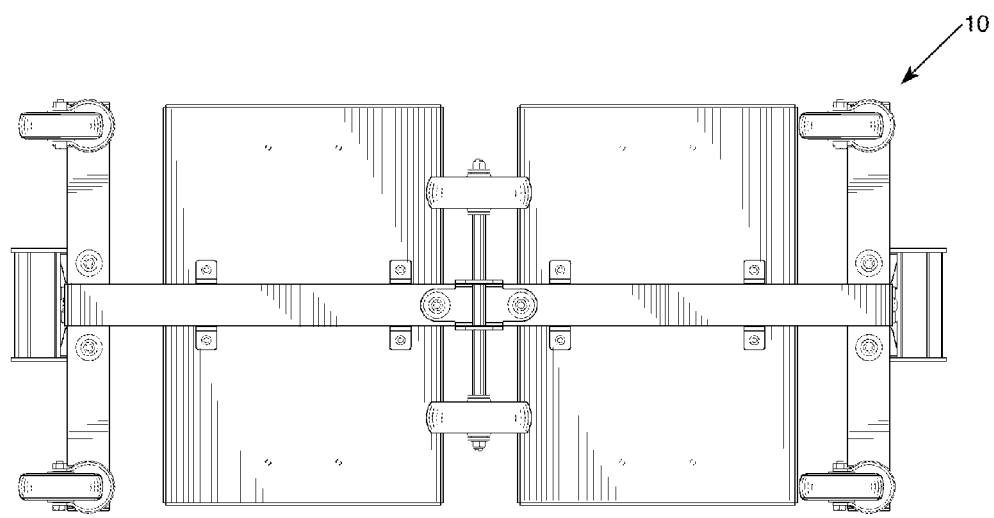
FIG. 70 is a bottom view of another embodiment.
Figure 71:
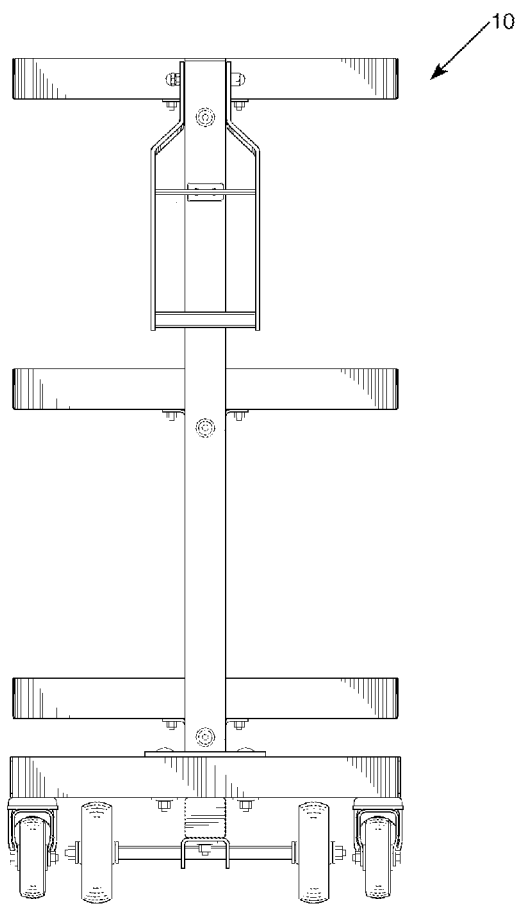
FIG. 71 is a front view of another embodiment.
Figure 72:
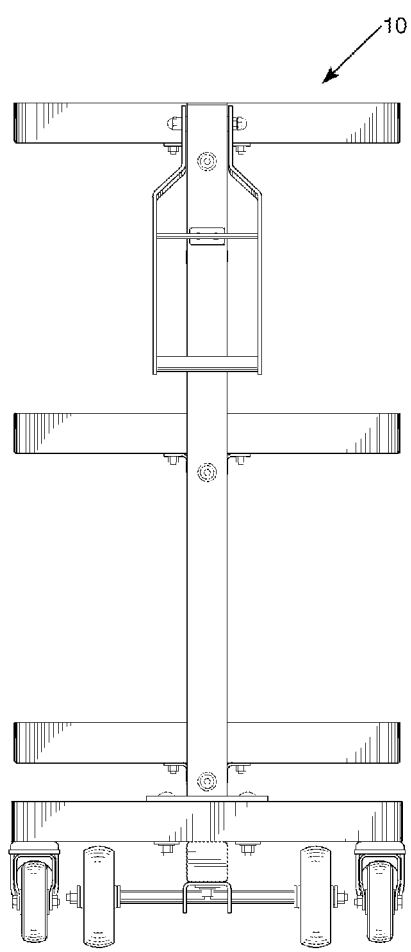
FIG. 72 is a rear view of another embodiment.
Figure 73:
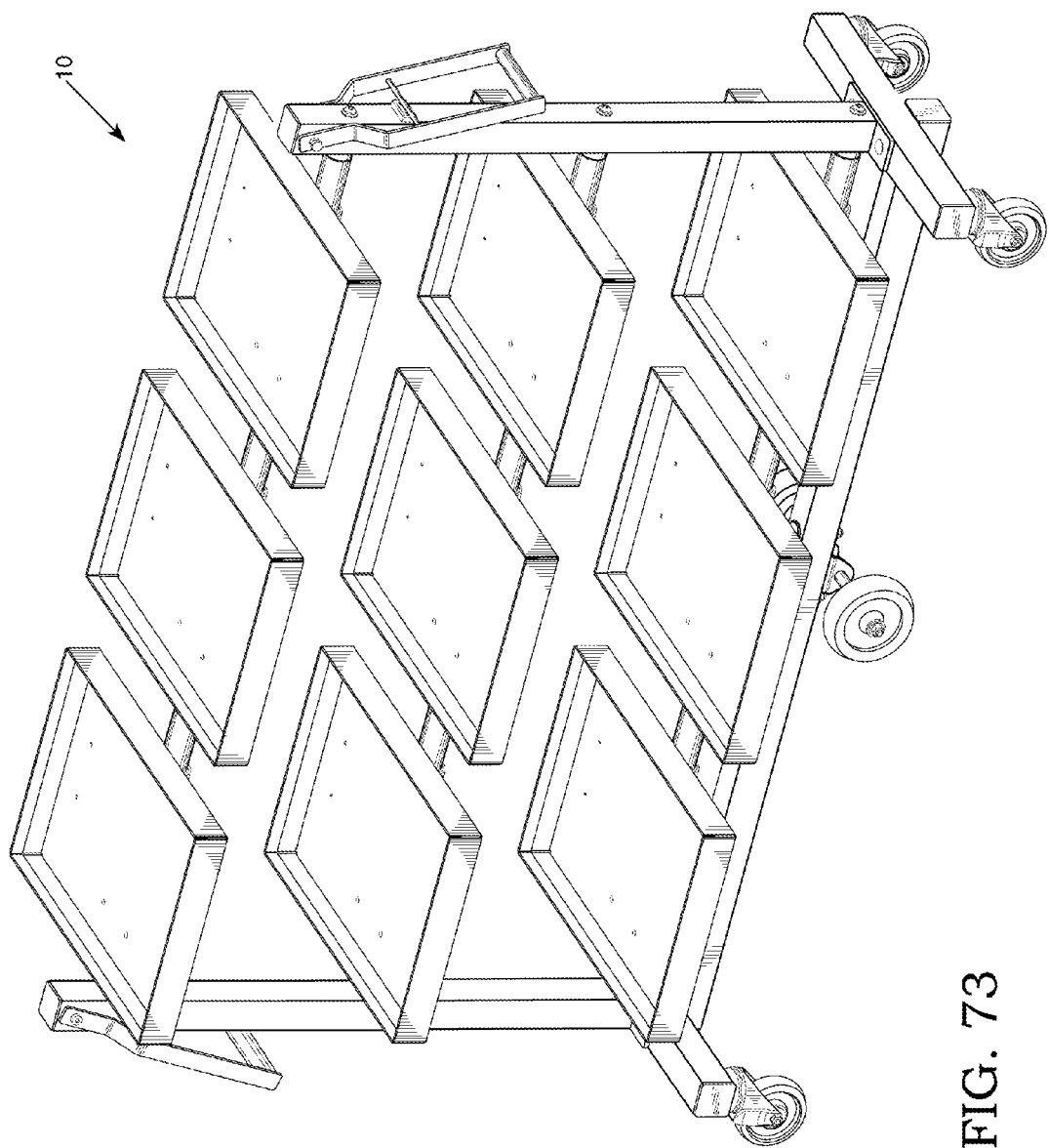
FIG. 73 is an isometric view of another embodiment.
Figure 74:
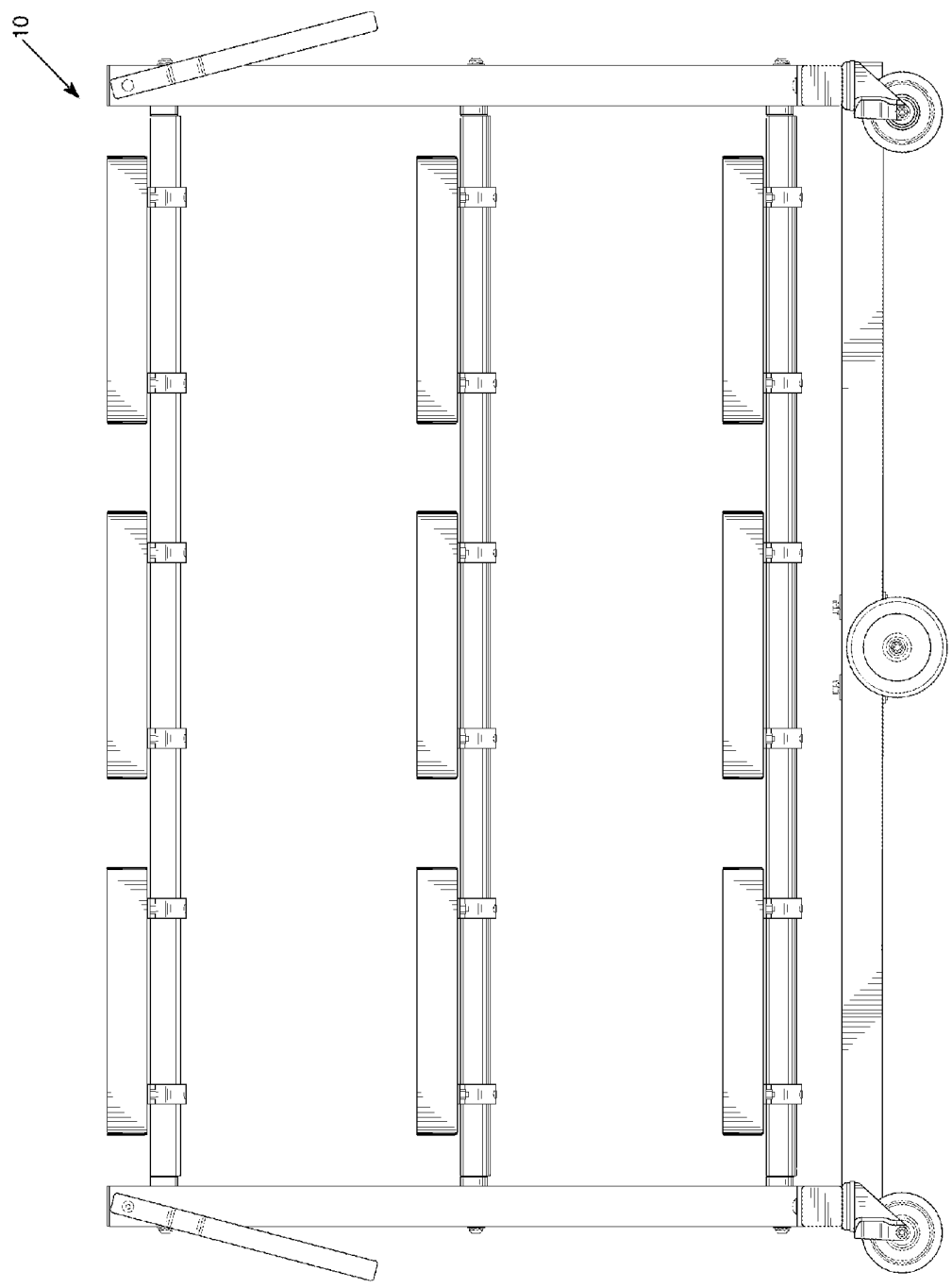
FIG. 74 is a right side view of another embodiment.
Figure 75:
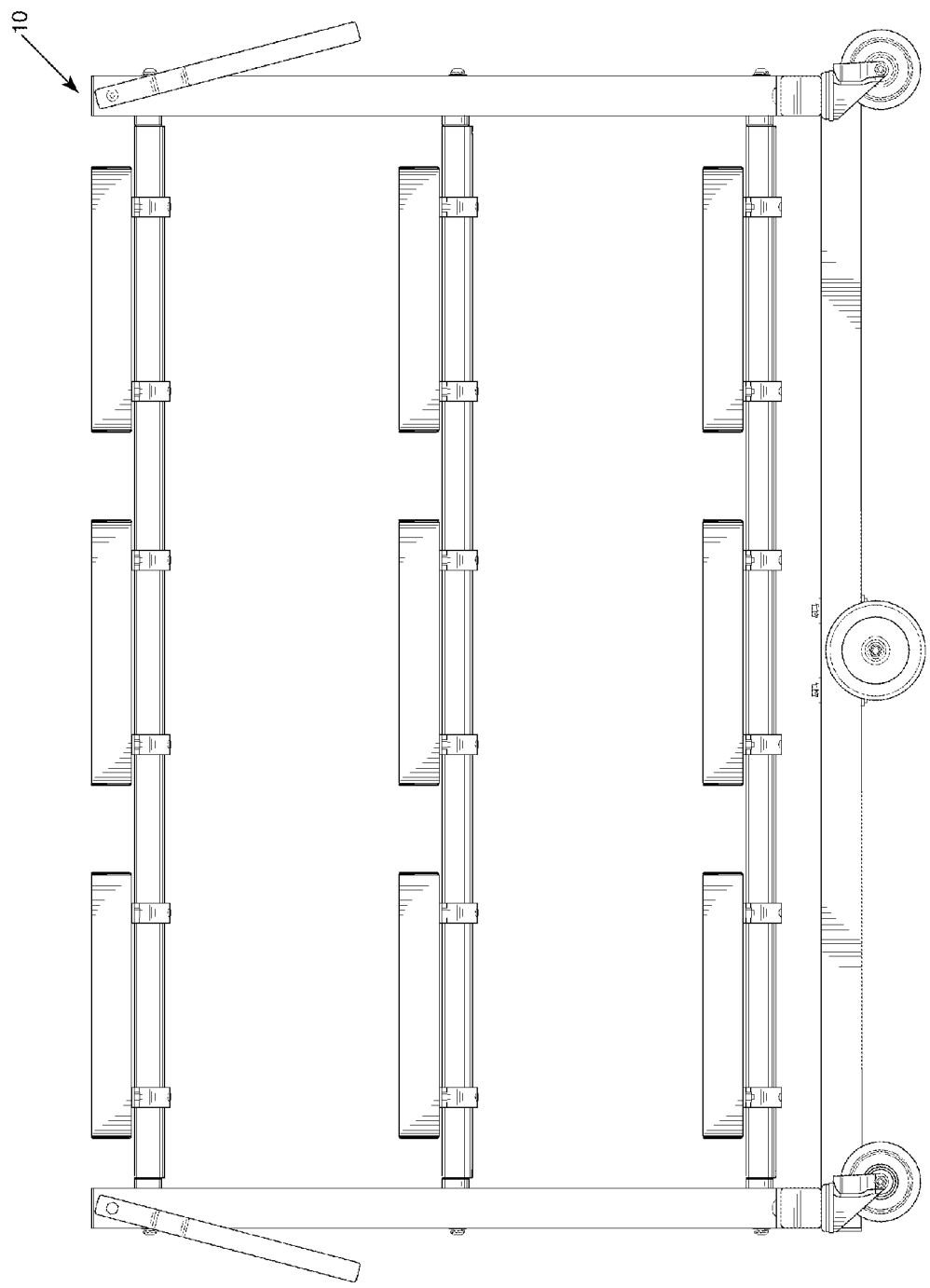
FIG. 75 is a left side view of another embodiment.
Figure 76:
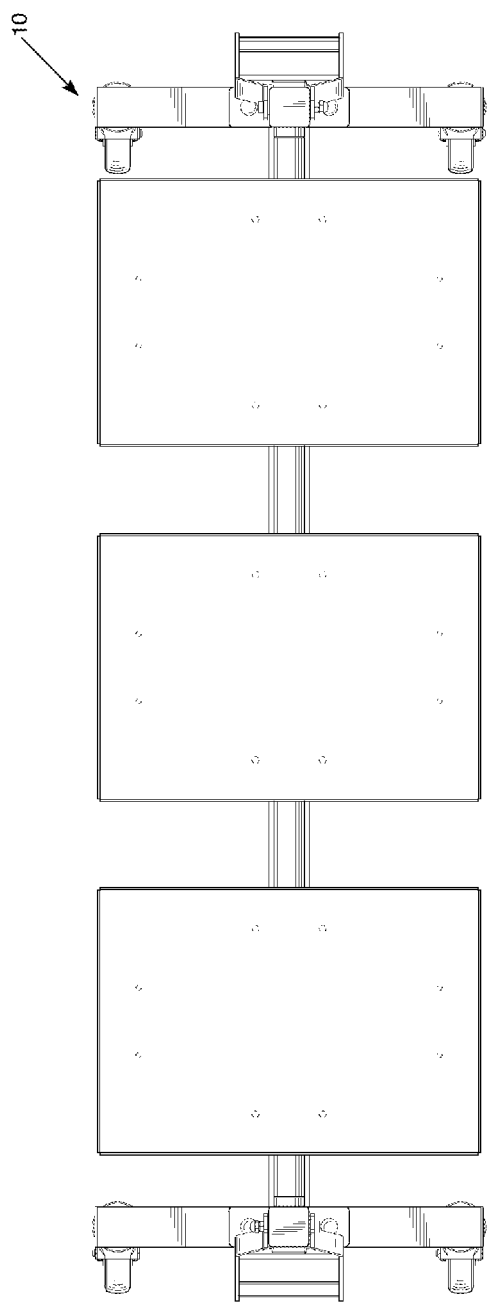
FIG. 76 is a top view of another embodiment.
Figure 77:
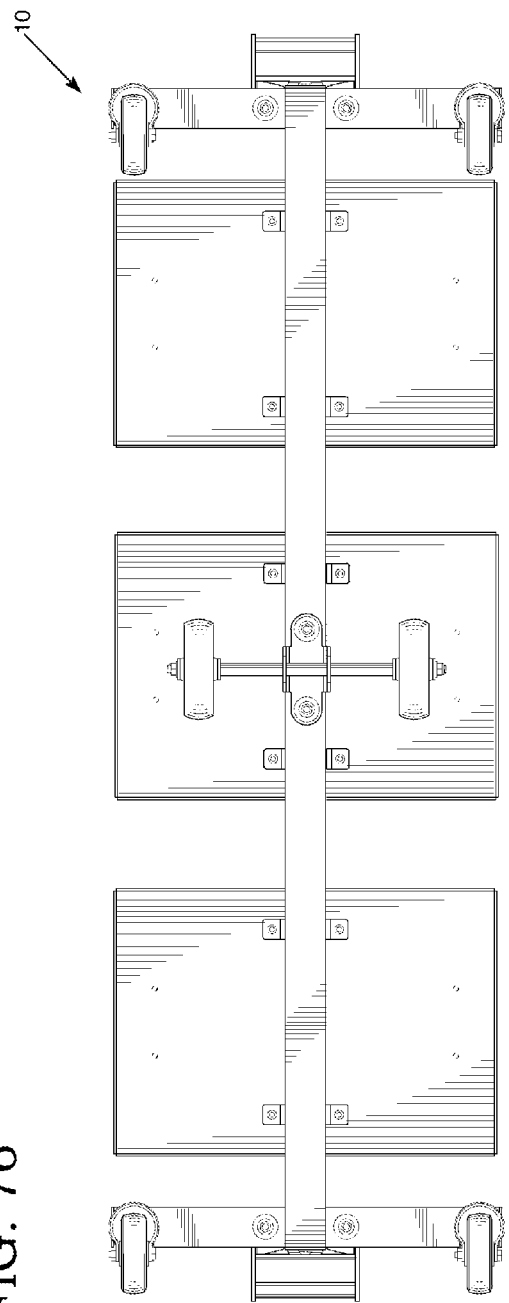
FIG. 77 is a bottom view of another embodiment.
Figure 78:
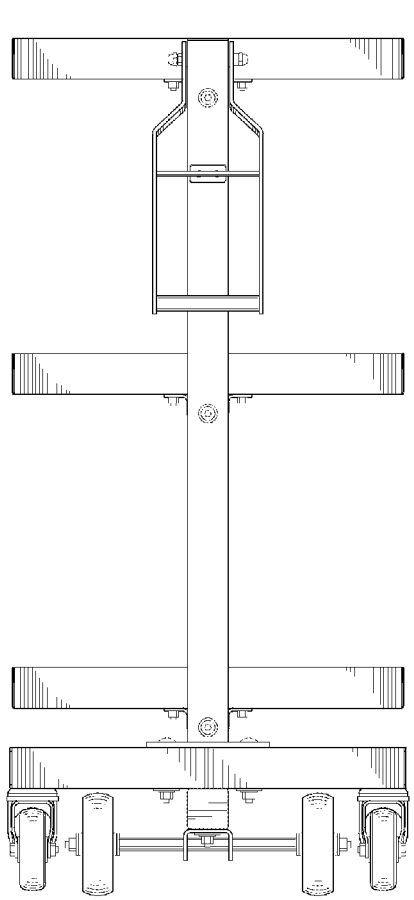
FIG. 78 is a front view of another embodiment.
Figure 79:
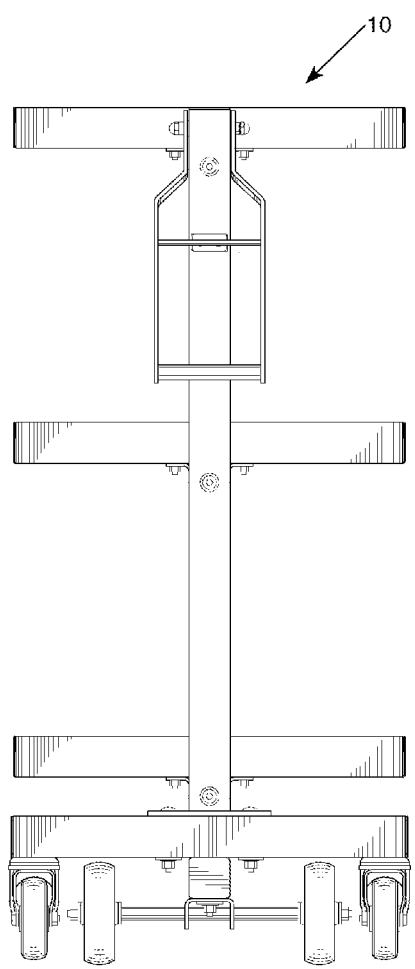
FIG. 79 is a rear view of another embodiment.

In an exemplary embodiment, as shown in FIG. 31, the vertical frame members 22 include a lug 402 having a generally square cross-sectional shape. This lug 402 is one coupling element of the orienting coupling 400. Another element of the orienting coupling 400 is a socketed plug 404 as shown in FIG. 29. The socketed plug 404 includes a base 406, an orienting tab 408, and a shaped cavity 410. In the embodiment shown, the horizontal frame members 24 are generally hollow and have a generally circular cross-section. The socketed plug base 406 is shaped to correspond to the cross-sectional shape of the horizontal frame members 24. Thus, in this embodiment, the socketed plug base 406 is generally circular. Further, the horizontal frame members 24 includes a notch 412. Each horizontal frame members notch 412 generally corresponds to a socketed plug orienting tab 408. Each of the horizontal frame member notch 412 and the socketed plug orienting tab 408 are also part of the "orienting coupling" 400.

That is, in this embodiment, wherein the tote support assembly 200 (discussed below) is structured to tilt to either lateral side of the cart 10, the horizontal frame member notch 412 is aligned with the threaded opening 103 to which bolt 101 is coupled. The horizontal frame member notch 412 is further aligned with the socketed plug-shaped cavity 410. Further, the socketed plug-shaped cavity 410 is shaped to correspond to the vertical frame members lug 402. Thus, in this embodiment, the socketed plug-shaped cavity 410 is an elongated, open-ended cavity 410 with a width generally corresponding to the width of the vertical frame members lug 402. Further, the longitudinal axis of the socketed plug-shaped cavity 410 is aligned with the socketed plug orienting tab 408. That is, generally, a line parallel to the longitudinal axis of the socketed plug-shaped cavity 410 generally passes through the middle of the socketed plug orienting tab 408.

In this configuration, the horizontal frame members 24 are coupled to the vertical frame members 22 as follows. It is understood that both orienting couplings 400, i.e., the orienting couplings 400 at each end of a horizontal frame member 24 are typically coupled at the same time; however, the coupling of only one orienting coupling 400 is described herein. The horizontal frame member 24 is positioned between the vertical frame members 22 with the open end of the socketed plug cavity 410 facing downwardly. It is noted that because the socketed plug cavity 410 is aligned with the socketed plug orienting tab 408, and because the socketed plug orienting tab 408 is disposed in the horizontal frame member notch 412 which is further aligned with the threaded opening 103, the bolt 101 is, and must be, disposed generally on the bottom of the horizontal frame member 24; this is the desired orientation for the horizontal frame member 24, as described above. The horizontal frame member 24 is moved downwardly until the lug 402 passes into the socketed plug cavity 410. It is noted that because the socketed plug cavity 410 cross-sectional shape corresponds to the lug 402, the lug 402 only fits within the socketed plug cavity 410 when the horizontal frame member 24 is in the proper orientation. Thus, the orienting coupling 400 is structured to, and does, position the horizontal frame member 24 in a desired orientation when the horizontal frame member 24 is coupled to the vertical frame members 22. An additional coupling is, in an exemplary embodiment, used to secure the horizontal frame member 24 to the vertical frame members 22. For example, the socketed plug base 406 includes a threaded opening 414 (shown schematically) to which a bolt (not shown) is coupled.

Figure 11A:
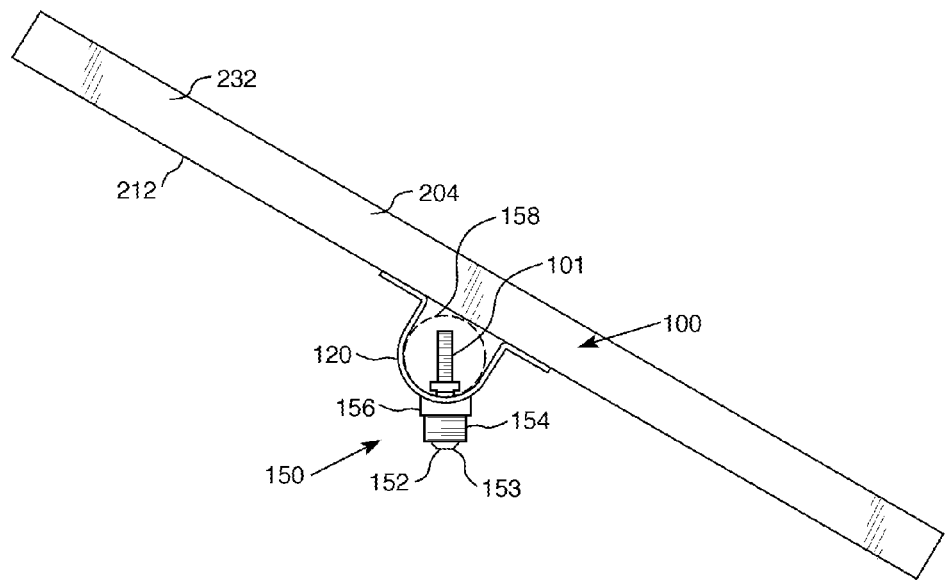
FIG. 11A is a first detail end view of a tote platform.
Figure 11B:
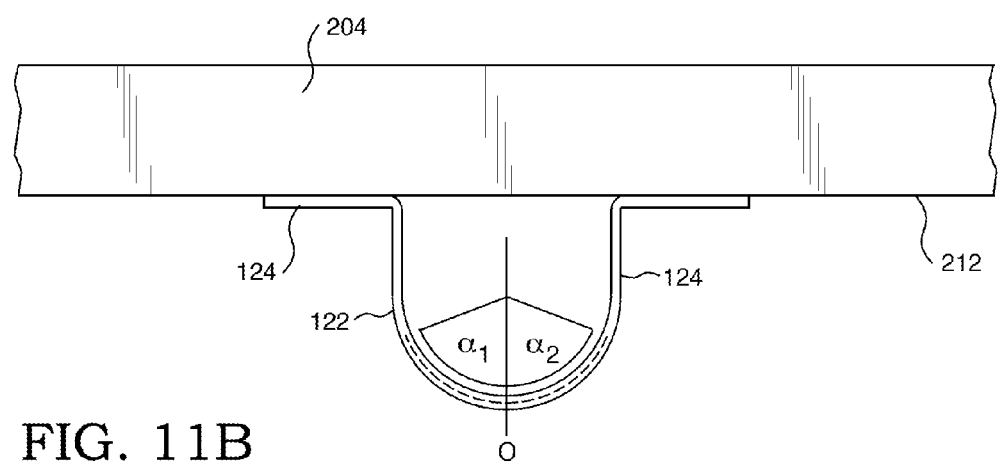
FIG. 11B is a second detail end view of a tote platform.
Figure 12:
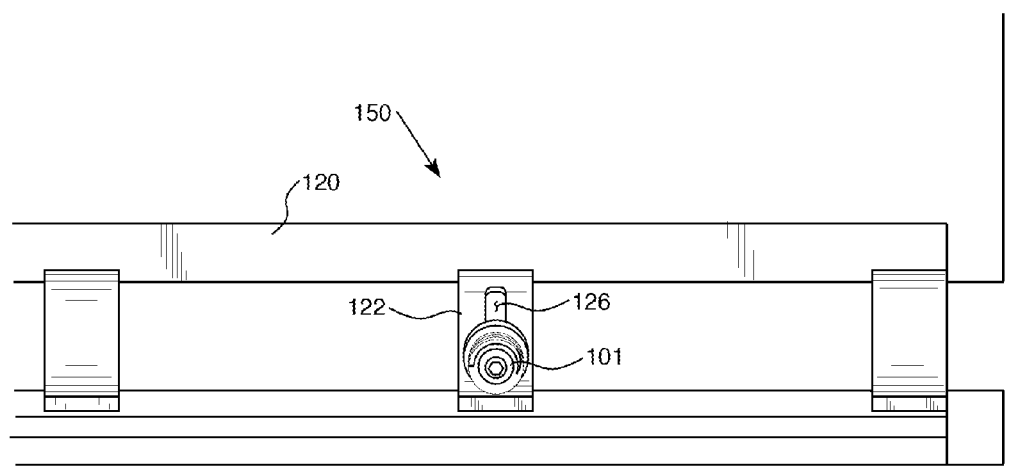
FIG. 12 is another detail isometric view of a tote platform.

In this embodiment, as well as others, the movable coupling movable element 44 includes a platform mounting 110 which is shown in one embodiment as a bracket 120. The bracket 120 includes an arcuate portion 122 and, in an exemplary embodiment, also includes planar portions 124 structured to be coupled to a tote platform 204. The bracket arcuate portion 122 defines an arcuate slot 126. In an exemplary embodiment, the bracket arcuate portion 122 extends over an arc of about (approximately) 180 degrees, i.e., a semi-circle. The mid-point of the bracket arcuate portion 122, when viewed in cross-section in a plane normal to axis 14, is hereinafter defined as the "origin" and identified on the figures with line "0." Further, the line "0" is generally normal to the plane of planar member 212, discussed below. The arcuate slot 126, in an exemplary embodiment, extends to both sides of the origin and is centered on the origin. In this configuration, the bracket 120, and therefore the tote support assembly 200, is structured to, and does, rotate toward either one of the first or second lateral sides 16, 18. In one embodiment, the angle of the arcuate slot 126 is between about 20°-180°, which is between about 10°-90° on each side of the origin (shown as angles $\alpha_1$ and $\alpha_2$ in FIG. 11B). Thus, the tote support assembly 200, described below, is structured to, and does, tilt between 0° (which is generally horizontal) and the maximum angle of the arcuate slot 126. That is, it is understood that, for this embodiment and each embodiment discussed below the tote support assembly 200 has a maximum tilt which is half the arc of the arcuate slot 126. In another embodiment, the angle of the arcuate slot 126 is between about 30°-160°, which is between about 15°-80° on each side of the origin. In another embodiment, the angle of the arcuate slot 126 is between about 40°-150°, which is between about 20°-75° on each side of the origin. In another embodiment, the angle of the arcuate slot 126 is between about 60°-120°, which is between about 30°-60° on each side of the origin. In another embodiment, the angle of the arcuate slot 126 is about 90°, which is about 45° on each side of the origin. In another embodiment, the angle of the arcuate slot 126 is about 30°, which is about 15° on each side of the origin. It is noted that with an arc of about 15° on each side of the origin, the tote support assembly 200 is structured to, and does, tilt a sufficient amount so as to allow a user to access the contents of a tote 1 while not being tilted so much that a tote 1 is likely to move off the tote support assembly 200. Thus, this embodiment solves a problem stated above. This is also true of the embodiment wherein the angle of the arcuate slot 126 is between about 20°-150°, which is between about 10°-75° on each side of the origin.

In an alternate embodiment, the arcuate slot 126 is not centered on the origin, but rather one end of the slot is disposed at the origin. In this configuration, the bracket 120, and therefore the tote support assembly 200, is structured to, and does, only rotate toward only one of the first or second lateral sides 16, 18. In an exemplary embodiment, the angle of the arcuate slot 126 is between about 10°-90°. In another exemplary embodiment, the angle of the arcuate slot 126 is between about 20°-80°. In another exemplary embodiment, the angle of the arcuate slot 126 is between about 30°-70°. In another exemplary embodiment, the angle of the arcuate slot 126 is between about 40°-60°. In another exemplary embodiment, the angle of the arcuate slot 126 is about 45°. In another exemplary embodiment, the angle of the arcuate slot 126 is about 30°.

In this embodiment, the movable couplings 40 are assembled as follows. The bracket 120 is movably coupled to a fixed horizontal frame member 90, 92 with an extension 100 extending through arcuate slot 126. When a tote support assembly 200 is coupled to the bracket 120, the extension 100 is trapped in the arcuate slot 126. In this configuration, the bracket 120, and therefore the tote support assembly 200, may rotate relative to the fixed horizontal frame member 90, 92 until the extension 100 contacts either end of the arcuate slot 126. That is, each end of the arcuate slot 126 acts as a "stop."

In this embodiment, the movable couplings 40 include a resistance assembly 150. The resistance assembly 150 is structured to resist the rotation of the movable couplings 40. In the embodiment shown, the resistance assembly 150 includes a spring mounting 152, a spring 154, and, in an exemplary embodiment, includes a pressure distribution member 156. In an exemplary embodiment, the spring mounting 152 is a head 153, i.e., a planar member, on extension 100. In one embodiment, each extension 100 is a construct such as a bolt 101 that is threaded into a threaded opening(s) 103 on the fixed horizontal frame members 90, 92. The pressure distribution member 156, in an exemplary embodiment, is a washer (or other torus shaped body), disposed about extension 100. The spring 154 is disposed about extension 100 and between spring mounting 152 and pressure distribution member 156. In this configuration, the spring 154 biases the pressure distribution member 156 against bracket 120. This bias also creates friction between pressure distribution member 156 and bracket 120 which resists the rotation of the movable couplings 40. In other embodiment, not shown, the resistance assembly 150 is structured to apply an axial, radial or circumferential force to the movable couplings 40. Further, the resistance assembly 150, in an exemplary embodiment, includes a friction material (i.e., a material structured to increase friction) disposed between the elements of the movable couplings 40. Further, in an exemplary embodiment, the resistance assembly 150 includes a biasing element, such as, but not limited to spring 154 described above, structured to apply force to the elements of the movable couplings 40 or the frictional material.

In other embodiments, not shown, the resistance assembly 150 includes elements such as, but not limited to, a bracket that fits snuggly about fixed horizontal frame member 24, anti-slip (or friction generating) materials disposed between elements of the movable couplings 40, or spring biased assemblies structured to move a tote support assembly 200 to the level, first position. For example, a mounting shaped similar to the capital Greek letter Omega, i.e., "Ω" in an exemplary embodiment, is structured to be, and is, disposed about fixed horizontal frame member 24 with springs mounted between a tote support assembly 200 and the tips of the a-shaped mounting.

Figure 28:
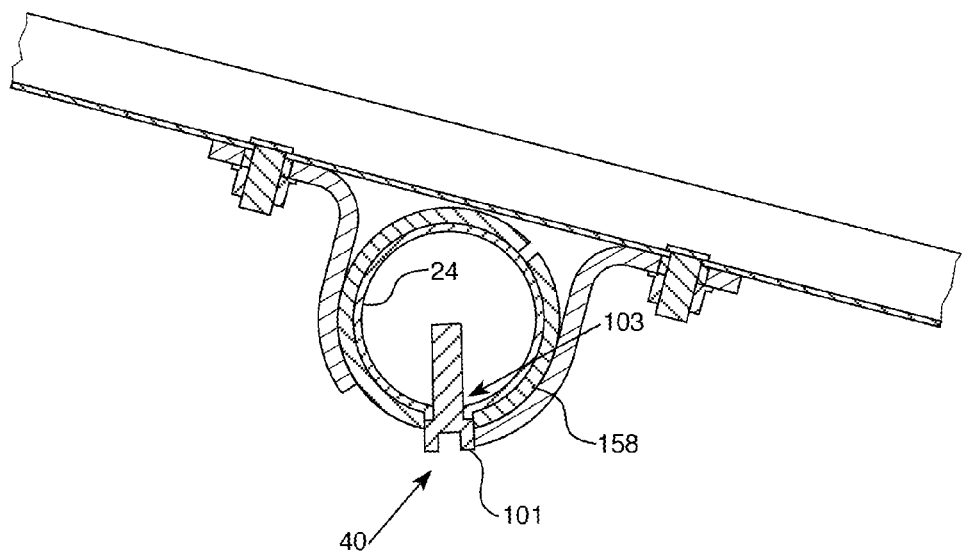
FIG. 28 is an isometric view of use features.

Further, in an exemplary embodiment, as shown in FIG. 28, each movable coupling 40 includes a bearing 158. The bearing 158 is disposed between the horizontal frame member 24 and each associated bracket 120. In an exemplary embodiment, the bearing is a low-friction material, such as, but not limited to, a nylon sheath. As shown, a generally planar sheet of nylon having a width substantially similar to the width of a bracket 120 is wrapped substantially around the horizontal frame member 24. The bearing 158 includes a passage (not numbered) through which a coupling, such as bolt 101, is passed. Thus, the coupling maintained the bearing 158 between the bracket 120 and the horizontal frame member 24. In this configuration, the bearing 158 prevents wear-and-tear caused by friction between the bracket 120 and the horizontal frame member 24. Alternatively, a lubricant is disposed between the horizontal frame members 90, 92 and each associated bracket 120.

Figure 18:
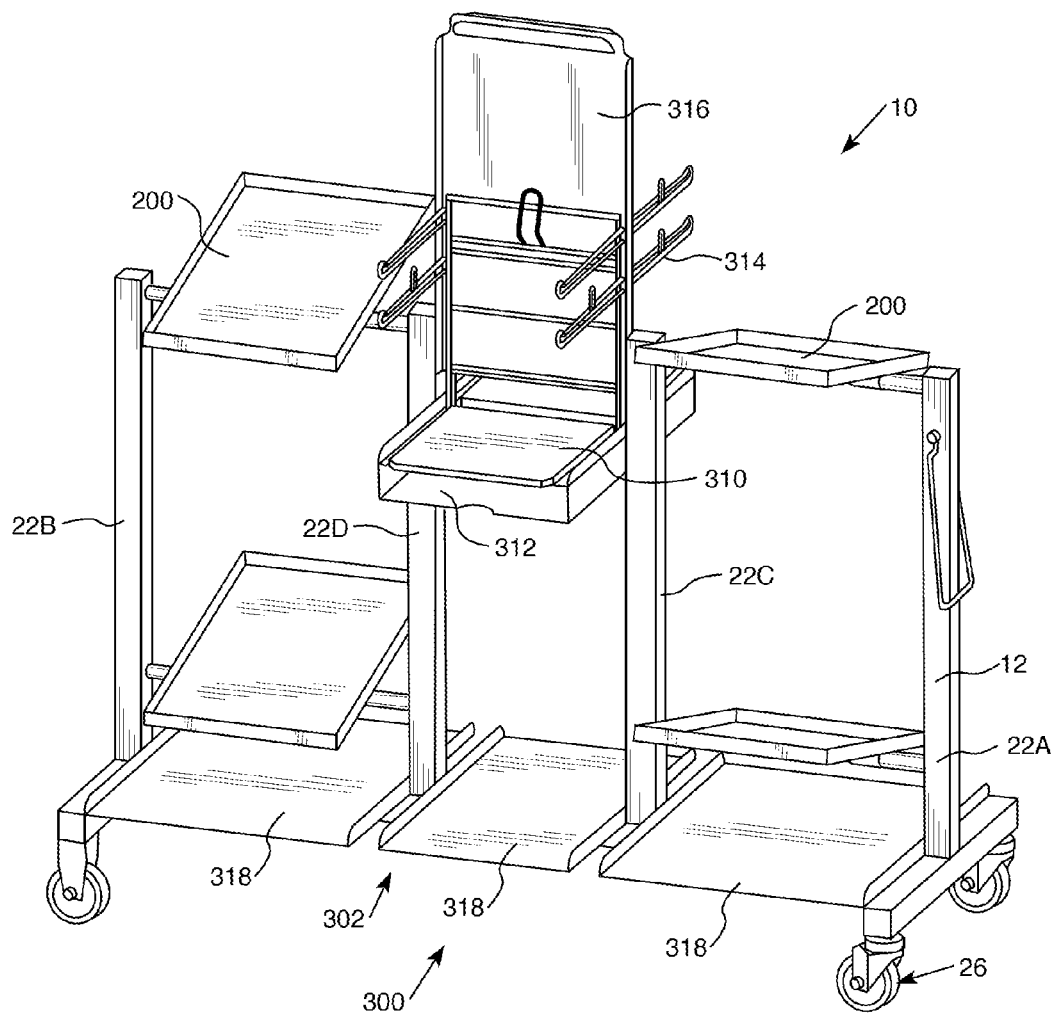
FIG. 18 is an isometric view of another embodiment of the cart including use features.
Figure 19:
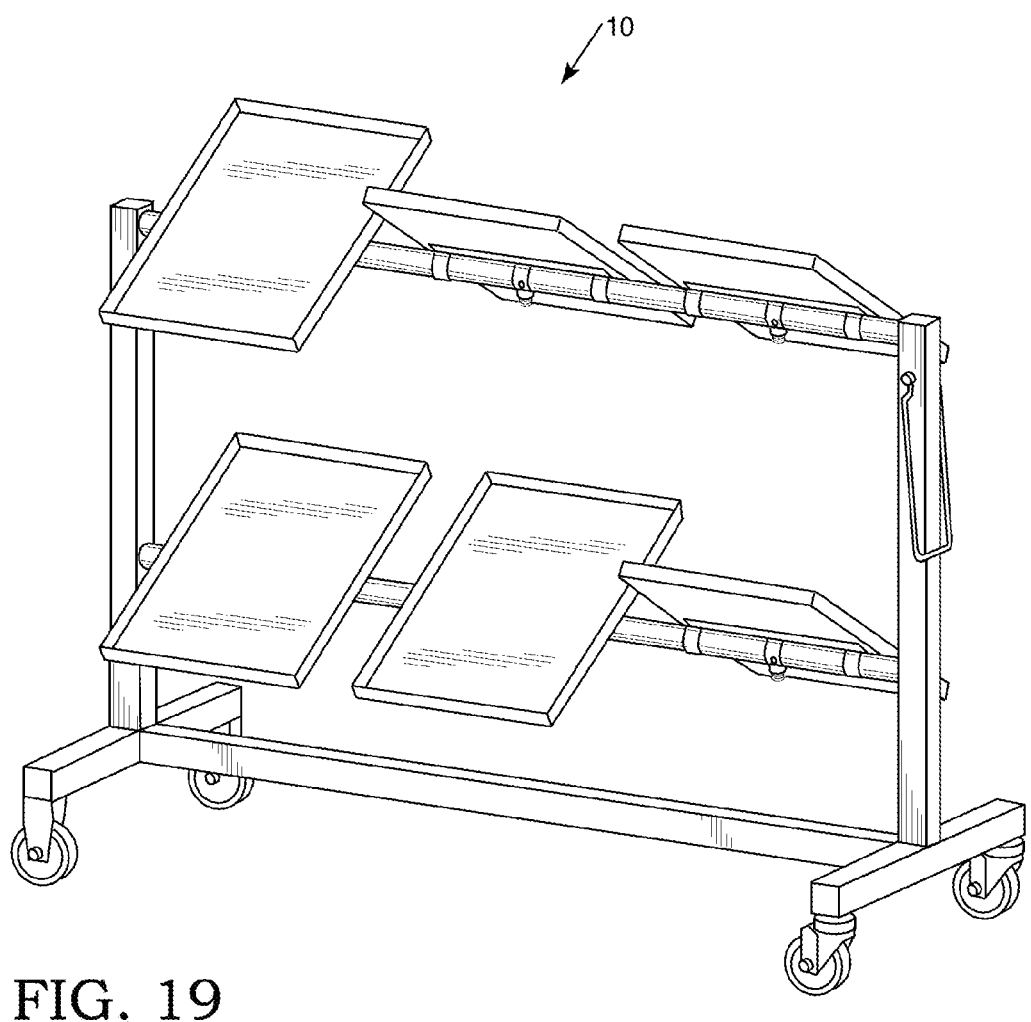
FIGS. 19-24 are similar to FIGS. 1-6, respectively, but with the totes removed.
Figure 20:
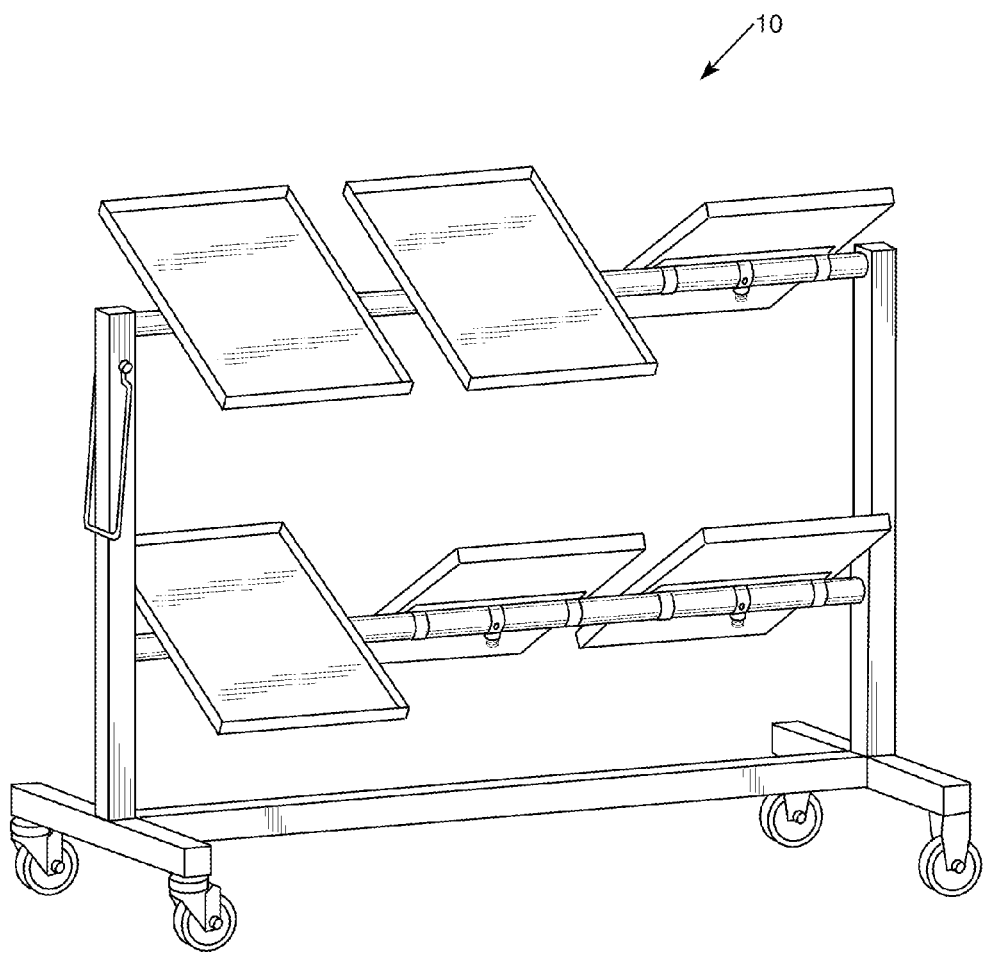
Figure 21:
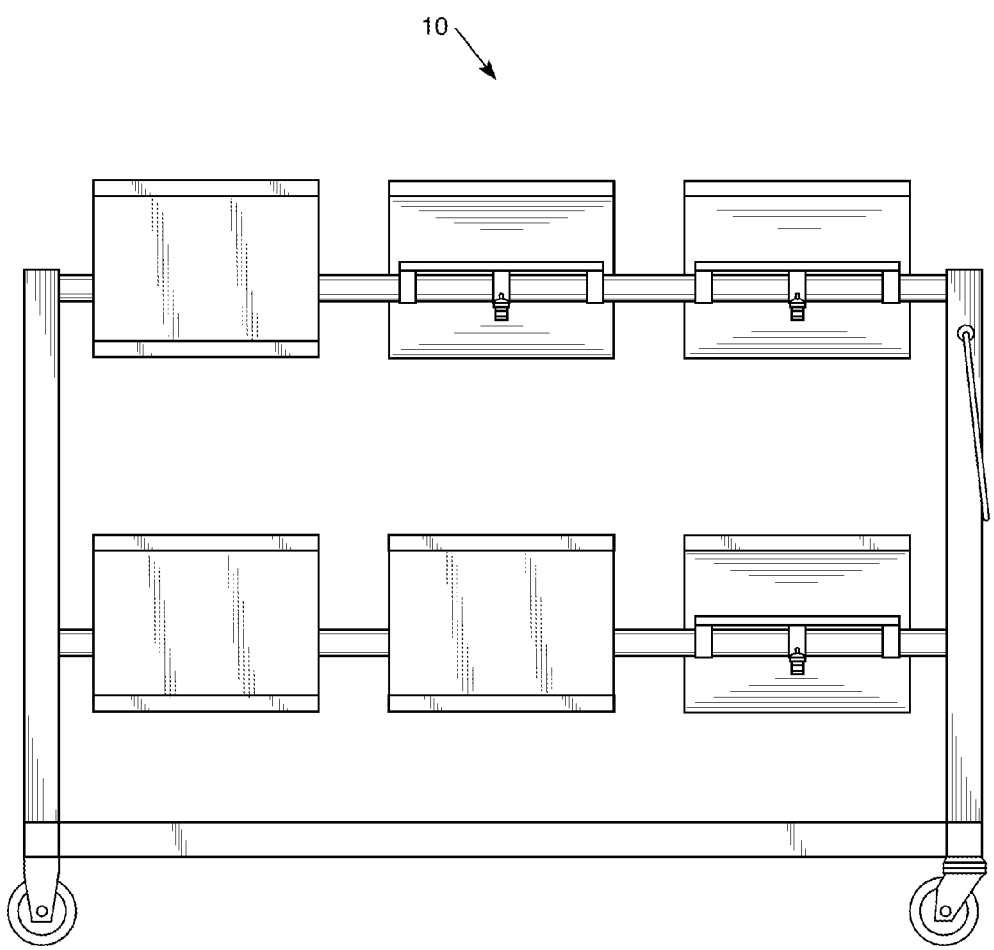
Figure 22:
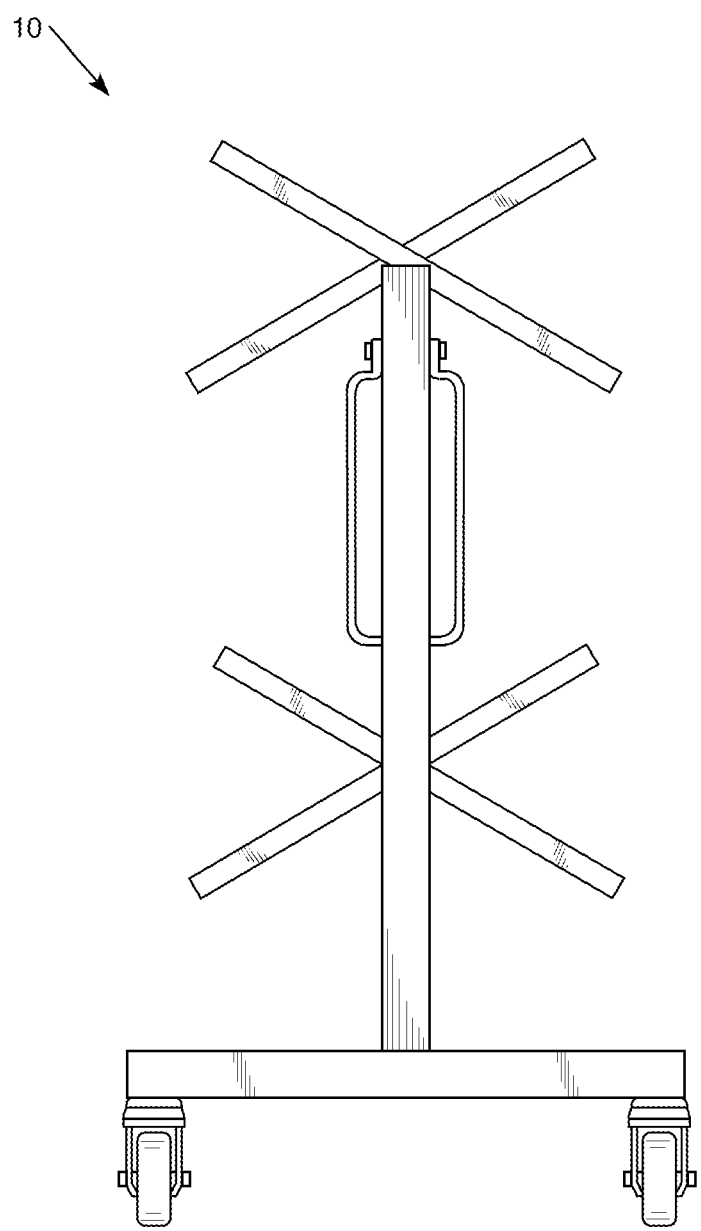
Figure 23:
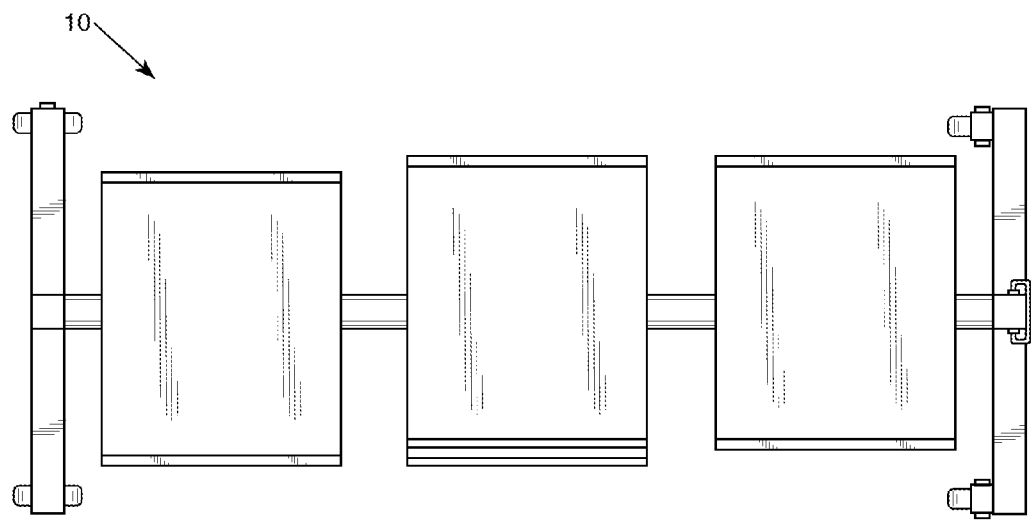
Figure 24:
Figure 25:
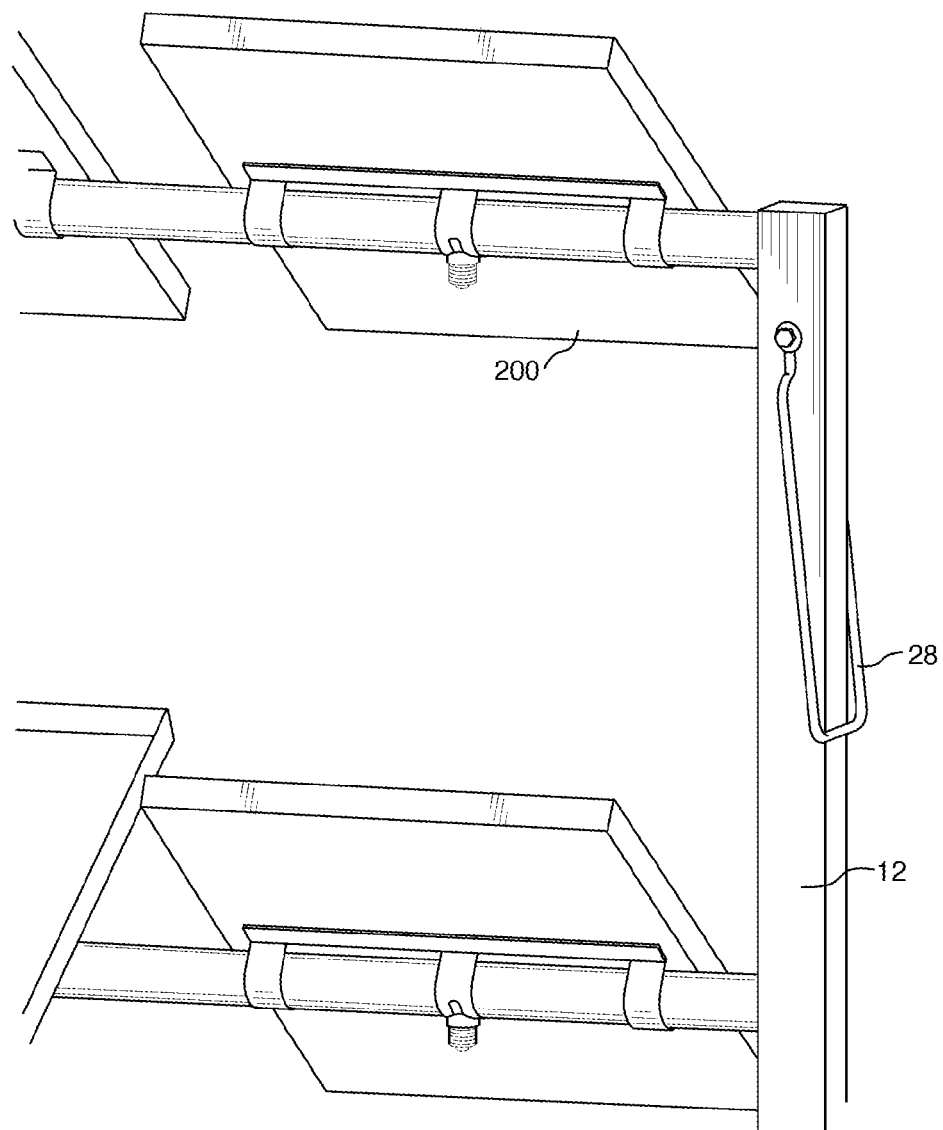
FIG. 25 is an isometric view of a handle.
Figure 26:
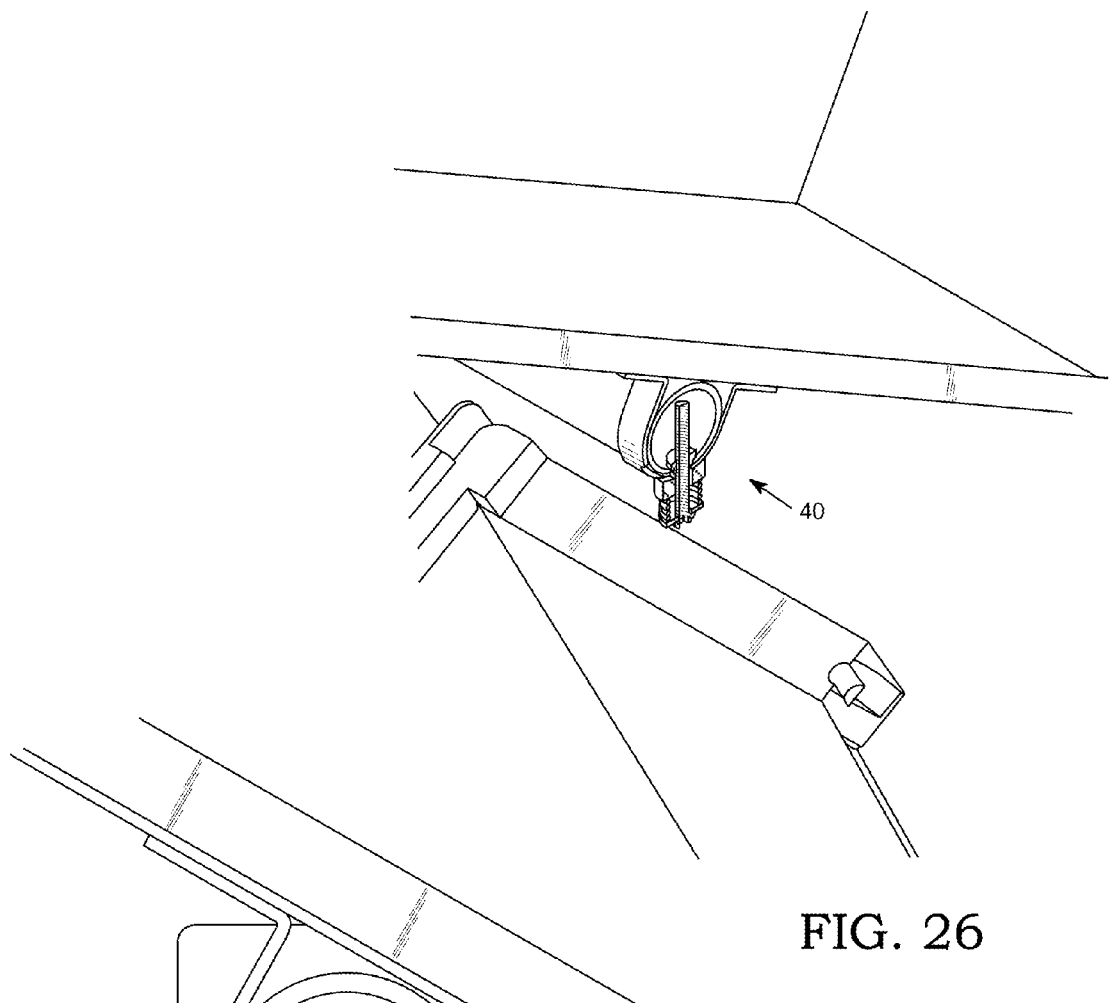
FIG. 26 is an isometric, cross-sectional view of a rotational coupling.
Figure 27:
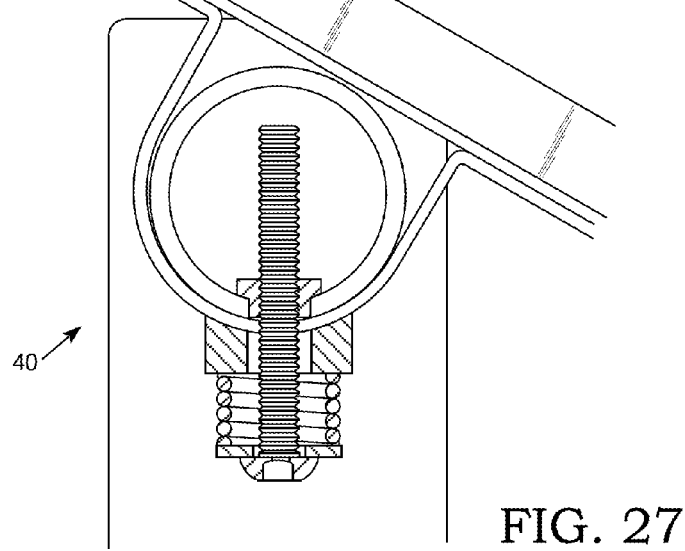
FIG. 27 is a cross-sectional end view of a rotational coupling.

The support assemblies 199, and in an exemplary embodiment the tote support assemblies 200, include a tote support member 210 defining a plane. The tote support member 210 is, in an exemplary embodiment, a planar member 212. Thus, for a tote platform 204, the tote support member 210 is a planar member 212 that has a size, cross-sectional area, and/or a squared-out cross-sectional area, that generally corresponds to a single tote 1. Similarly, for a standard tote platform 204, the tote support member 210 is a planar member 212 that has a size, cross-sectional area, and/or a squared-out cross-sectional area, that generally corresponds to a standard tote 1. Alternatively, a tote support member 210, in an exemplary embodiment, is a number of elongated members (not shown) that generally define a plane. For example, two elongated members disposed in an "X" shaped configuration may be a tote support member 210. The following discussion will use a tote platform 204 as an example of a support assembly 199/tote support assembly 200. The exemplary tote platform 204 has a generally rectangular, planar member 212 as the tote support member 210. The rectangular, planar member 212 has a longitudinal axis 214 (hereinafter "tote support member longitudinal axis 214") and a lateral axis 216 (hereinafter "tote support member lateral axis 216") as shown in FIG. 18. It is understood that the disclosed and claimed concept is not limited to this embodiment.

In one exemplary embodiment, the tote support member 210 is rotatably coupled to the horizontal frame members 90, 92 with the tote support member longitudinal axis 214 extending generally perpendicular to the tote support member 210 axis or rotation and/or the longitudinal axis of the associated horizontal frame members 90, 92. In this configuration, the tote support member lateral axis 216 is generally parallel to the frame assembly longitudinal axis 14. In this configuration, the cart 10 is relatively wide, due to the tote support member longitudinal axis 214 extending generally laterally relative to the frame assembly longitudinal axis 14. That is, the length of the tote support member 210 determines the cart 10 lateral width at, for example, a human's knee level. The cart 10, however, is relatively short, i.e., has a relatively shorter longitudinal length, due to the tote support member lateral axis 216 being generally aligned with the frame assembly longitudinal axis 14. This configuration solves some of the problems noted above. For example, the cart 10 is relatively short and may be spun one-hundred and eighty degrees in a typical store aisle. As used herein, this configuration of the tote support member 210 is the "lateral orientation" thereof. Tote support members 210 in the lateral orientation are shown in FIGS. 1-8 as well as other figures.

Figure 13:
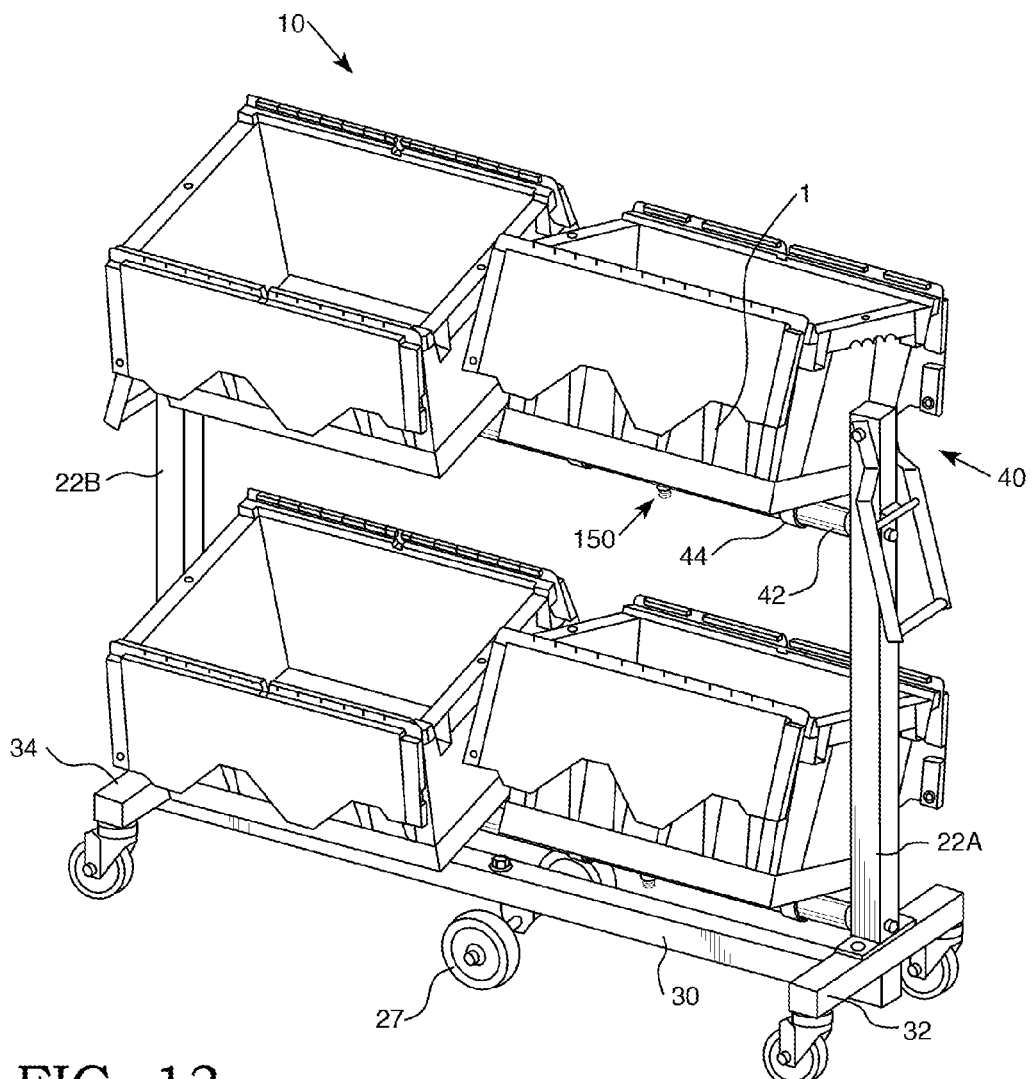
FIG. 13 is an isometric view of another embodiment of the cart.
Figure 14:
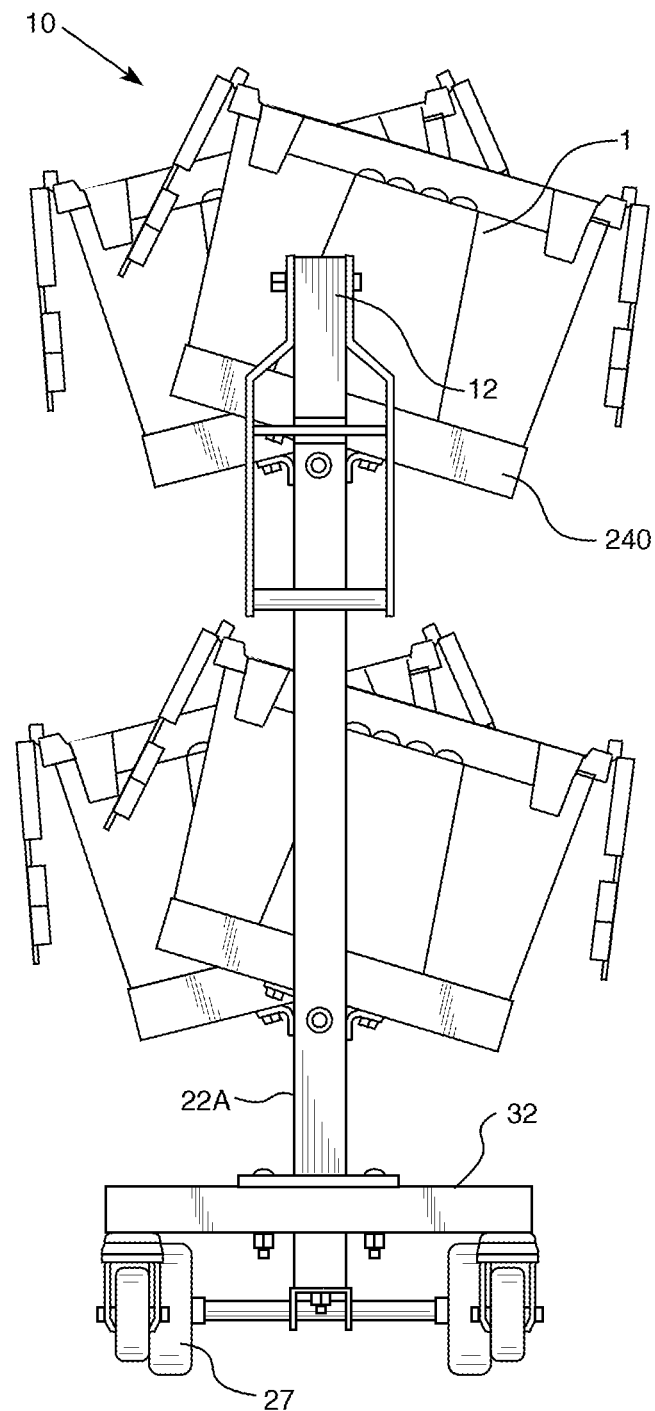
FIG. 14 is an end view of another embodiment of the cart.
Figure 15:
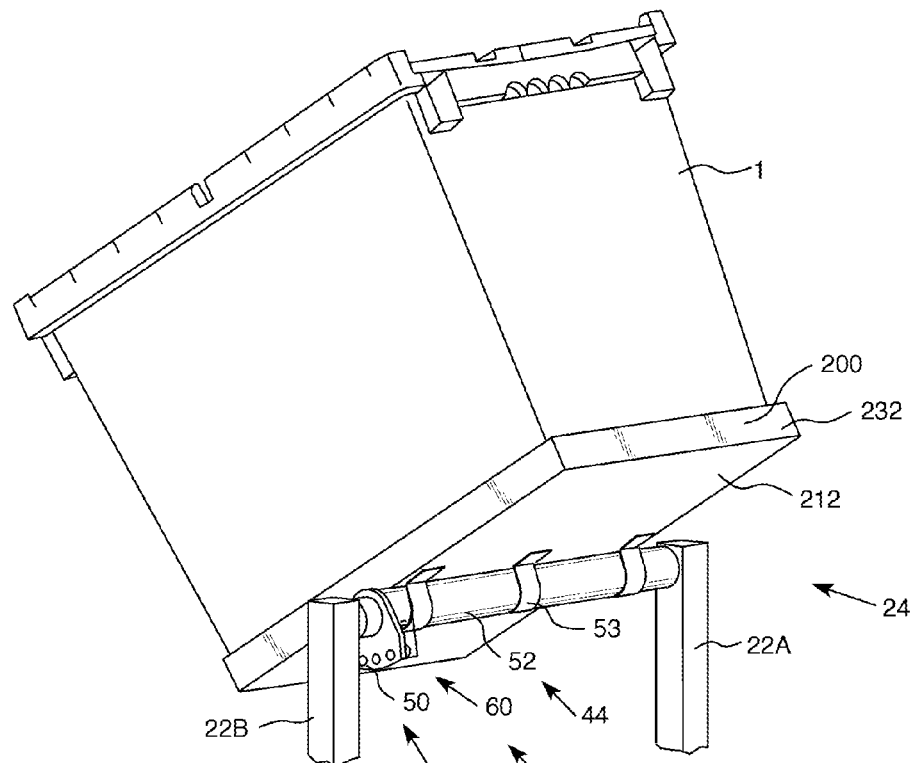
FIG. 15 is another isometric view of another embodiment of the cart.
Figure 16A:
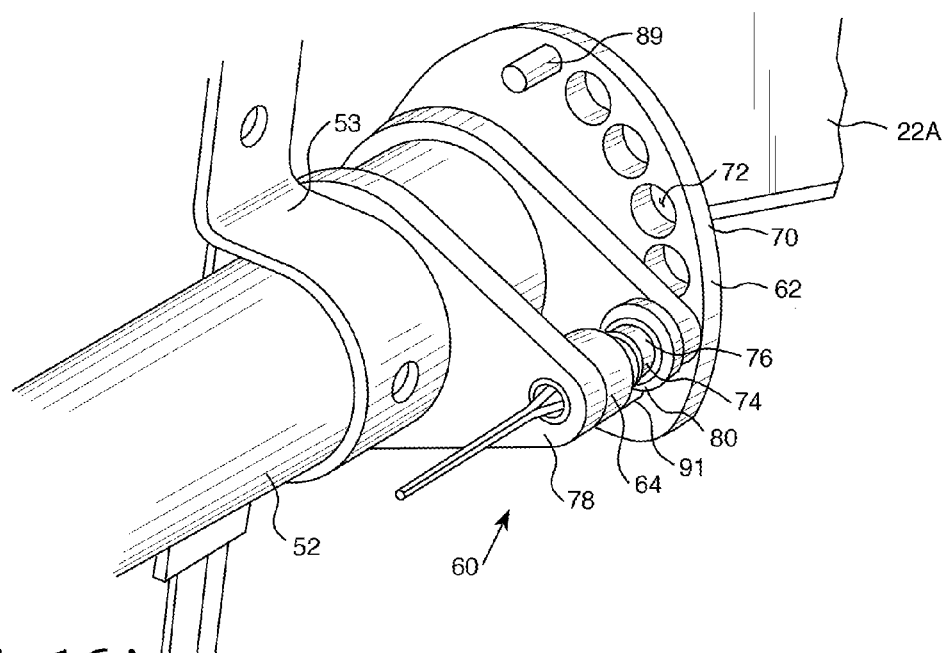
FIGS. 16A and 16B are isometric views of a locking assembly.
Figure 16B:
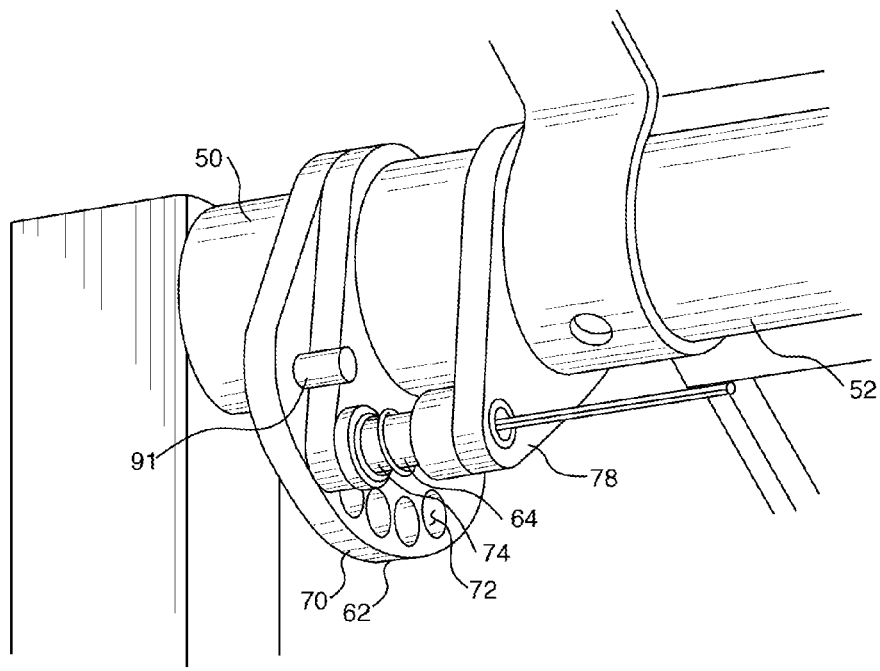

In another exemplary embodiment, the tote support member 210 is rotatably coupled to the horizontal frame members 90, 92 with the tote support member longitudinal axis 214 extending generally parallel to the tote support member 210 axis or rotation and/or the longitudinal axis of the associated horizontal frame members 90, 92. In this configuration, the tote support member lateral axis 216 is generally perpendicular to the frame assembly longitudinal axis 14. In this configuration, the cart 10 is relatively short, due to the tote support member longitudinal axis 214 extending generally parallel to the frame assembly longitudinal axis 14. The cart 10, however, is relatively long, i.e., has a relatively longer longitudinal length, due to the tote support member longitudinal axis 214 being generally aligned with the frame assembly longitudinal axis 14. This configuration solves some of the problems noted above. For example, the cart 10 is relatively thin laterally and allows a customer to pass the cart 10 easily in a store aisle. As used herein, this configuration of the tote support member 210 is the "longitudinal orientation" thereof. Tote support members 210 in the longitudinal orientation are shown in FIGS. 13 and 14, as well as other figures. Further, in an exemplary embodiment shown in FIG. 13, the cart 10 also includes center wheels 27. The center wheels 27 are coupled to the longitudinal frame member 30 at, or near, the center thereof. The center wheels 27, in an exemplary embodiment, have a larger diameter than the swivel wheels 26. In this configuration, and on a generally smooth surface, only two swivel wheels 26 and the center wheels 27 will contact the surface at a time. This configuration increases the maneuverability of the cart. Further, in an exemplary embodiment shown in FIG. 13, the longitudinal frame member 30 is disposed at an elevation lower than the two lateral frame members 32, 34. This configuration ensures that the center wheels 27 are lower than the swivel wheels 26. Thus, the elements described in this paragraph solve some of the problems stated above.

In an exemplary embodiment, each support assembly 199/tote support assembly 200, i.e., each tote platform 204, includes a tote retention assembly 230. A tote retention assembly 230 is structured to maintain a tote 1 on the tote platform 204. That is, a tote 1 may be packed generally randomly resulting in a high and/or offset center of gravity. A tote 1 packed in such a manner may tip over and possibly fall off the tote platform 204. This is especially true when the tote platform 204 is moved to a tilted position, as described below. The tote retention assembly 230 resists such tipping.

In an exemplary embodiment, a tote retention assembly 230 is structured to contact and/or engage multiple sides of a tote 1. For example, as shown, when a tote platform 204 has a planar member 212 for a tote support member 210, the tote retention assembly 230 includes a number of sidewalls 232 extending generally upwardly from the perimeter of each tote support member 210. In one embodiment, the planar member 212 has a slightly larger cross-sectional area relative to the lower end (i.e., the tote bottom and adjacent portions of the sidewalls). In this configuration, the tote 1 fits loosely on the tote platform 204. In an exemplary embodiment, not shown, the sidewalls 232 have a height that is between about 20%-80%, or about 40%-60%, or about 50% the height of the tote 1 sidewalls. Such sidewalls 232 are, in an exemplary embodiment, angled to correspond to the tapered sidewalls of the tote 1. In another embodiment, the planar member 212 has a cross-sectional area that substantially corresponds to the lower end (i.e., the tote bottom and adjacent portions of the sidewalls). In this configuration, the sidewalls 232 snuggly engage the tote 1. Further, in an exemplary embodiment, the sidewalls 232 include a compressible material (not shown) such as, but not limited to, a compressible foam or fabric. The compressible material is disposed on the inner surfaces of the sidewalls 232 and engage a tote 1 when the tote 1 is placed on the tote platform 204.

In another embodiment, the tote retention assembly 230 includes clamps (not shown) that are structured to engage features, such as, but not limited to ribs, on the tote 1. Such clamps move between a non-engaged, first position and an engaged, second position. In another embodiment, the tote retention assembly 230 includes lugs (not shown) that are structured to fit within, or engage, features such as, but not limited to, pockets or mounting openings on the lower surface of the bottom of the tote 1. In another embodiment, the tote retention assembly 230 includes elongated retention members 240 disposed at the corners of the tote platform 204. The retention members 240 are movably, i.e., pivotally, coupled to the outer sides (i.e., the sides extending generally parallel to the frame assembly longitudinal axis 14) of the tote platform 204 and are structured to move between a retracted, first position, wherein the retention members 240 are disposed generally in, or parallel to the plane of the tote platform planar member 212, and an extended, second position, wherein the retention members 240 extend generally normal to the plane of the tote platform planar member 212.

Figure 7:
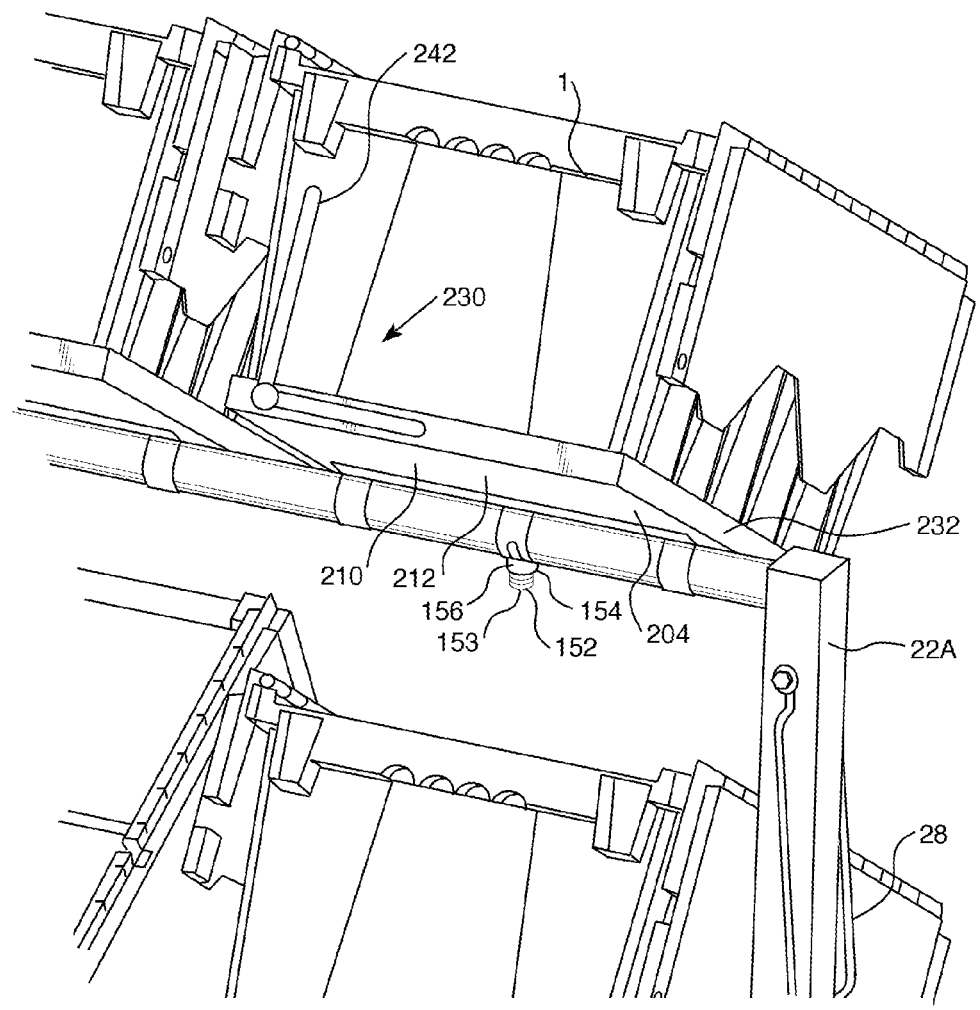
FIG. 7 is detailed isometric view of a tote platform.
Figure 8:
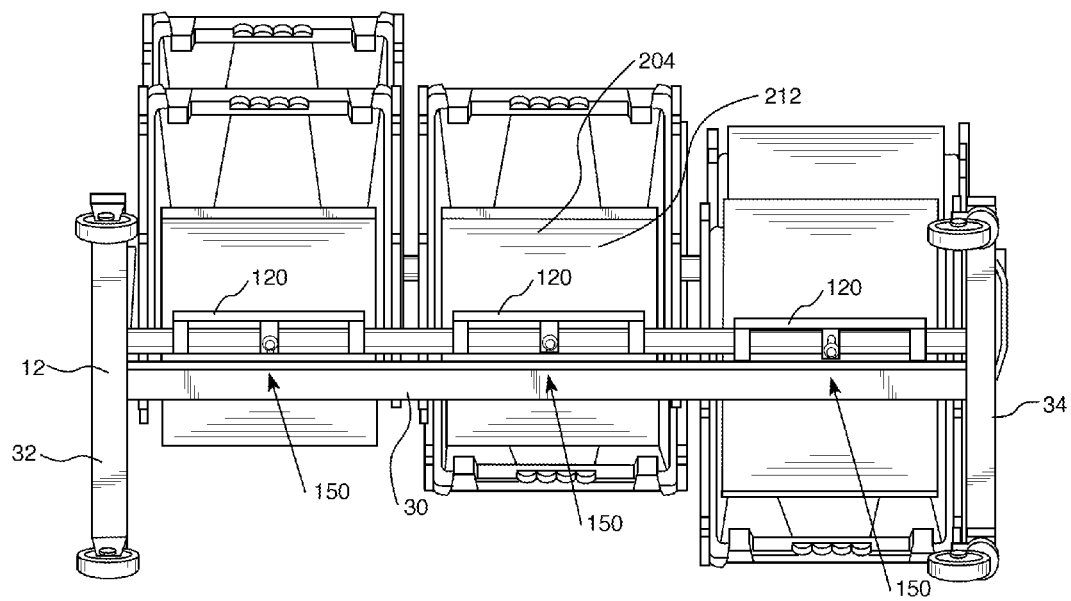
FIG. 8 is a bottom isometric view of a cart.
Figure 9:
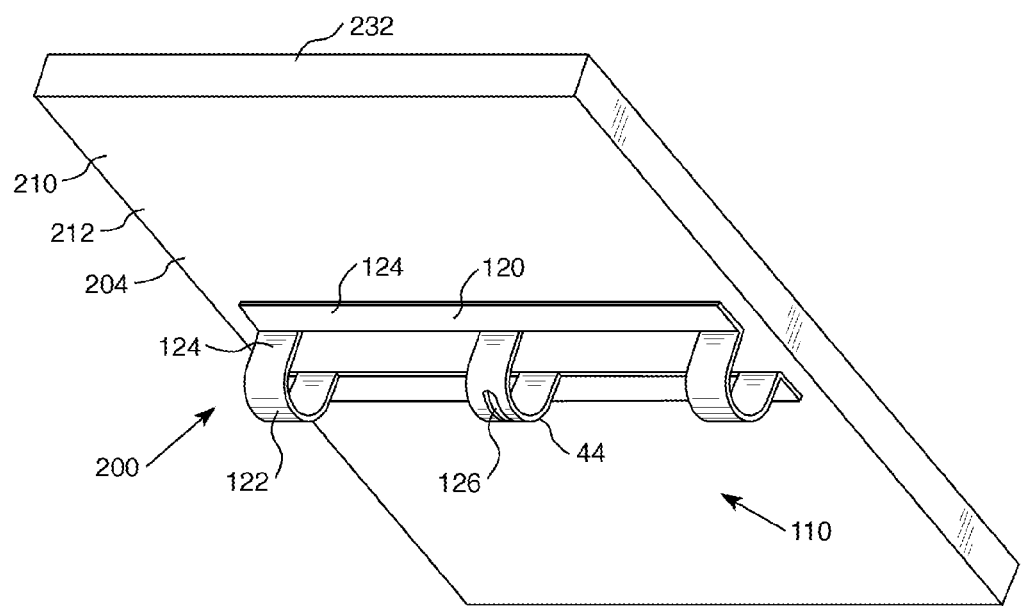
FIG. 9 is a detail isometric view of a tote platform.
Figure 10:
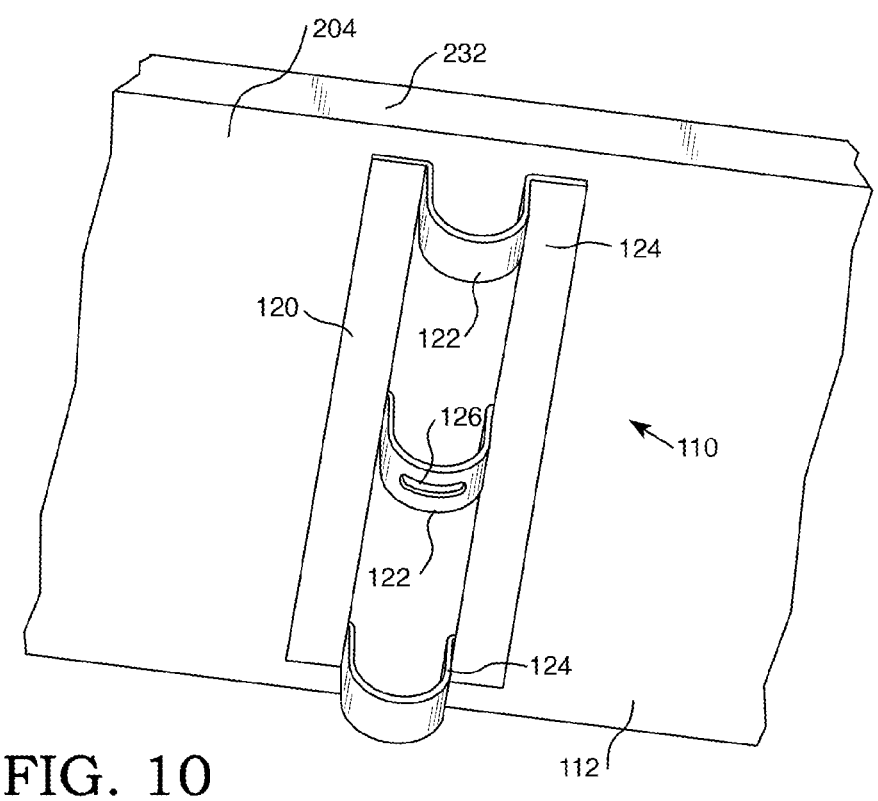
FIG. 10 is another detail isometric view of a tote platform.
Figure 17:
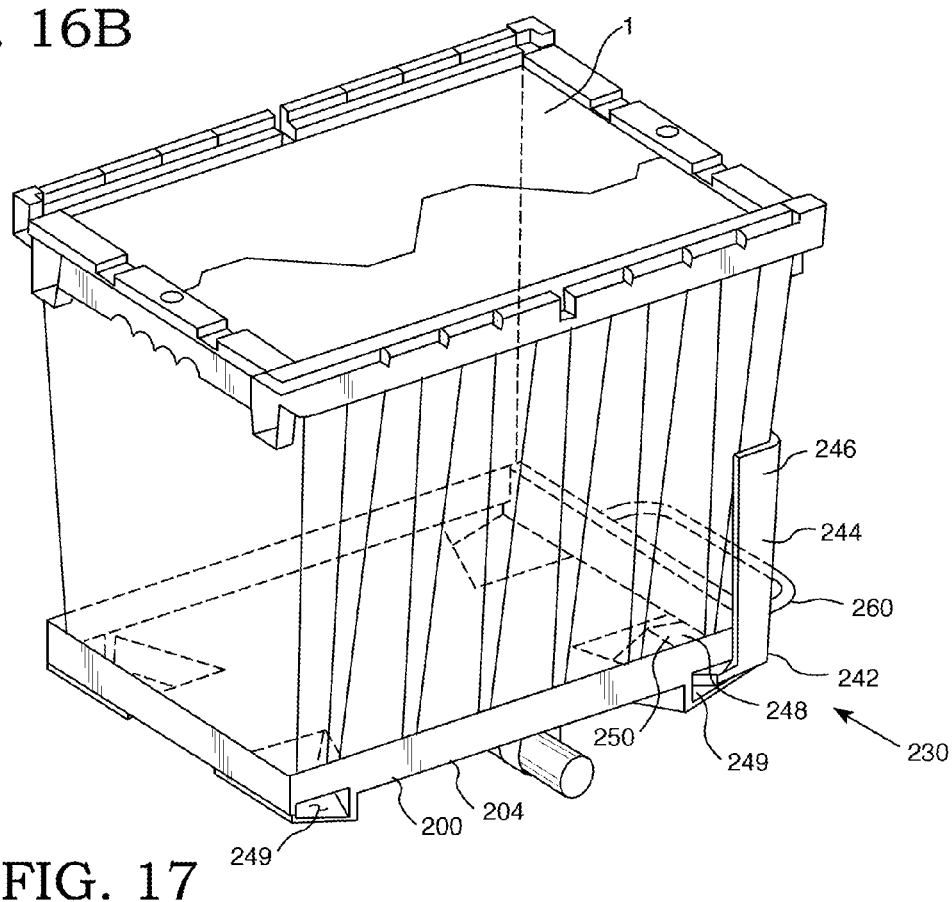
FIG. 17 is an isometric view of a tote retention assembly.

In another embodiment, the tote retention assembly 230 includes an actuator 250 for the retention members 240. That is, in an exemplary embodiment, the retention members 240 are generally elongated or L-shaped members 242 that are fixed to the tote support assembly 200, as shown in FIG. 7, or are pivotally coupled to the tote platform planar member 212 as shown in FIG. 17. That is, the L-shaped member 242 includes a generally vertical portion 244 having a distal end 246 that is shaped to correspond to a corner of a tote 1. That is, the L-shaped member vertical portion distal end 246 includes two planar portions that form a generally right angle. The L-shaped member 242 also includes a generally horizontal portion 248. In an exemplary embodiment, the tote platform planar member 212 includes a recess 249 shaped and sized to correspond to the L-shaped member horizontal portion 248. The L-shaped members 242 are pivotally coupled to the tote platform planar member 212 with the L-shaped member horizontal portion 248 disposed in the recess 249. The L-shaped members 242 move between a first position, wherein the L-shaped member vertical portion 244 is tilted away from the tote platform planar member 212 (i.e., the L-shaped member vertical portion 244 is not generally normal to the tote platform planar member 212) and a portion of the L-shaped member horizontal portion 248 is disposed above the plane of the tote platform planar member 212, and a second position, wherein the L-shaped member vertical portion 244 is generally normal to the tote platform planar member 212 and the L-shaped member horizontal portion 248 is disposed in the recess 249 and is generally in the plane of the tote platform planar member 212. It is understood that when a tote 1 is placed on the tote platform planar member 212, the tote 1 engages the L-shaped member horizontal portion 248 causing the L-shaped members 242 to move from the first position to the second position.

In an exemplary embodiment, each tote platform 204, i.e., each tote support assembly 200, includes a handle 260, hereinafter identified as a "platform handle" 260. A platform handle 260 is structured to assist a user moving the tote platform 204 between the first and second positions.

The cart 10 is assembled as follows. In an exemplary embodiment, the base 20 is assembled so as to have a narrow profile, as described above, with the wheels 26 coupled thereto. That is, in an exemplary embodiment, the base 20 includes longitudinal frame member 30 with lateral frame member 32, 34 disposed at each end of the longitudinal frame member 30. The lateral frame members 32, 34 extend generally horizontally and generally perpendicular to the frame assembly longitudinal axis 14. One vertical frame member 22A, 22B is disposed at each end of the longitudinal frame member 30 and each extend generally upwardly. The fixed, generally circular, first horizontal frame member 90 and a fixed, generally circular, second horizontal frame member 92 are disposed between vertical frame members 22A, 22B and are fixed thereto. As noted above, the extensions 99 extend generally radially and downwardly from each fixed horizontal frame member 90, 92.

The movable couplings 40 having a bracket 120 are assembled as described above. Thus, in this configuration, a number of tote platforms 204 are rotatably coupled to the frame assembly 12. In an exemplary embodiment, the arcuate slot 126, in an exemplary embodiment, extends to both sides of the origin and is centered on the origin. In this configuration, and as noted above, each tote platform 204 moves between a number of positions including a level, first position, wherein the plane of the tote platform support member 212 is generally horizontal, and a tilted, second position, wherein the plane of the tote platform support member 212 is tilted toward one of the frame assembly first lateral side 16 or the frame assembly second lateral side 18. Further, in an exemplary embodiment, each tote platform 204 is movably coupled to the frame assembly 12 wherein each tote platform support member 212 moves between a number of positions including a level, first position, wherein the plane of the tote platform support member 212 is generally horizontal, a tilted, first lateral position, wherein the plane of the tote platform support member 212 is tilted toward the frame assembly first lateral side 16, and a tilted second lateral position, wherein the plane of the tote platform support member 212 is tilted toward the frame assembly second lateral side 18. This configuration, including, but not limited to, the tilting tote platforms 204 solves the problems noted above.

In another exemplary embodiment, shown in FIG. 18, the cart 10 includes a number of "use features" 300. The "use features," as used herein, are constructs used for purposes other than supporting a tote 1. That is, a cart 10 is also used to deliver items directly to a customer. Such a practice involves a number of customers placing orders for a number of items, the items being placed in a tote 1, and transferring the tote 1 on a cart 10 to a delivery location, such as, but not limited to the front of a store or similar curbside location. The customer then meets the cart 10 at the curbside location and receives the items. To accommodate the sale and delivery requirements of this practice, the cart 10 includes a number of "use features" 300 as described below.

In an exemplary embodiment, shown in FIGS. 18 and 28, the use features 300 are disposed on a mounting 302 disposed between sets of support assemblies 199 which, in an exemplary embodiment, are tote platforms 204. The mounting 302 includes two additional vertical members 22C, 22D. The shown use features 300 are a work surface 310, a storage space 312, a bag holder 314, a clipboard 316, and a number of shelves 318. Orders are then placed on the clipboard 316. A worker uses the work surface 310 for record keeping, e.g., noting what orders have been picked up. Records, receipts, and other objects are stored in the storage space 312. When a customer arrives at the curbside location, items are moved from the tote 1 into bags (not shown) that are stored on the bag holder 314. The shelves 318 are used for additional storage. For example, a tote lid is structured to be stored on a shelf 318. It is noted that as the customer has already ordered the items, and as the items are in a tote 1 for transportation and storage, the tote 1 is not being used to display items for sale. That is, the tote 1, and therefore the cart 10, are not used for display.

In addition to being oriented either laterally or longitudinally, the tote support members 210 are disposed in a matrix that is described herein by horizontal rows and vertical columns. For example, the cart 10 in FIG. 1 is a "two by three, or 2×3, lateral orientation" cart. That is, there are two horizontal rows of tote support members 210 and three vertical columns of tote support members 210 with the tote support members 210 disposed in the lateral orientation. FIGS. 31-37 show a 2×1, longitudinal cart 10; FIGS. 36-44 show a 2×1, lateral cart 10; FIGS. 45-51 show a 3×2, longitudinal cart 10; FIGS. 52-58 show a 2×3, longitudinal cart 10; FIGS. 59-65 show a 2×3, lateral cart 10; FIGS. 66-72 show a 3×2, lateral cart 10; and FIGS. 73-79 show a 3×3, lateral cart 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A cart comprising:
   a frame assembly, said frame assembly including a longitudinal axis, a first lateral side and a second lateral side;
   a number of tote support assemblies;
   each tote support assembly including a tote support member defining a plane;
   each tote support member movably coupled to said frame assembly wherein each tote support member moves between a number of positions including a level, first position, wherein the plane of the support member is generally horizontal, and a tilted, second position, wherein the plane of the support member is tilted toward one of said frame assembly first lateral side or said frame assembly second lateral side; and
   wherein each said tote support assembly is a tote platform.

2. The cart of claim 1 wherein:
   said frame assembly includes a number of frame members;
   each tote support assembly includes a number of movable couplings;

each tote support assembly movable coupling including a fixed element and a movable element;
each tote support assembly movable coupling fixed element fixed to a frame member; and
each tote support assembly movable coupling coupled to a tote support member.

3. The cart of claim 2 wherein:
said frame assembly frame members include a number of vertical frame members and a number of horizontal frame members;
each said horizontal frame member coupled to a number of vertical frame members;
each said tote platform coupled to a horizontal frame member; and
each said tote platform movably coupled to a vertical frame member.

4. The cart of claim 3 wherein:
said number of vertical frame members includes a first vertical member and a second vertical member; and
each said horizontal frame member coupled to, and extending between, said first vertical member and said second vertical member.

5. The cart of claim 4 wherein:
a number of rotatable horizontal frame members are rotatably coupled to a number of vertical frame members;
a number of tote platforms are fixed to each horizontal frame member; and
wherein each rotatable horizontal frame member moves between a number of orientations including a first orientation, wherein the plane of at least one tote platform is generally horizontal, and a second orientation, wherein the plane of at least one tote platform is tilted toward one of said frame assembly first lateral side or said frame assembly second lateral side.

6. The cart of claim 5 wherein:
said frame assembly includes a locking assembly;
said locking assembly includes a first component and a second component;
said locking assembly first component fixed relative to a vertical frame member;
said locking assembly second component fixed to one said rotatable horizontal frame member; and
said locking assembly second component selectively configurable relative to said locking assembly first component wherein, in a first configuration, said locking assembly second component is fixed to said locking assembly first component, and, in a second configuration, said locking assembly second component is movable relative to said locking assembly first component.

7. The cart of claim 6 wherein:
said locking assembly first component is a plate including a number of openings disposed over an arc;
said locking assembly second component includes a movable protrusion; and
said locking assembly second component movable protrusion structured to be selectively coupled to one of said locking assembly first component openings.

8. The cart of claim 4 wherein:
a number of horizontal frame members are fixed to a number of vertical frame members; and
a number of tote platforms are rotatably coupled to each horizontal frame member.

9. The cart of claim 8 wherein:
each tote support assembly movable coupling fixed element includes a first horizontal frame member and a number of extensions;
said first horizontal frame member fixed to a vertical frame member;
wherein said first horizontal frame member has a generally circular cross-section;
each said extension extending generally radially from said first horizontal frame member;
each tote support assembly movable coupling movable element is a platform mounting; and
each said platform mounting fixed to an associated platform.

10. The cart of claim 9 wherein:
each said platform mounting includes a bracket including an arcuate portion defining an arcuate slot; and
each said platform mounting bracket movably coupled to said first horizontal frame member with one said extension extending through said bracket arcuate slot.

11. The cart of claim 10 wherein:
each said platform mounting includes a resistance assembly; and
said resistance assembly structured to resist the rotation of said movable couplings.

12. The cart of claim 8 wherein:
each tote support assembly movable coupling fixed element includes a first horizontal frame member, a second horizontal frame member and a number of extensions;
said first horizontal frame member fixed to a vertical frame member at a first elevation;
wherein said first horizontal frame member has a generally circular cross-section;
said second horizontal frame member fixed to a vertical frame member at a second elevation, wherein said second elevation is lower than said first elevation;
wherein said second horizontal frame member has a generally circular cross-section;
each said extension extending generally radially from one of said first horizontal frame member or said second horizontal frame member;
each tote support assembly movable coupling movable element is a platform mounting; and
each said platform mounting fixed to an associated platform.

13. The cart of claim 12 wherein:
each said platform mounting includes a bracket including an arcuate portion defining an arcuate slot; and
each said platform mounting bracket movably coupled to one of said first horizontal frame member or said second horizontal frame member with one said extension extending through said bracket arcuate slot.

14. The cart of claim 1 wherein each tote platform includes a tote retention assembly.

15. The cart of claim 14 wherein said tote retention assembly is structured to engage multiple sides of a tote.

16. The cart of claim 14 wherein:
said tote platform includes a generally planar tote support member;
said tote retention assembly includes a number of sidewalls; and
said sidewalls extend generally upwardly from the perimeter of each tote support member.

17. The cart of claim 1 wherein each tote platform includes a number of platform handles, each platform handle disposed on a lateral side of an associated tote support member.

* * * * *